Feb. 9, 1971  D. R. BERNIER  3,562,720
INPUT/OUTPUT SYSTEM
Original Filed Oct. 23, 1965  12 Sheets-Sheet 1
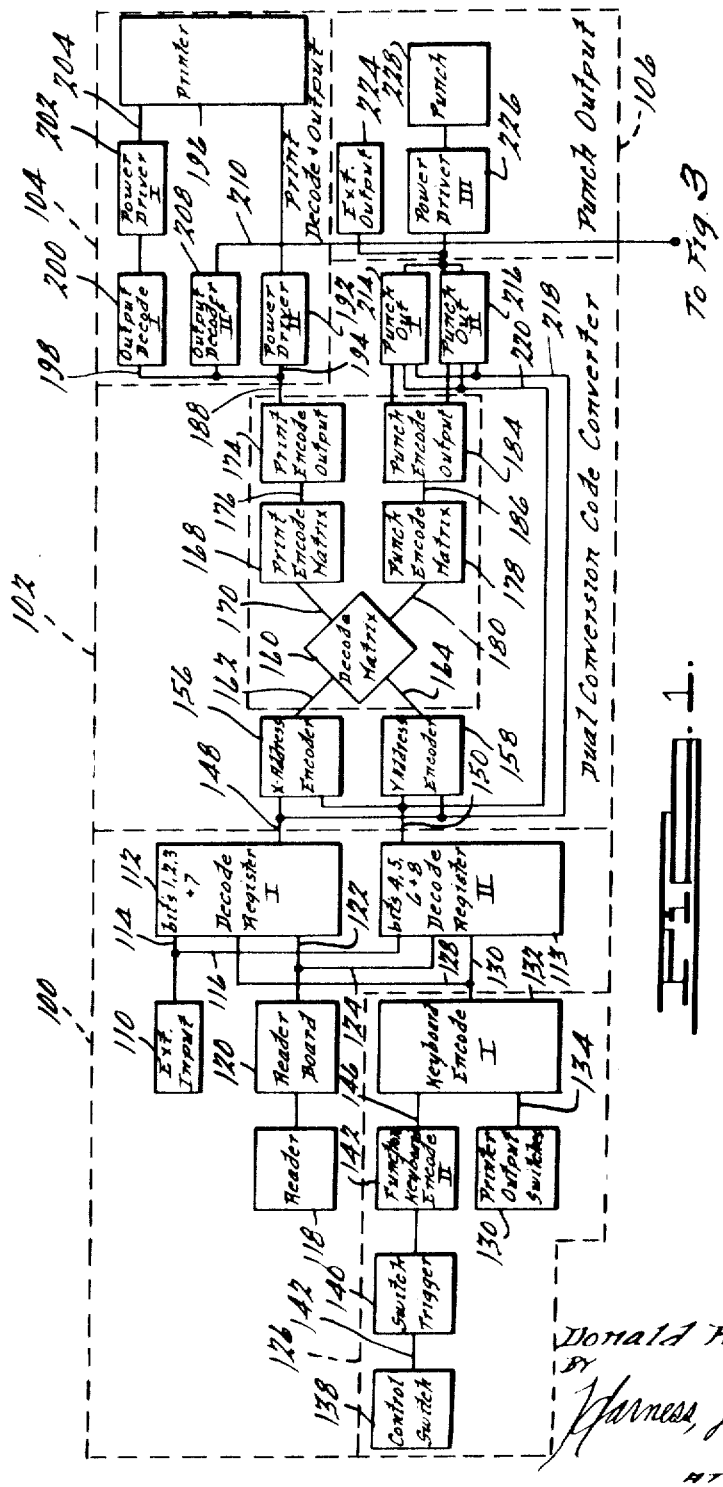
INVENTOR.
Donald R. Bernier
BY
Harness, Dickey-Pierce
ATTORNEYS

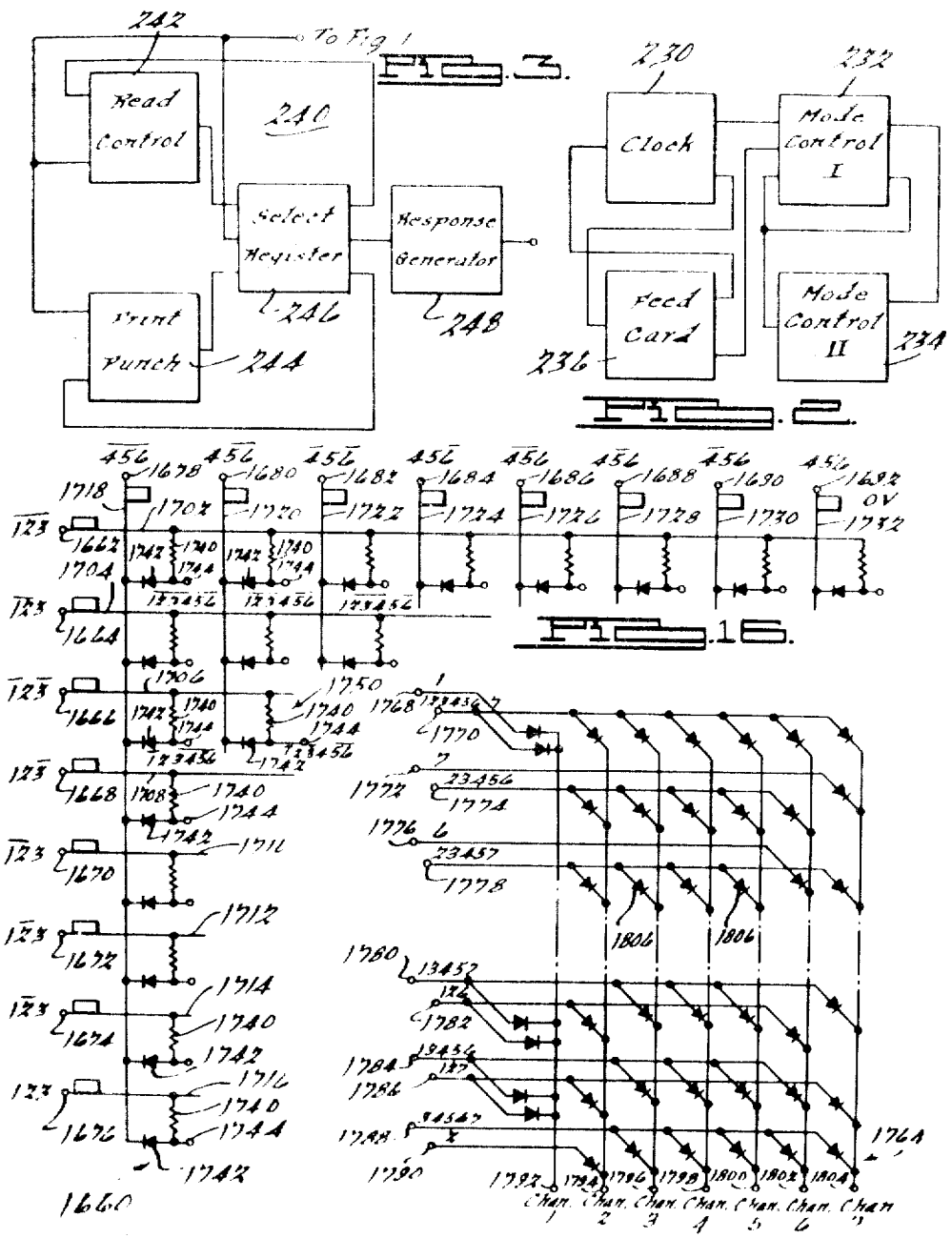

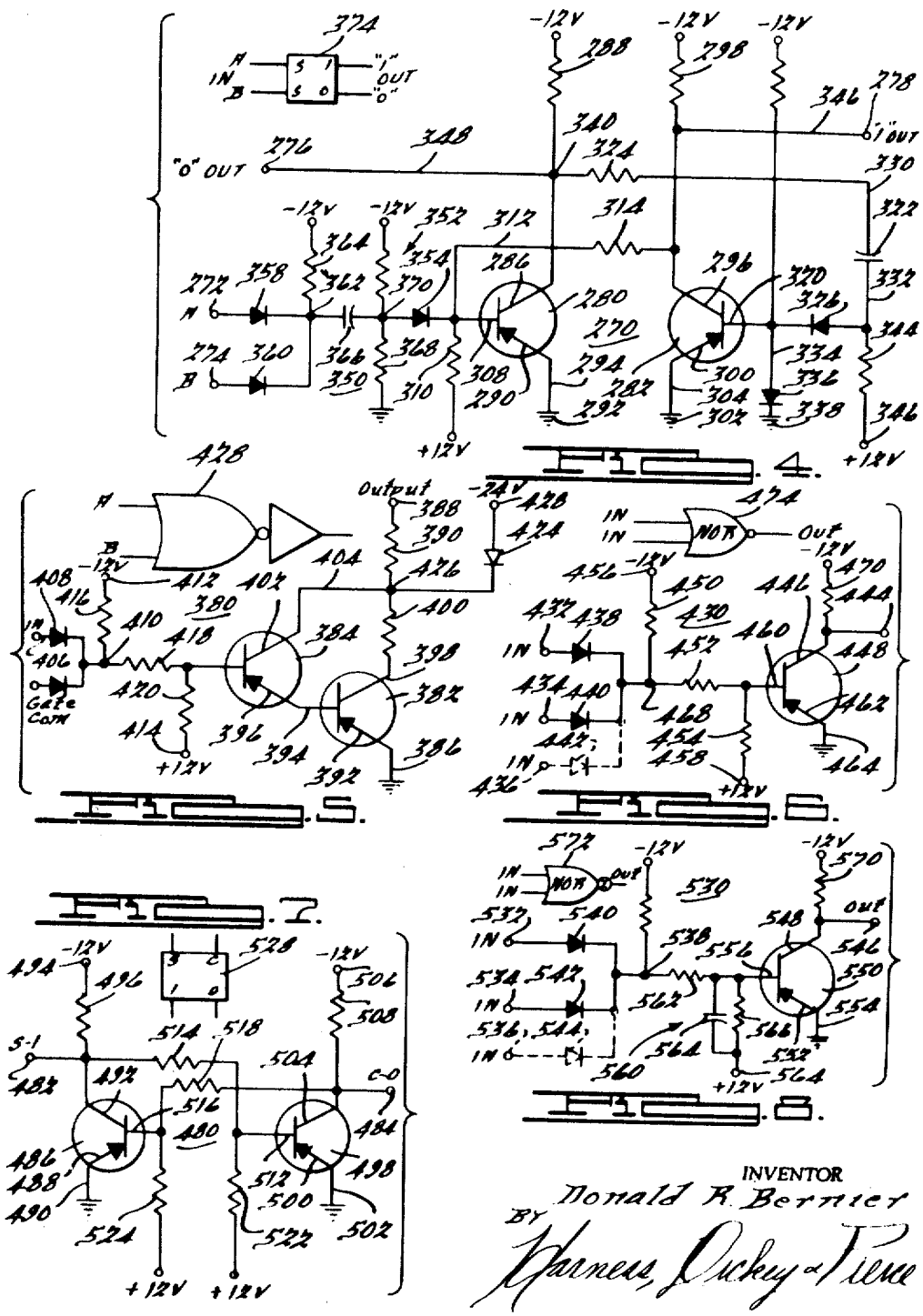

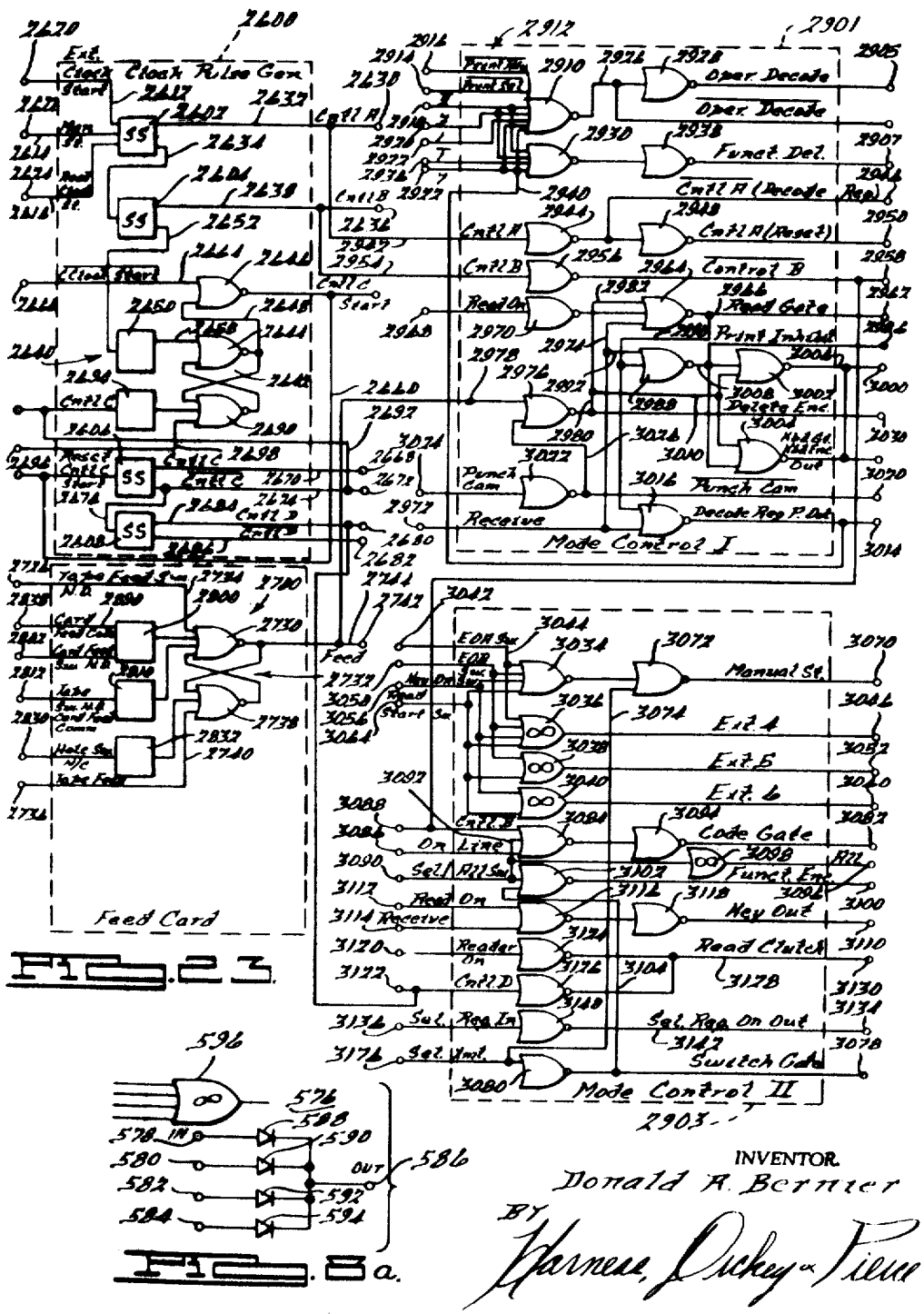

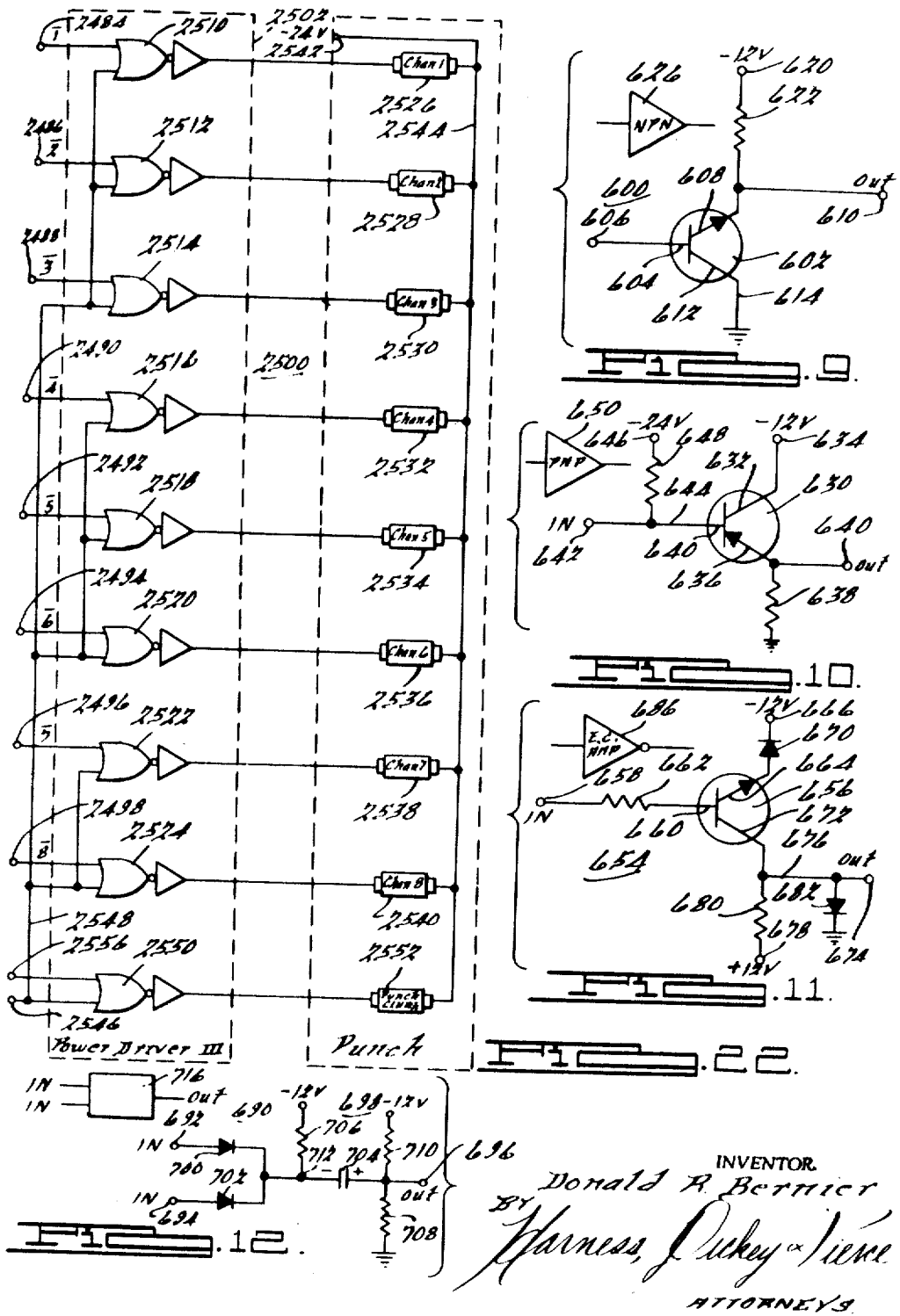

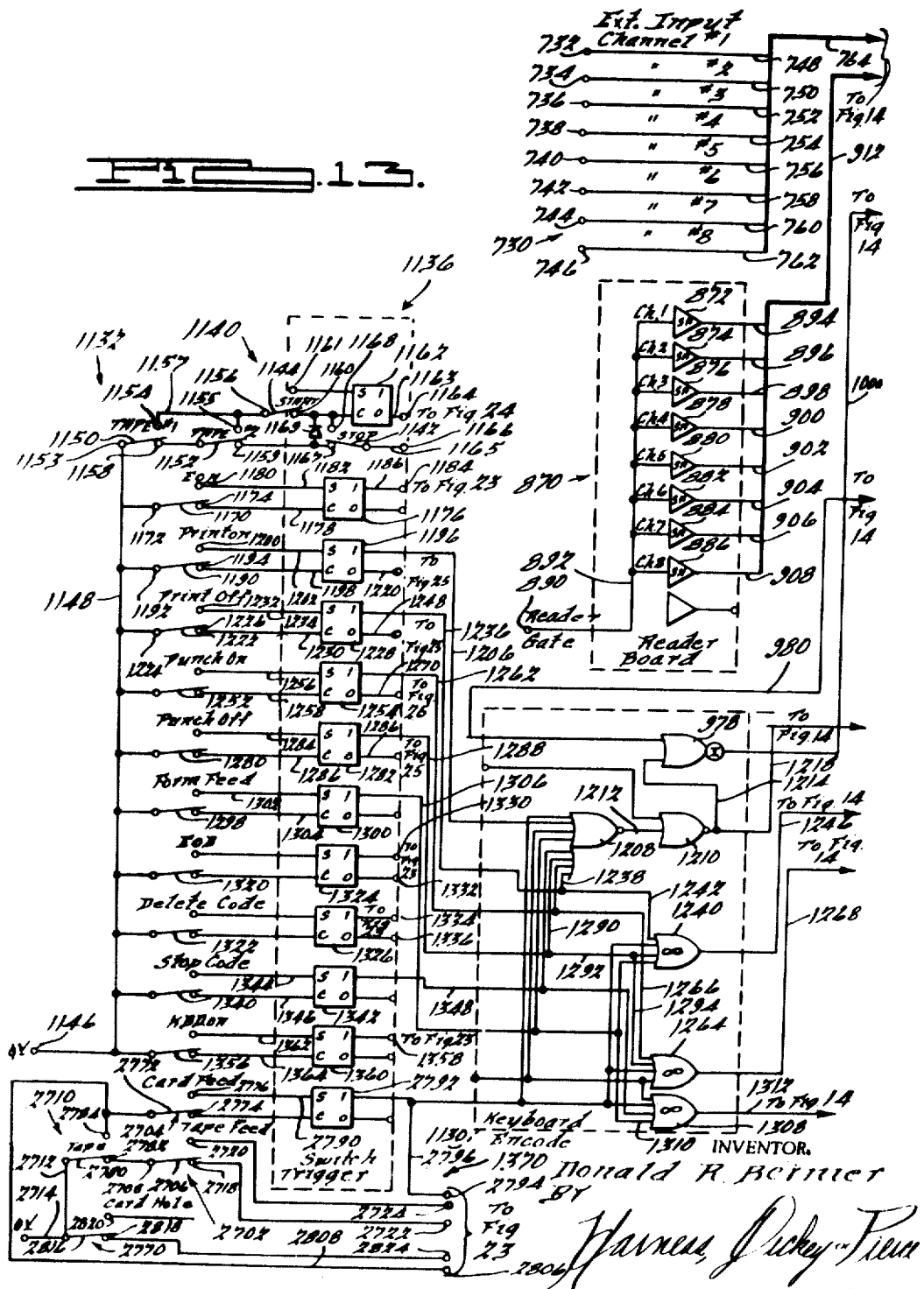

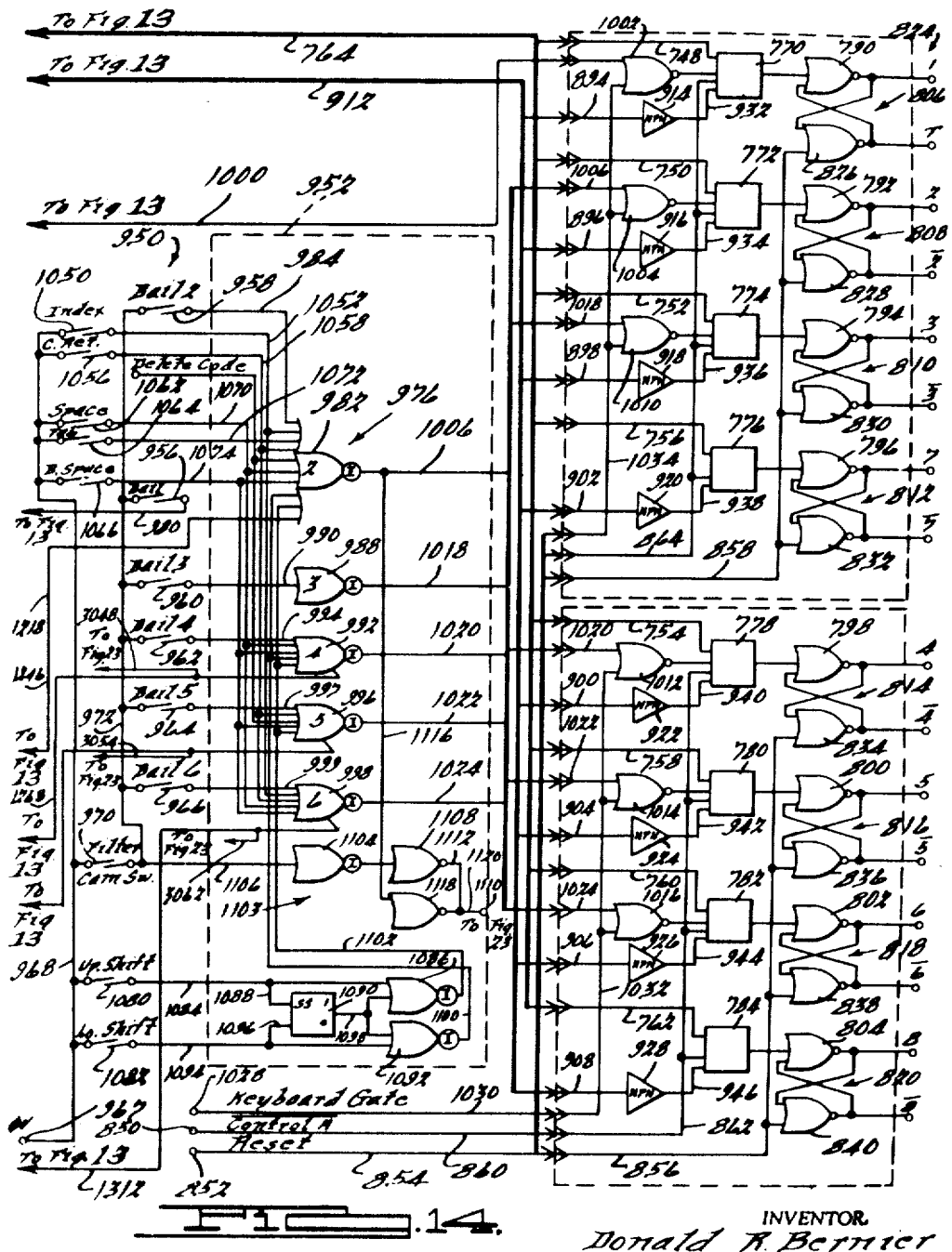

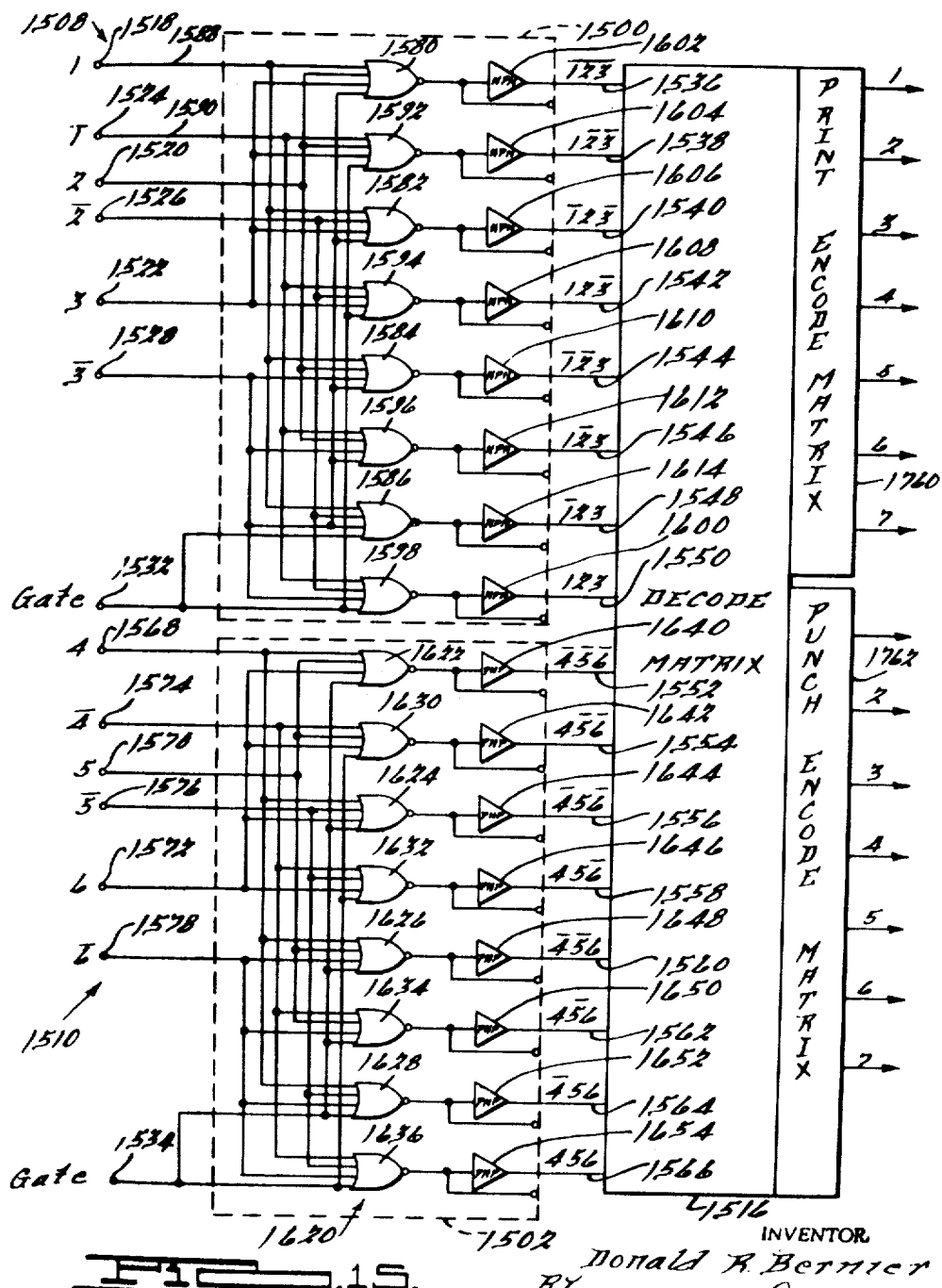

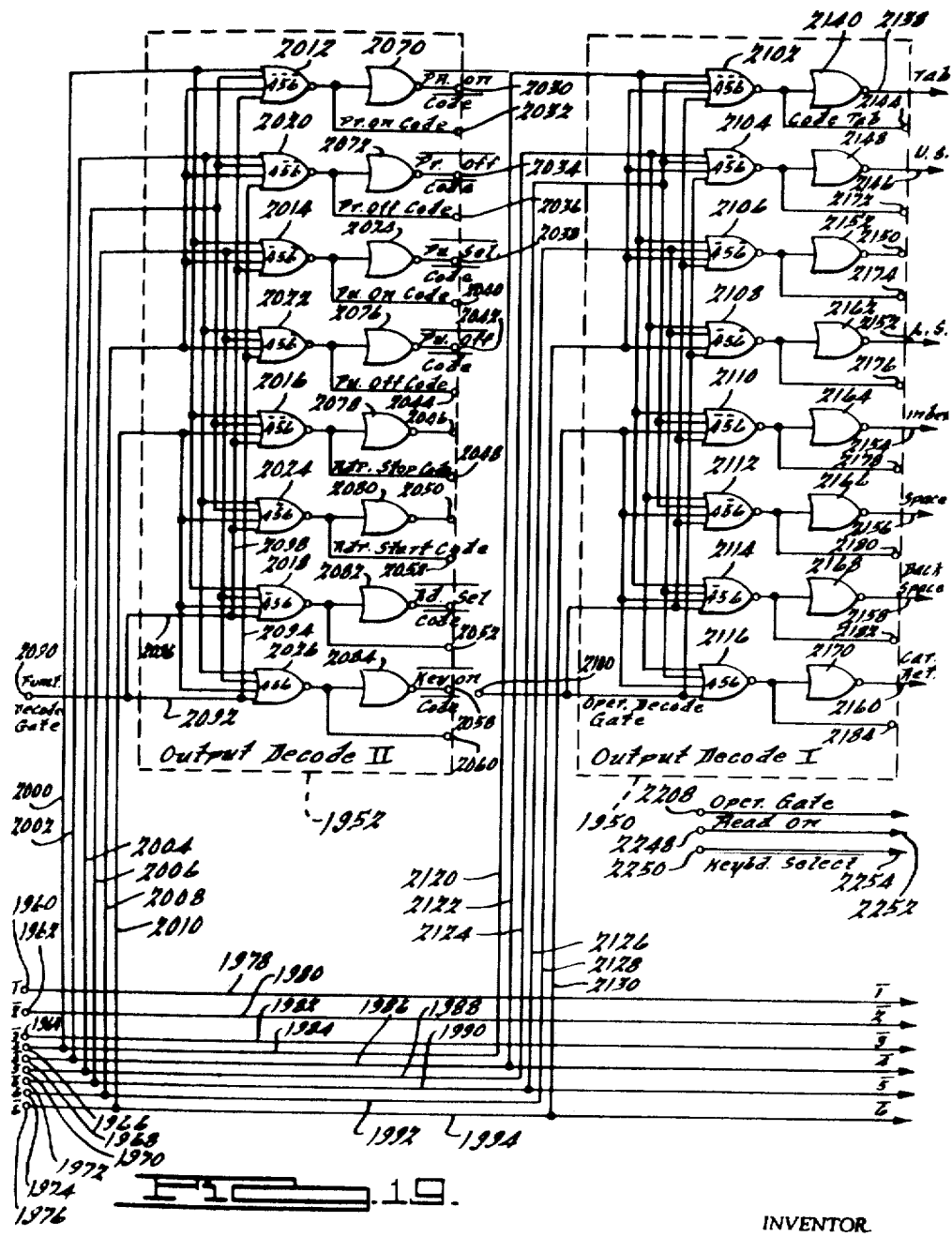

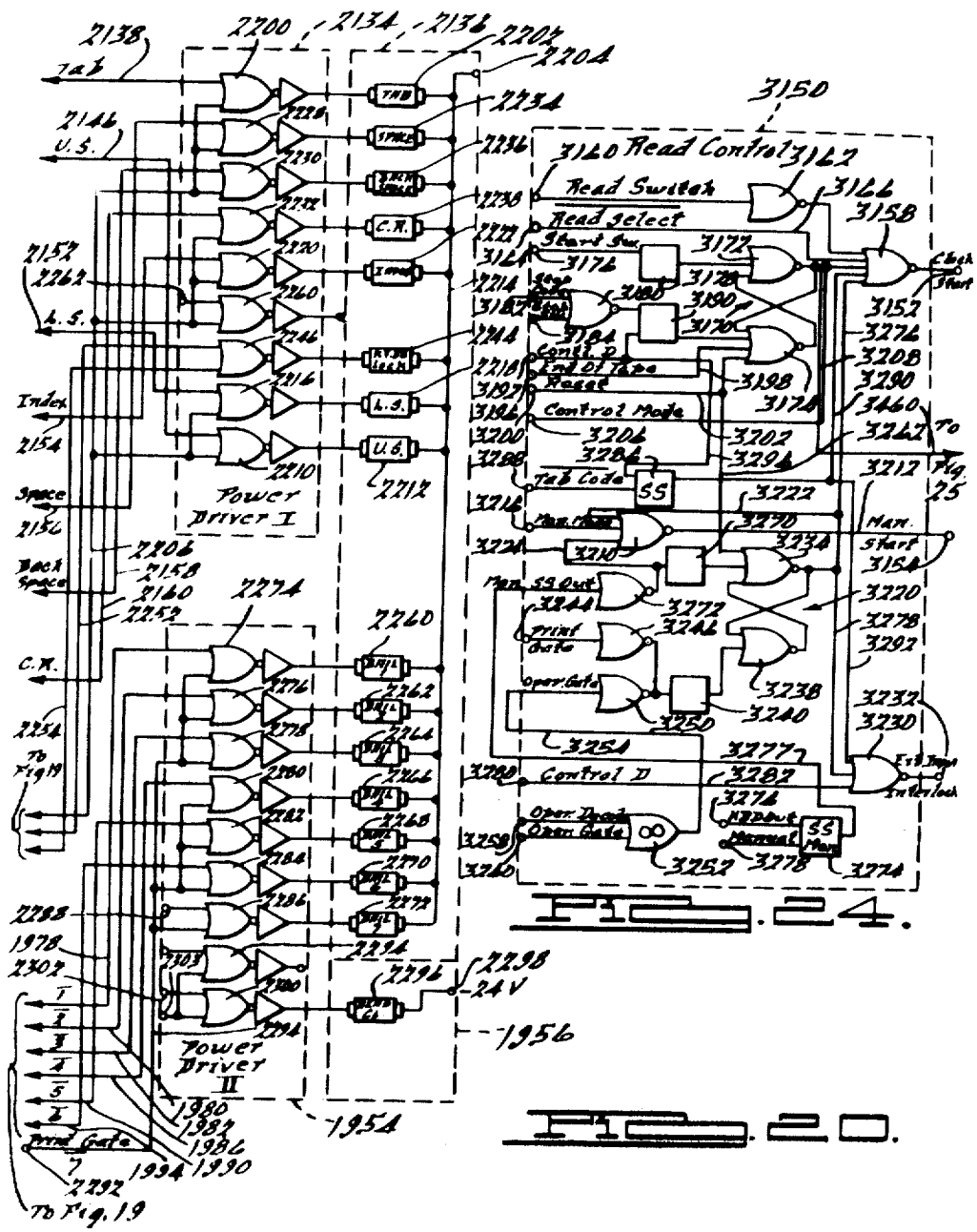

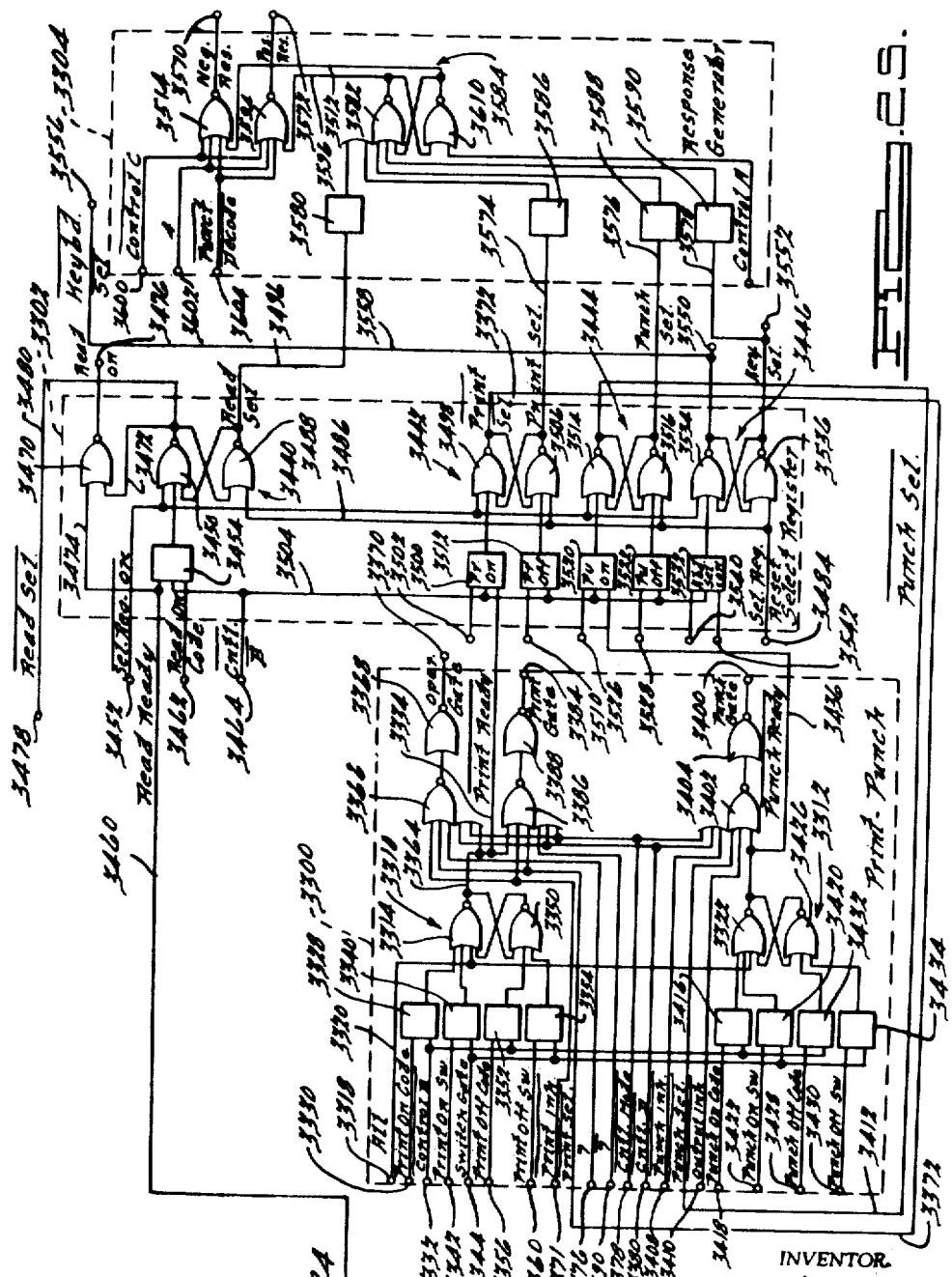

United States Patent Office 3,562,720
Patented Feb. 9, 1971

3,562,720
INPUT/OUTPUT SYSTEM
Donald R. Bernier, Detroit, Mich., assignor to Intercontinental Systems, Inc., Los Angeles, Calif., a corporation of California
Application Oct. 31, 1966, Ser. No. 590,761, which is a division of application Ser. No. 503,861, Oct. 23, 1965. Divided and this application Mar. 24, 1969, Ser. No. 840,562
Int. Cl. G11b 13/00
U.S. Cl. 340—172.5
6 Claims

ABSTRACT OF THE DISCLOSURE

There is herein disclosed a data processing system in which multiple sources of input data in the form of successive columns of parallel bit signals having an electrical characteristic of a first level if true and a second level if not true are selectively stored in register means comprising a plurality of storage circuits having set and reset states controlled by clocking circuit means in the form of a reset circuit operable during a first period and an enabling circuit having an electrical characteristic which changes to the first level during a period at least as late as the end of the first period.

---

This application is a division of my prior copending application Ser. No. 590,761 filed Oct. 31, 1966, now U.S. Pat. No. 3,435,419 issued Mar. 25, 1969, which is a division of my prior copending application Ser. No. 503,-861 filed Oct. 23, 1965, now U.S. Pat. No. 3,423,735.

This invention relates generally to business machine systems and more specifically to data processing systems to be utilized in conjunction with business machines which are adapted to receive, transfer and utilize variously coded input data in the form of coded information signals from a plurality of input data sources wherein the output coded information may be fed to a plurality of data utilizing systems which may be selectively actuated, or the system may be utilized as a terminal system and associated with a master data processing system for extending the capabilities of the terminal system.

In general, the principles of the present invention are shown embodied, for illustrative purposes only, in an automatic writing system, the system including a plurality of data inputs of differing code configurations. The data is adapted to be transferred through a data processing system, thus providing coded output signals to a plurality of output data utilizing devices, which may also be of differing code configurations. In data processing systems of the type with which the invention is concerned, it is desirable to provide an operator with a complete system capable of accepting coded data inputs in any code configuration and utilizing a variety of data input devices, as for example, a reader unit, an external data input system, typewriter units and the like. Similarly, it is desirable to permit the operator to process the data such that the data may be stored in a variety of forms, such as a page print, cards, tapes and other coded data forms, or as coded signals.

Thus, the form of the data being presented to the utilizing device may take a variety of forms, as for example, coded data output signals for use in providing a coded output data form, alpha-numeric and function coded signals for use in a page print output means, or purely a parallel data bit output system wherein parallel bits are presented to the utilizer in a coded signal form. With the system of the present invention, a plurality of input sources of data information may be supplied to the data processing system as for example, in the form af an external input of a first code configuration which may take the form of a reader unit or other type of data signal producing means. A second data input source is provided in the form of a reader unit of a second code configuration. Also, a third input source in the form of a conventional automatic typewriter unit having keyboard encoding means for encoding the actuation of the bails within the typewriter unit and also means is provided to encode certain functions provided on the keys of the keyboard and encode these functions whether they be system functions or machine functions in a third code configuration. It is to be understood that further data input sources may be provided in any number in accordance with the requirements of the user.

The data input flow is fed through a common code conversion system whereby each of the plurality of code configurations is made compatible, each with the other or with a further code, and fed through the system to provide a single output code configuration from the code converter. However, the system is provided with a plurality of data utilizing devices which may require different code configurations. Accordingly, a second code conversion system is provided to convert the code being utilized in the system into a plurality of output code configurations, thereby conforming the code of the output data signals to the code configuration of the particular code utilizer. In the representative illustration, the code utilizers may take the form of a page printer, for example, an automatic typewriter or the like, and requiring a first type of code configuration. Also, the output devices may include a punch output requiring a second type of code configuration and a third type of output in the form of data signals may be provided to an external output device requiring a third code configuration.

In accordance with certain other principles of the present invention, features have been provided to minimize the number of errors generated within the system itself in order to increase the reliability of the data being processed through the system. Accordingly, certain principles of the invention, as embodied in the representative illustration, include a system for accepting data input of a particular code configuration and bypassing the conversion system in order to provide data output which is of an identical code configuration to that received. In this way, the heretofore utilized method of accepting a code of a first configuration and, through successive code conversions and reconversions, outputing the first code configuration to a utilizing device has been eliminated. In systems of the prior art type, certain errors are generated within the system due to the repeated encoding and decoding of the data signals alleviating the inherent errors generated in such systems. In the system of the present invention, as representatively illustrated, the inherent errors generated in the prior art systems are alleviated, due to the fact that the data flow is shunted around the encoding and decoding system in the situation where the desired data output code configuration is identical to that received at the data input.

Also, certain developments have created a demand for a terminal data processing system which is capable of being associated with a master common data processing system wherein data information may be fed into the terminal system and transmitted to the central data processing system through an interface. Accordingly, a system has been provided wherein the terminal unit is capable of receiving data in any particular code configuration and transforming that data into a code configuration which is compatible with a master data processing system. Further, means has been provided whereby the master control system may control the operation of the terminal unit in response to certain signals generated within the master data processing system. Similarly, the terminal system is capable of generating certain "system ready" signals. In this way, the synchronism of the terminal data system may be kept apace with the synchronism of the master data processing system in accordance with either the operation of the data terminal system or the master data processing system. The system, embodying certain principles of the present invention, has been provided with the necessary circuitry to present certain control signals to a master data processing system which may be used in association with the terminal system, these signals being made responsive to certain operations of the terminal system. Accordingly, the master data processing system is capable of controlling the operation of the data of the terminal system and the terminal system is capable of indicating to the master data processing system when the terminal is ready to receive or transmit data.

Accordingly, it is one object of the present invention to provide an improved data processing system which has improved reliability and speed characteristics.

It is another object of the present invention to provide an improved data processing system which is capable of assimilating data inputs of varying code configurations with greater reliability.

It is still a further object of the present invention to provide an improved data processing system which may be programmed to accept data inputs having varying data code configurations and converting these code configurations to a common system code.

It is another object of the present invention to provide an improved code translation system which is highly versatile.

It is still another object of the present invention to provide an improved data processing system which is capable of receiving data inputs from a plurality of input sources having varying code configurations and transforming the code configurations of the input sources to varying output data code configurations.

It is still a further object of the present invention to provide an improved data processing system which is capable of receiving a plurality of sources of input data of varying configurations and selectively converting the code of certain of the data input sources and selectively transmitting other code configurations of other data input sources of a plurality of output devices and selectively connecting the data sources to certain output devices in accordance with the particular code configuration.

It is still a further object of the present invention to provide an improved terminal data processing system which may be reliably interconnected with a master central data processing system through suitable interfacing circuits to provide compatibility between the two systems.

It is still another object of the present invention to provide an improved terminal data processing system which is adapted to be associated with a master central data processing system through a suitable interfacing system wherein the master data processing system is capable of controlling the operation of the terminal system and the terminal system is capable of generating response signals for the central data processing system to indicate the condition of the terminal data processing system, thus increasing the reliability of the systems.

It is still a further object of the present invention to provide an improved data processing system which is capable of receiving inputs of varying code configurations from different sources and converting the input code configurations to a common code prior to storage of the information within the system.

It is still a further object of the present invention to provide an improved method of clocking information into a data processing system and particularly into a storage sub-system thereof.

It is still a further object of the present invention to improve methods of and apparatus for encoding machine and system functions in a data processing system.

It is still another object of the present invention to provide an improved method and apparatus for selectively enabling certain operations of a data processing system in response to selected modes of operation of the system.

It is still a further object of the present invention to provide an improved apparatus for alleviating spurious signals generated in certain switch actuated operations of a data processing system.

It is still another object of the present invention to improve the reliability of a data processing system in providing control and signal pulses for system and machine functions of the data processing system, wherein the system is not disabled during system and machine functions of extremely long duration.

It is still another object of the present invention to provide improved data processing system wherein the system for enabling the effect of character operations of the data processing operation in response to the operations of certain portions of the data processing mechanism are greatly enhanced.

It is still another object of the present invention to provide an improved data processing system wherein the dilatory effects of electrical and/or mechanical switch noise is alleviated by a method of integrating certain portions of the switch pulse.

It is still another object of the present invention to improve the storage capabilities of a data processing system wherein the input data information is impressed on a storage circuit by enabling a transfer means with a persisting enabling pulse, thereafter resetting the storage circuits and clocking information into the storage circuits through the transfer means, whereby the enabling pulse disables the transfer means from passing further pulses therethrough.

It is still another object of the present invention to provide a greatly simplified system of programming a data processing system to accept incompatible codes from various data input sources.

It is still a further object of the present invention to enhance the characteristics of a decode system by segregating certain information channels on a multichannel, parallel data, writing system code into a plurality of segments for balacing the input circuits of the decode system.

It is still another object of the present invention to improve the methods of converting a plurality of coded digital input signals into a single digital signal, the single signal representing the combination of the coded input signals.

It is still another object of the present invention to improve the methods of deriving a parallel bit, coded signal configuration from a single digital input signal for use in a data processing system.

It is still another object of the present invention to provide an improved system adapted to be utilized in a data processing system for selecting one of a plurality of input sources of data information signals wherein the undesired source of signal is inhibited by a selector signal generated in response to certain operations of the writing system.

It is still a further object of the present invention to provide an improved method and apparatus for selecting desired logic circuits to be energized by a particular code configuration by sensing a selected portion of the code and generating selected enabling signals in response to the selected codes.

It is still a further object of the present invention to improve the system of clocking information into a data processing system whereby only a single operation is required to synchronize a certain plurality of operations of the system.

It is still a further object of the present invention to improve clocking systems for use in a data processing system wherein a single operation of the system is utilized in timing a certain plurality of operations of the system and wherein means is provided to inhibit certain portions of the sequential operation of the clocking system to adapt the system to operations of longer duration than certain other operations of the data processing system.

It is still another object of the present invention to improve the clocking systems utilized in an automatic data processing system wherein means is provided for generating a plurality of sequential time duration pulses of a predetermined spacing and includes means for lengthening the spacing between certain of the pulses.

It is another object of the present invention to improve the clocking systems as described above wherein the clocking system further includes means for storing the end of one of the pulses and feeding the stored pulse to a pulse transfer means and further providing means for selectively enabling and disabling the transfer means.

It is another object of the present invention to improve clocking systems utilized in conjunction with data processing systems wherein means is provided for generating a plurality of sequentially timed pulses of predetermined timed spacing, the timing system being adapted to be started in response to a system operation and one of the sequential pulses being stored and transferred to a subsequent pulse generator through a pulse transfer means. In the timing system, the pulse transfer means is selectively enabled and disabled to lengthen the duration between the stored pulse and the subsequent pulse and further includes means for resetting the storage device in response to the generation of the subsequent pulse in the same timing sequence or a previous pulse in a subsequent timing sequence.

It is still a further object of the present invention to provide an improved and highly reliable automatic feed system for data information storage means.

It is still another object of the present invention to provide an improved and highly reliable data information automatic feed system including storage means for continuously feeding the data storage means through the automatic feed system until the storage means is reset.

It is still another object of the present invention to provide a highly reliable data information automatic feed system wherein means is provided for automatically resetting the storage means.

It is another object of the present invention to provide a data processing system which is adapted to be utilized in conjunction with another data processing system with an improved means for signaling a selected mode condition of the first data system.

Other objects, features, and advantages of the present invention will become apparent from the subsequent description and the appended claims, taken in conjunction with the accompanying drawings, in which:

FIG. 1 is a block diagram schematically illustrating a complete data processing system including an input section comprising an external input, a reader input and a typewriter unit, a dual conversion code converter section, and an output section including a printer output an external output and punch output;

FIG. 2 is a block diagram schematically illustrating the relative interconnections between the clock pulse generator system, the mode I and mode II control systems and the feed card system;

FIG. 3 is a block diagram schematically representing the interconnections between a reader control circuit, a print punch circuit, a select register circuit and a response generator circuit;

FIG. 4 is a schematic diagram of a preferred embodiment of a monostable pulse producing means, in the form of a single shot multivibrator, adapted to be utilized in certain portions of the data processing system;

FIG. 5 is a schematic diagram of a preferred form of a power driver circuit which is adapted to be utilized in conjunction with certain devices having large current requirements;

FIG. 6 is a schematic diagram of a preferred form of gating device, specifically illustrated as a norgate, which is adapted to be utilized in the logic circuits of a data processing system;

Figure 18:
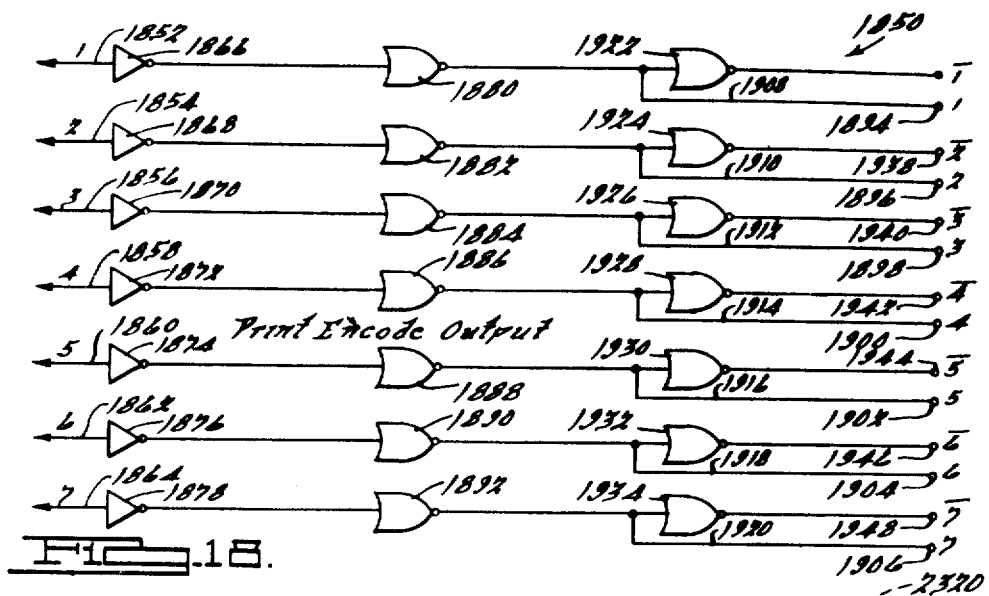
Figure 21:
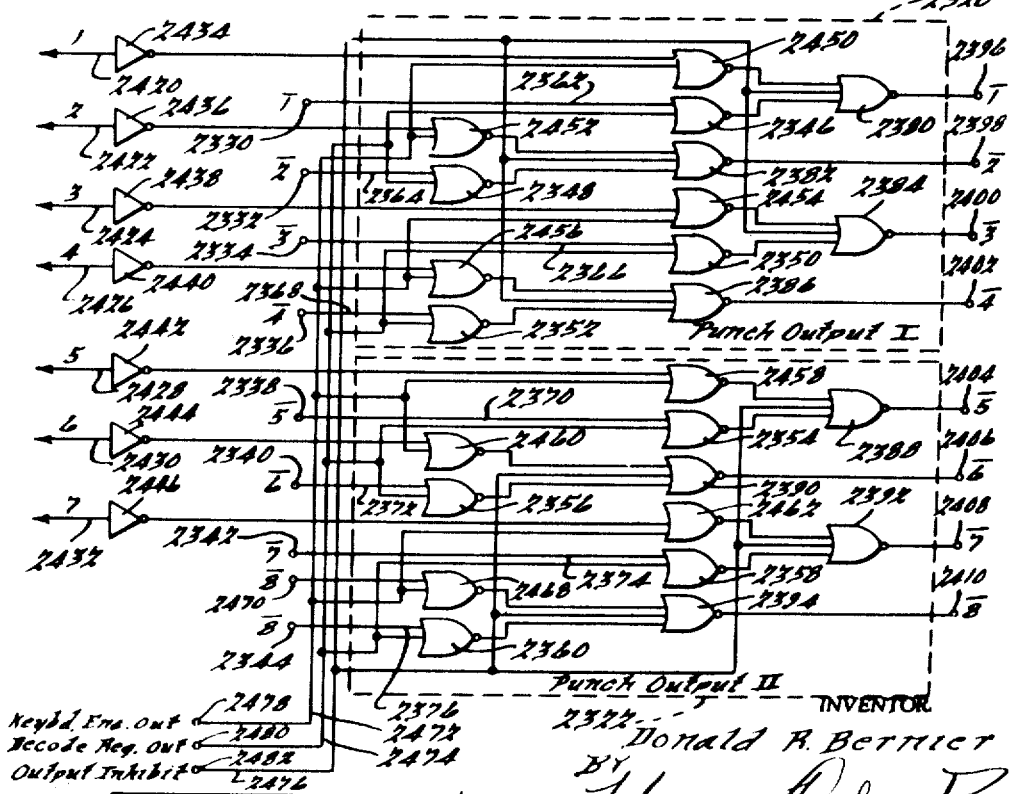

FIG. 7 is a schematic diagram of another preferred form of monostable pulse producing circuit which is responsive to a single input pulse thereby eliminating subsequent input pulses for a predetermined length of time. The monostable pulse producing circuit is representatively illustrated as a switch trigger circuit which is adapted to be utilized in providing an output pulse in response to the actuation of certain switches utilized in a data processing system;

FIG. 8 is a schematic diagram of a preferred form of gating circuit specifically including an integrating gate which is adapted to integrate a series of input pulses to produce a single output pulse;

FIG. 8a is a schematic diagram of another preferred form of gating circuit and particularly illustrating a diode orgate;

FIG. 9 is a schematic diagram of a preferred emitter follower circuit and specifically is illustrated as an NPN emitter follower;

Similarly, FIG. 10 is an illustration of a second preferred form of emitter follower circuit but utilizing a PNP type transistor;

FIG. 11 is a schematic diagram of a preferred form of amplifier which may be utilized in certain encoding circuits of a data processing system;

FIG. 12 is a schematic diagram of a preferred form of differentiator circuit specifically illustrating a plural input, single output differentiator utilized in producing a single output pulse in response to any one of a plurality of input signals; and FIGS. 13 to 25 comprises a schematic diagram of the details of a complete data processing system incorporating certain features of the present invention in which;

FIG. 13 is a schematic diagram of the input section of the data processing system and particularly illustrating the input circuit configurations of an external input source of data, a reader unit utilized as a source of input data, and a portion of a keyboard source of input data for encoding certain switch functions on the keyboard of a typewriter unit;

FIG. 14 is a schematic diagram illustrating the remainder of the keyboard input logic circuits specifically including encoding circuits for the certain machine functions and bail switches of the typewriter unit and further illustrating the storage register logic circuit including the clocking circuits for clocking information into the storage register circuit;

FIG. 15 is a schematic diagram of an "X" address logic circuit, a "Y" address logic circuit, and a block diagram illustrating the relationship of the "X" and "Y" address logic circuits with a decode matrix circuit, a print encode matrix circuit and a punch encode matrix circuit;

FIG. 16 is a schematic diagram illustrating a portion of the specific circuit details of the decode matrix circuit of FIG. 15 wherein sufficient details of the circuit are illustrated to extrapolate the remainder of the circuit;

FIG. 17 is a schematic diagram illustrating a portion of either the print encode matrix or the punch encode martix of FIG. 15, the two being identical, wherein the remainder of the circuit is substantially identical to that shown insofar as providing output codes to the respective output channels are concerned;

FIG. 18 is a schematic illustrating the print encode output logic circuit which is adapted to receive coded signals from the print encode matrix and feed these signals to the print output system of the data processing system;

FIG. 19 is a schematic diagram illustrating an output decode I logic circuit and an output decode II logic circuit which are utilized in decoding both the machine functions and the system function codes respectively;

FIG. 20 in a schematic diagram illustrating the output logic circuits for the machine function solenoid system and the bail solenoid system which are utilized in actuating certain operative portions of a typewriter unit which may be incorporated into a data processing system;

FIG. 21 is a schematic diagram illustrating the punch output I logic circuit and the punch output logic circuit, the logic circuits being adapted to receive input signals from both the punch encode matrix and directly from the decode register circuit described in conjunction with FIG. 14;

FIG. 22 is a schematic diagram illustrating the punch output circuit and particularly the punch output logic circuit and the solenoid circuit thereof;

FIG. 23 illustrates the mode control I logic circuit and the mode control II logic circuit which is adapted to control the mode of the data processing system in response to signals generated either within the system or from an external system;

FIG. 24 is a schematic diagram illustrating a reader control circuit which is adapted to provide clock start signals to start the clocking circuit and also an external input interlock circuit to provide an interlock signal in response to the operation of the data processing system; and FIG. 25 is a schematic diagram illustrating the print punch which is adapted to enable or disable the printing and punching systems of the data processing systems and also is adapted to provide ready signals to a select register circuit wherein the select register circuit generates control signals to be fed to a response generator circuit also illustrated in FIG. 25, the response generator circuit providing an output signal to a central data processing system to indicate the readiness of the terminal data processing system.

DESCRIPTION OF THE BLOCK DIAGRAM

Referring now to the drawings, and particularly to FIGS. 1, 2 and 3, there is illustrated a block diagram of one preferred embodiment of an input/output system incorporating certain principles of the present invention. FIGS. 1, 2 and 3 illustrate the flow of data from a plurality of input units 100 through a storage register section, a dual conversion code converter 102, thence to a plurality of output sections including a print output 104 and a punch output 106. The input section 100 includes an external input 110 which may take the form of any source of parallel bit, coded signals which normally would have from one to eight channels, as is common in the art. One such external source of coded data signals may take the form of an external reader unit which is capable of providing bits of data in a parallel form, the bits being fed to a decode register 112, 113 through a cable 114. The decode register stores the parallel bits of data prior to their being passed forward into the code conversion portion 102 of the system. The external input 110 and the decode register 112, 113 are interconnected by means of a plug and jack arrangement whereby the incoming code from the input 110 may be prearranged in its storgae in the decode register section 112, 113 by merely changing the connections between the input 110 and the decode register 112, 113.

The system has been provided with a second input from a reader unit 118 which is generally of the conventional type, having a plurality of one to eight channels. in the preferred embodiment, the reader unit generally takes the form of a plurality of photo diodes (not shown) forming the pickup which is capable of sensing holes or lack of holes punched in a coded information means, in the form of a tape or card. It is to be understood that the system does not require any particular type of pickup and may include a magnetic sensing system for sensing coded magnetic portions on a support device or any other type of data storage means. The output of the reader unit is fed through a reader amplifier to provide the necessary current to drive the circuit components in the decode register. The photo diodes and reader amplifiers have been representatively illustrated as a reader board 120, the output of which is fed to the decode register 112, 113 through a cable 122. Thus, the data bits from the reader unit 118 are stored in the decode register unit 112, 113 until such time as certain control functions within the system strobe the information forward from the decode register unit.

A third input to the decode register 112, 113 has been provided from a printed character and machine function unit which may take the form of an electric typewriter or the like, and the coded information from a keyboard encoding circuit 126 is fed to the decode register units 112, 113 by means of a plurality of cables 128, 130. As is well known in the art, the common electric typewriter unit 126 comprises a set of bail switch means for encoding the characters of the typewriter unit, which encoding means has been shown for illustrative purposes as a plurality of bail switches. The particular bail switches are actuated by the keys of the keyboard and for each key a particular code of bail switches has been provided, hereinafter referred to as printer output switch means 130, the plurality of coded signals being fed to a keyboard encode circuit 132 which provide the necessary coded signals for the decode registers 112, 113.

The printer output switches 130 also include a plurality of machine functions which are inherent in the operation of the typewriter unit, as, for example, index, space, tab, upper shift, lower shift, etc. A plurality of switches have been provided to sense the movement of certain portions of the typewriter unit which are utilized in performing the above mentioned machine functions thereby providing an output signal which is indicative of the occurrence of these machine functions. These switches, along with the printer output switch means, may take the form of reluctance switches, read switches or the like. The output of the machine function output switches is fed to the keyboard encode circuit 132 through the cable 134, thereby encoding the particular machine functions being performed.

The typewriter unit has been further provided with certain control switches as, for example, start-stop, printer on, punch on, form feed, keyboard on, etc. switches, and in order to punch these machine functions into a punch unit and to operate the mechanisms in the respective output or input unit, it is necessary that the functions be encoded into a code which is compatible with the output punch unit or the particular device to be controlled. Accordingly, a plurality of control switches 138 have been provided which provide a coded output signal upon the actuation of the particular system function codes. These output signals fed to a plurality of switch triggers 140 by means of a cable 142, the switch triggers providing a single output signal for each actuation of the control switches 138. The switch triggers 140 have been provided to eliminate any switch bounce which may be present in the system function control switches, thereby eliminating spurious signals from the system control switches. The output of the switch triggers 140 are fed to an encoding circuit in the form of a keyboard encode logic circuit 142 which receives the system function signal and encodes the signal into a compatible code configuration with the keyboard encode logic circuit 132. The output of the function keyboard encode circuit 142 is fed to the keyboard encode circuit 132 by means of a cable 146.

The information stored in the decode register 112, 113 has been split into two sections consisting of decode register I 112, which is fed information data from four of the channels of the input sources and includes bits in decode register output channels 1, 2, 3 and 7, and a second decode register II circuit 113, which contains the second four channels or bits of information and includes decode register II circuit 113 output channels 4, 5, 6 and 8. In the preferred system, channels 1, 2 and 3 and 4, 5 and 6 are utilized as information channels, channel 7 is a parity channel, and channel 8 is an auxiliary channel for a purpose to be hereinafter explained. Output information on four output channels of the decode register I logic circuit is provided on a plurality of conductors or cable 148 and the information on the other output channels from the decode register II logic circuit 113 is provided on cable 150. The information in the decode registers 112, 113 is controlled by means of a plurality of clocked control signals from a clock control circuit to be hereinafter explained, whereby an initial clock control pulse is fed into the decode register circuits 112, 113 to initially reset all of the circuits therein. A second clock control signal is fed into the decode register circuits 112, 113, in the preferred embodiment, which is an inversion of the original resetting clock control pulse, to allow the information being fed to the decode register circuits 112, 113 to be stored therein.

As stated above, the outputs of the decode registers 112, 113 have been broken into two components consisting of four channels each, channels 1, 2, 3 and 7 consisting of an "X" portion and channels 4, 5, 6 and 8 consisting of a "Y" portion. Referring first to decode register circuit 112, a plurality of parallel output signals are impressed on cable 148 and fed into an "X" address encoder 156. The "X" address encoder 156 converts the parallel encoded signals into a single pulse, which is indicative of the particular channels energized. For example, if an input code having a bit in channels 1, 2 and 3 is received at the "X" address encoder 156, an output signal will be provided at a single output terminal from the "X" address encoder 156. When the single output terminal is true, a bit in channels 1, 2, 3 is signified and all of the other output terminals of the "X" address encoder 156 will be false.

The output of the second decode register section 113 is fed to a "Y" address encoder 158 through the cable 150, the "Y" address encoder 158 being similarly interconnected to provide a single output pulse for each parallel coded input signal configuration. As stated above, channels 4, 5 and 6 are the only channels encoded in the "Y" address encoder 158, however, the "Y" address encoder 158 may be expanded to include channel 8 by providing an additional number of circuit elements. Thus, for a parallel coded input signal configuration, a single output pulse will be provided at the output terminal and the rest of the output terminals will be false.

The outputs of the "X" address encoder 156 and the "Y" address encoder 158 are fed to a decode matrix 160 by means of conductors 162 and 164 respectively. The decode matrix 160 is formed of a plurality of lines of input terminals, hereinafter referred to as the "X" input terminals, and a plurality of columns of input terminals, hereinafter referred to as the "Y" input terminals. The "X" and "Y" input terminals are interconnected by a plurality of circuit elements in a matrix configuration whereby the coincidence of a single "X" address encoder output signal and a single "Y" address encoder output signal will provide a single output signal from the decode matrix 160. Thus, the decode matrix 160 provides an output signal on a particular output terminal, which corresponds to the various combinations of each of the output signals from the "X" address encoder and the "Y" address encoder 158.

Thus the eight possible coded signals from the "X" address encoder 156 have been combined with the eight possible codes from the "Y" address encoder 158 through the decode matrix 160 to a plurality of 64 output codes. Each of the 64 output codes corresponding to the encoding of either an alpha-numeric character, a machine function or a system function.

The output of the decode matrix 160 is selectively interconnected with a print encode matrix 168 by means of a cable 170, the interconnection being made through a plurality of plug and jack devices to enable the operator to selectively change the encoding of the output signals from the decode matrix 160. The 64 output signals on conductors 170 are fed to the input terminals of the print encode matrix 168 which, in the preferred embodiment, takes the form of a diode matrix having a plurality of 64 input terminals and from one to seven output terminals for each of the input terminals. The input terminals are connected to the output terminals through a plurality of diode legs whereby the input singal is broken down into its constituent parts by the provision of the necessary number of diode legs in the respective channels. For example, if an input singal indicates a bit in channels 1 through 7, a plurality of 7 diode legs will be connected to the input terminal to provide 7 output pulses at a plurality of 7 output terminals. Similarly, the remainder of the input terminals are connected to the desired configuration of output terminals through similar diode legs. The output of the print encode matrix is fed to a print encode output matrix 174 by means of a plurality of conductors 176, the print encode output circuit 174 providing the necessary drive current to the output circuit.

The decode matrix is also connected to a punch encode matrix 178, which is similar in configuration to the print encode matrix 168, by means of a plurality of conductors 180. As in the situation with the print encode matrix 168, the punch encode matrix 178 is connected to the output conductors 180 of the diode matrix 160 through plug and jack devices whereby the code from the decode matrix 160 may be selectively changed through the punch encode matrix by merely shifting the interconnections between the diode matrix 160 and punch encode matrix 178. Thus a separate code may be utilized for the print output as derived from the print output circuit 174 and still a further code may be utilized for the punch output as derived from a punch encode output circuit 184. The punch encode circuit 184 is connected to the punch encode matrix 178 through a plurality of conductors 186, the punch encode output circuit 184 providing sufficient driving current for the output circuit to be hereinafter explained.

Referring first to the print encode output signals, the output signals of the print encode output circuit 174 are fed to the print decode and output circuit 104 by means of a plurality of conductors 188 thereby generating coded signals to operate the various portions of a print output mode and to operate various functional portions of the system.

As seen from the above description, the output signals from the print encode output circuit 174 include coded character signals, coded machine function signals and coded system function signals. In the operation of the system, it is desirable to discriminate between the various coded signals described above to direct the respective groups of codes to the proper output device. Accordingly, each group of coded signals, as defined above, have been provided with a characteristic signal configuration in order that the system may differentiate between the various codes. In the preferred embodiment and describing only one example of a characteristic code, each alpha-numeric character code has been provided with a code configuration which does not include a channel 7 code. Thus, any output code from the print encode output circuit 174, which does not have a bit in channel 7, will be designated as an alpha-numeric character code to be directed to the printer unit itself.

Similarly, a code which designates a system function will be provided with a channel 7 code and also a bit in channel 1, and contrariwise a machine function code will be provided with a bit in channel 7 and no bit in channel 1. The system has been provided with means for recognizing each of the three characteristic codes to direct the particular code configuration to its proper output system.

Referring first to the character codes or those without a bit in channel 7, these codes are fed through a plurality of conductors 190 to a power driver circuit 192 by means of a plurality of conductors 194, the power driver circuit providing the necessary current to actuate bail solenoids contained in a printer unit 196. The power driver circuit 192 has been provided with an enabling circuit which is energized only when there is not a bit in channel 7, thus enabling the power drive circuit for the character codes, as described above. The power driver circuit also contains a reader clutch power driver to pick the reader clutch thereby advancing the reader to the next line of codes in the coded tape. The particular control circuits sensing the presence or existence of bits in channels 1 and 7 will be described in conjunction with the description of FIG. 3.

The mechine function coded signals are fed by means of a plurality of conductors 198 to an output decode circuit 200. The output decode circuit 200 receives the coded machine function signals from the print encode output circuit 174 and decodes the signals in accordance with the particular code configuration received to provide individual output signals for each of the machine functions such as tab, space, back space, carrier return, etc. The output signals of the output decode circuit 200 are fed through a power driver circuit 202 to the particular actuating solenoids or other actuating means contained within the printer 196 by means of a plurality of conductors 204, thereby providing the necessary driving current to actuate the machine function solenoids.

As in the situation with the power driver circuit 192, an enabling signal is fed from a circuit to be described in conjunction with FIG. 3, which enables the machine function decode circuit in the event that a bit is absent from channel 1 and a bit is present in channel 7. The system function codes present on conductors 198 are sensed by an output decode circuit 208, which is enabled by a system function decode gating circuit similar to the enabling circuits to be described in conjunction with the character code and machine function code circuits. The system enabling circuit is energized by a bit in channels 1 and 7 as discussed above, and the output of the output decode circuit 208 is fed to the respective control circuits by means of a plurality of conductors 210, to be hereinafter described.

Referring now to the punch output codes, the coded signals from the punch code output circuit 184 are fed to a two-section punch output circuit 214, 216. The punch output circuits 214, 216 also include inputs from the decode registers 112, 113 by means of a plurality of conductors 218 and 220. The punch codes impressed on conductors 218, 220 have identical code configurations to those received at either the external input 110 or the reader unit 118. As stated above, these codes have not been encoded and subsequently decoded through the dual conversion code converter 102 due to the identity of code configuration between that required at the output and received at the input circuits. The by-passing of the decoding and encoding circuits has been provided in the event that it is desired to punch the same code in the output circuit as was received in the input circuit, thereby eliminating the possibility of error due to the encoding and decoding operation. The punch output circuits 214, 216 also include enabling input signals which permit the operator to choose which of the inputs, the punch encode output signals or the decode register output signals, are to be fed through the punch output circuits 214, 216.

These input enabling circuits are contained in the system to be described in conjunction with FIG. 2 and provide an enabling signal to enable either the input signals from the punch encode matrix or the signals being received from the decode registers 112, 113 to be passed through the punch encode output logic circuit 184. The output from the punch output circuit 214, 216 is fed either to an external output circuit 224, which may take the form of an auxiliary punch unit or any other type of output unit, and the output from the punch output circuits 214, 216 are also fed to a power driver circuit 266 which provides the necessary current to drive the actuating coils in a punch unit 228.

Referring now to FIG. 2 there is illustrated a control system for the input/output data processing system described above. The control system generally comprises a clock circuit 230, a mode I control circuit 232, a control II mode circuit 234, and a feed card circuit 236. The operation of the above described data system is controlled by means of the clock circuit 230 which generally comprises a plurality of means for generating clock pulses which are of a specified duration and spaced one from another by a predetermined time interval. The clock circuit may be initially started by means of a plurality of start signals, as for example, a manual start signal by manually operating the keyboard, a reader clock start signal which is generated within the reader unit itself.

The clock circuit provides an initial clock pulse, hereinafter referred to as a control A clock output pulse, which is the initial starting pulse and also serves to reset the decode register system circuits 112, 113. The control A clock pulse also provides a signal to enable the decode register to store the information from the various input devices, as for example, the external input 110, the reader unit 118 or the keyboard. The clock circuit contains a pair of clock pulse generating means which generate a control A pulse and a control B pulse, the latter pulse being utilized to switch the triggers controlling the system functions such as print on, etc. The control A pulse is adapted to reset the circuits in the decode register circuits 112, 113, and also to enable the decode register circuits 112, 113 to store information being fed thereto from the various input units. The second pulse is a control B pulse, which is utilized in actuating the select register, to be hereinafter explained, and the control B pulse is further utilized in starting the control C pulse. The control C clock pulse generating circuit is utilized in clocking certain response generator functions and to synchronize the operation of the interface circuit, and the control D clock pulse generating circuit is utilized in controlling certain functions being performed in the system by providing a gating or enabling pulse for the system function solenoids, as one example.

A feed card circuit 236 is provided and utilized in controlling the feeding of cards, tapes and other coded data storage means through the punch of the system, or to position cards within the punch unit whereby certain codes may be punched on the card by means of a punch unit. Similarly, it is desirable to manually or automatically control the feeding of tape through the punch units and accordingly, certain circuitry has been provided in the feed card system to enable the operator to feed coded tape through the reader unit or through the punch unit. Thus, the operator controlling the terminal data processing system or a master control system is able to automatically control the feeding of coded information means through the punch unit.

The two mode control circuits 232, 234 have been provided to control the various modes of the system as for example, to enable the keyboard during the period when a manual input is being provided and to disable the reader and auxiliary input during the manual input, to control the output punch units and cycle the reader clutch in accordance with the control D signal, to correlate the various operations of the system with the operation of an interface unit, to enable the clock to be started when certain codes are generated which do not otherwise start the clock, as for example, the end of address and block signals and also to provide certain inverted codes as for example, to provide a $\overline{\text{control A}}$ and a control A from the same input signal. Further examples of the functions of mode control I 232 and mode control II 234 circuits, including the interrelation thereof and the provision of control signals to correlate the operation of the complete system, will be more fully explained hereinafter.

Referring now to FIG. 3, there is illustrated a control circuit 240 which generally comprises a reader control circuit 242, a print and punch control circuit 244, a select register circuit 246 and a response generator 248. The reader control circuit 242 contains certain logic circuits to start the clock in response to the operation of the reader and also in response to certain codes generated within the system, as for example the operation of the reader start switch, and to provide a reader ready signal to actuate the select register circuit 246. Also, the reader control circuit provides an output pulse to signal the select register circuit 246 that the reader has been turned on. The reader control circuit further provides an interlock signal for the external input, as will be hereinafter explained, to signal the external source of data that certain functions being performed in the terminal system have not been completed.

The printer and punch control circuit 244 provide enabling signals to be fed to the printer gate circuit and the punch gate circuit in response to printer on-off signals and punch on-off signals and these signals are coordinated with certain other input signals, as for example the control D pulse and an output inhibit pulse. Also, the signal to enable the machine functions circuit or output decode I circuit 200 is generated in response to the sensing of a bit in channel 1 or a lack of a bit in channel 1, as described in conjunction with output decode circuits 200, 208. Also, printer ready and punch ready signals are generated in response to a printer-on code or a printer-on switch signal in the case of the printer ready signal and a punch-on code or a punch-on switch in the case of the punch ready signal. These latter signals are fed to the select register to signal the select register 246 that the printer or punch has been actuated.

In the system of the present invention, means has been provided to adapt the terminal system to be interconnected with a remote master control unit which is capable of controlling the operation of the terminal system described. In certain instances, it is necessary that the system generate a response signal which is indicative of the selection of a particular mode of operation of the terminal system, in conjunction with the ultimate actuation of that mode. For example, if the operator of the master unit signals the above described system to turn the reader on, it is desirable to generate a signal which tells the operator that the reader-on signal has been received and also that the reader has been turned on. To this end, the select register circuit and the response generator circuit have been interconnected to provide a response signal which tells the remote operator that the particular coded signals are being followed by the system. Thus, when the reader has been selected, the reader control circuit 242 will generate a signal which indicates that the reader has been turned on. Similarly, a reader select code is fed into the select register and both indications of the reader-on code and the reader select operation are stored and fed to a response generator. The response generator, in turn, generates a signal which is indicative of the final turning on of the reader or other unit in response to a select signal.

DESCRIPTION OF THE COMMON CIRCUIT MODULES

Referring now to FIGS. 4 to 12 of the drawings, there are illustrated a plurality of schematic diagrams depicting the common circuit modules utilized in building the data processing system to be described hereinafter. The following description of the common circuit modules is provided to facilitate the full understanding of the operation of the system as the description proceeds and to provide brevity of the description inasmuch as one description of each circuit module will be substantially common to all the uses of that particular circuit module in the system. For purposes of simplicity, the voltage levels at various points on the conductors of any circuit will be indicated by a logical zero or one designation. For example, where the voltage at a point is approximately a minus 12 volts, the voltage level will be indicated as being at logical zero. Similarly, where the voltage at the point is approximately zero volts, the voltage level will be indicated as being a logical one signal. In each of the common circuit module figures, the schematic representation of the circuit has been illustrated along with its corresponding symbol, the symbol being placed adjacent the circuit diagram in the same figure.

Referring now to FIG. 4, there is illustrated a monostable pulse producing circuit, in the form of a single shot multivibrator 270, having an A input terminal 272 and a B input terminal 274, and a logical zero output terminal 276 and a logical one output terminal 278. The single shot multivibrator, in the preferred form, consists of a normally conducting PNP transistor 280 and a normally nonconducting PNP transistor 282 interconnected therewith. The transistor 280 includes a collector electrode 286 connected to a negative source of potential, as for example a minus 12 volts, through a collector load resistor 288. An emitter electrode 290 is connected to ground 292 through a conductor 294.

The normally nonconducting transistor 282 also includes a collector electrode 296 connected to a negative source of potential, as for example minus 12 volts, through a second collector load resistor 298. Similarly, the emitter electrode 300 is connected to ground potential through a ground circuit 302 by means of a conductor 304. The normally conducting transistor 280 further includes a base electrode 308 which is connected to a positive source of DC potential, as for example a positive 12 volts, through a resistor 310 in order to enhance the cutoff characteristics of the transistor 280. The base electrode 308 is also coupled to the collector electrode 296 through a conductor 312 and a coupling resistor 314. Thus, in the absence of an input signal, the current flow from the negative potential through resistor 298, resistor 314, conductor 312 and resistor 310 is sufficient to negatively bias the base electrode 308, thereby maintaining transistor 280 in a conductive state.

The transistor 282 is also provided with a base electrode 320, which is coupled to the collector electrode 286 by means of a capacitor 322 and a resistor 324 combination, and a diode 326. With the single shot multivibrator in its stable state, the capacitor 322 is connected at the upper end thereof to a conductor 330, the resistor 324, the collector electrode 286 and emitter electrode 290 of transistor 280, conductor 294 to ground at 292. The opposite side of capacitor 322 is connected through a conductor 332, the diode 326, a conductor 334, a diode 336 to ground potential at ground connection 338. Thus the capacitor 322 is substantially in the discharge state.

When an input pulse switches normally conducting transistor 280 to the nonconductive state, the potential at node 340 between resistors 288 and collector electrode 286 will drop to a minus 12 volts or logical zero level, thereby providing a charging circuit for capacitor 322 from negative 12 volt potential through resistor 288, resistor 324, capacitor 322, a resistor 344, to a positive 12 volt DC potential at terminal 346. With the switching of normally conducting transistor 280 to the nonconductive state, transistor 282 will switch to the conductive state, thereby raising the potential at collector electrode 296 from a minus 12 volts to a zero volt potential or from a logical zero level to a logical one level. This logical one level output is fed from the collector electrode 296 through a conductor 346 to the output terminal 278. Similarly, transistor 280 switching from the conductive to the nonconductive state will cause node 340 to switch from a logical one level output signal to a logical zero level output signal. This voltage at node 340 is fed to the logical zero output terminal 276 by means of a conductor 348. The RC time constant of the charging circuit when the multivibrator is in the unstable state determines the duration of the output pulses generated on output terminals 276 and 278. While the circuit has been described as charging capacitor 322, it is to be understood that charging is generic to charging in one direction or the other, depending on the circuit parameters of the monostable circuit 270.

The base electrode 308 is connected through an input circuit 350 which consists of the input terminals 272, 274, a differentiating circuit 352 and a polarity selecting diode 354, in the preferred use of the single shot multivibrator 270. The input terminals 272 and 274 are normally maintained at a logical zero level and an input pulse fed thereto raises either of the input terminals 272, 274 to a logical one level. This input pulse is fed through the diodes 358, 360 to a node 362 wherein the node 362 is connected to the minus 12 volt potential through a resistor 364 and to ground through a capacitor 366 and a resistor 368.

With the input terminals 272, 274, the minus 12 volt level or at a logical zero level, the node 362 also will be at a logical zero level, thereby charging the capacitor 366 through resistors 368 and 364. With the input pulse of a logical one level appearing at input terminals 272, 274, a capacitor will provide a positive going and a negative going spike at a node 370, the positive half of which is fed to base electrode 308 through a diode 354. This positive spike back biases the base emitter circuit of transistor 280 thereby rendering the transistor 280 nonconductive. As described above, the single shot multivibrator 270 will be switched to its unstable state to produce output pulses at either of output terminals 276 or 278. A symbol 374 has been illustrated at the upper left portion of the figure which is representative of the single shot multivibrator for purposes of this description.

Referring now to FIG. 5, there is illustrated a high gain current amplifier circuit 380 in the form of a Darlington power driver circuit configuration wherein a plurality of PNP transistors 382, 384 are connected between ground by means of a conductor 386 and an output terminal 388 through a load resistor 390. The amplifier circuit is utilized in providing a high current to a load such as the coil of a punch unit, or the like, wherein the transistors 382, 384 are utilized in switching the load current on and off. In the particular circuit illustrated, an emitter electrode 392 is connected to ground through conductor 386 and a base electrode 394 is connected to an emitter electrode 396 of the transistor 384. The collector electrode 398 is connected to the resistor 390 by means of a resistor 400, and the collector electrode 402 of transistor 384 is connected to the resistor 390 by means of a conductor 404. The input circuit comprises an input terminal 406 connected through a diode 408 to a node 410. A series resistance path between a negative source of potential at terminal 412 and a positive source of potential at terminal 414 is provided by means of resistors 416, 418 and 420.

Thus, as the input signal drops from a logical one level to a logical zero level, the potential at node 410 will drop from a logical one to a logical zero, thereby rendering the transistor 384 conductive. The conduction of transistor 384 will provide a conductive path for the emitter-base current of transistor 382 thereby rendering the transistor 382 conductive to provide a current path from the emitter to collector thereof and provide current flow for the load circuit connected to the output terminal 388. A diode 424 is connected between a node 426 and a source of negative potential, as for example, negative 24 volts at terminal 428 to provide arc suppression for the load circuit. A symbolic representation 428 of the power driver circuit has been illustrated above the schematic diagram.

Referring now to FIG. 6, there is illustrated a transistor logic circuit 430, representatively illustrated as a norgate, wherein one or a plurality of input signals are fed to a plurality of input terminals 432, 434, 436 through diodes 438, 440, 442. An output terminal 444 is connected to a collector electrode 446 of a normally conducting transistor 448, in the normal use of the circuit in the system to be hereinafter described. The input terminals are maintained at a logical zero level and a true signal raises the input terminal to a logical one level. This rise in signal level from a logical zero to a logical one drops the output signal level at output terminal 444 from a logical one to a logical zero level, thereby providing an inversion of the input signal. This operation is maintained by the proper choice of magnitude of a plurality of resistors 450, 452, 454, which are connected between a source of negative potential at terminal 456 and a source of positive potential at terminal 458. The resistor 454 is chosen to be relatively large compared to resistors 450, 452, thereby maintaining a base electrode 460 of the transistor 448 at a relatively large negative potential with respect to its emitter electrode 462, the emitter electrode being connected to ground through a conductor 464.

With one of the input terminals at a logical one levl, the juncture 468 between resistors 450 and 452 will rise to approximate a zero potential, or a logical one signal level, thereby rendering the base electrode 450 more positive and switching the transistor 448 to the nonconductive state. With the transistor 448 in a nonconductive state, the output terminal 444 is substantially at a minus 12 volt level or a logical zero level through the connection of the output terminal 444 to the source of negative 12 volt potential through resistor 470. A symbol 474 for the norgate 430 has been illustrated at the upper portion of the figure.

Referring now to FIG. 7, there is illustrated a bistable pulsing circuit or switch trigger 480 having a first combination input and output terminal 482 and a second combination input and output terminal 484. The voltage at the first terminal 482 is controlled by means of a transistor 486 wherein an emitter electrode 488 is connected to ground through a conductor 490 and a collector electrode 492 is connected to a negative source of potential, as for example 12 volts, at a terminal 494 through a resistor 496. Thus the conduction of transistor 486 renders the output terminal at a logical one level and the nonconduction of transistor 486 renders the terminal 482 at the logical zero level. The second terminal 484 is similarly connected to a transistor 498 wherein an emitter electrode 500 thereof is connected to ground through a conductor 502 and a collector electrode 504 is connected to a negative potential at terminal 506 through a resistor 508. The nonconduction and conduction of transistor 498 renders the output terminal between a logical zero level and a logical one level, respectively.

The collector electrode 492 is connected to a base electrode 512 of transistor 498 through a coupling resistor 514 and a base electrode 516 is connected to the collector electrode 504 through a second coupling resistor 518. The base electrodes 512 and 516 are connected to a positive source of DC potential through resistors 522 and 524, respectively. Assuming transistor 486 to be initially conductive, the collector electrode 492 will be at approximately a logical one level thereby rendering the base electrode 512 at a potential very close to the potential of the emitter electrode 500. Thus the transistor 498 will be rendered nonconductive.

If a logical one signal is impressed on input/output terminal 484, the transistor 486 will be rendered nonconductive thereby rendering transistor 498 conductive through the coupling path of resistor 514. Any further logical one pulses at input/output terminal 484 will be ineffective to switch the state of the switch trigger circuit 480, thus rendering the circuit unresponsive to a bouncing input signal at input/output terminal 484. Similarly, if a logical one signal is impressed on input/output terminal 482, the switch trigger circuit will again change in state whereby transistor 484 is rendered conductive and transistor 498 is rendered nonconductive as in the above situation. Further, logical one signals at input/output terminal 482 will be ineffective to change the state of the switch trigger circuit 480. A symbolic representation 530 of the switch trigger circuit has been illustrated at the upper portion of the FIG. 7.

Referring now to FIG. 8, there is illustrated a norgate similar to the norgate described in conjunction with FIG. 6 and further including an integrating circuit in the input logic circuitry. As in the above norgate circuit 430, a plurality of input terminals 532, 534 and 536 are connected to an input node 538 through a plurality of diodes 540, 542, 544. An output terminal 546 is connected to a collector electrode 548 of a transistor 550 and an emitter electrode 552 is connected to ground through conductor 554. A base electrode 556 is connected to the node 538 through an integrating circuit 560 consisting of a resistor 562 and a capacitor 564 and resistor 566 combination connected to a positive source of potential at terminal 564.

With the input terminals 532, 534, 536 at a logical zero level, the capacitor 564 is initially charged whereby the base electrode 556 is at a sufficiently negative voltage to render the transistor 550 conductive. When the input terminals are raised to a logical one level, the transistor is rendered nonconductive thereby lowering the output terminal to a logical zero level through its connection to a negative 12 volt potential through a resistor 570. Any subsequent input pulses at the input terminal will be integrated by capacitor 554 thereby rendering the input pulses ineffective for a predetermined length of time, depending on the circuit parameters of the charging circuit for capacitor 564. A symbolic representation 572 of the norgate integrating circuit 530 has been illustrated at the upper left-hand portion of FIG. 8.

Referring now to FIG. 8a, there is illustrated a further preferred logic circuit 576 in the form of a diode logic circuit, which consists of a plurality of input terminals 578, 579, 580, 582, 584 connected to an output terminal 586 through a plurality of diodes 588, 590, 592 and 594. Thus, if a portion or all of the elements of the input circuit is maintained at a logical zero level and subsequently raised to a logical one level for a true indication, the output terminal will similarly be maintained at a logical zero level and raise to a logical one level, respectively. A symbolic representation 596 of the "or" circuit 576 has been illustrated to the left of the FIG. 8a.

Referring now to FIG. 9, there is illustrated an emitter follower circuit comprising a normally nonconducting NPN transistor 602 including a base electrode 604 connected to an input terminal 606 and an emitter electrode 608 connected to an output terminal 610. A collector electrode 612 is connected to ground through a conductor 614 and the emitter electrode 608 is also connected to a negative source of direct current potential at terminal 620, through a resistor 622. The base electrode is normally maintained at a logical zero level by means of a signal connected to input terminal 606 thereby maintaining the output terminal at a logical zero level due to its connection to the negative terminal 620. When the input terminal rises to a logical one level, the transistor 602 will be rendered conductive thereby raising the potential at output terminal 610 to a logical one level or approximately to ground potential. Accordingly, the output voltage level will follow the input voltage level with an attendant high current gain. A symbolic representation 626 of the NPN emitter follower circuit has been provided at the upper left-hand corner of the figure.

Referring now to FIG. 10, there is illustrated the corresponding PNP emitter follower circuit wherein a normally conducting PNP transistor 630 has its collector electrode 632 connected to a negative source of potential at terminal 634 and an emitter electrode 636 is connected to ground potential through a resistor 638. An output terminal 640 is connected to the juncture between emitter electrode 636 and resistor 638 to provide a logical zero level output signal when transistor 630 is conductive.

A base electrode 640 is connected to an input terminal 642 by means of a conductor 644 and the base electrode 640 is also connected to a negative source of direct current 24 volt potential at terminal 646 through a resistor 648. With the input terminal 642 maintained at a logical zero level, the transistor 630 will be rendered conductive and when the input terminal is raised to a logical one level signal, the transistor 630 will be rendered nonconductive thereby raising output terminal 640 to a logical one level. A symbolic representation 650 of the PNP emitter follower circuit as illustrated in the left portion of the figure.

Referring now to FIG. 11, there is illustrated an encoder amplifier 654 which comprises a normally nonconducting NPN transistor 656 having an input terminal 658 connected to a base electrode 660 through a resistor 662. An emitter electrode 664 is connected to a negative source of DC potential at terminal 666 through a diode 670 and a collector electrode 672 is connected to an output terminal 674 through a conductor 676. The collector electrode 672 is connected to a positive source of potential at terminal 678 through a resistor 680. The output terminal 674 is also connected to ground through a diode 682. With the input terminal maintained at a logical zero level, the transistor 656 will be nonconducting and the positive 12 volt potential will be connected to ground through resistor 680 conductor 676 and diode 682. Thus the output terminal 674 will be at approximately a logical one signal level due to the voltage drop across diode 682. When the input signal is raised to a logical one level, the transistor 656 will be rendered conductive thereby lowering the potential on conductor 676 to a logical zero level and lowering the output terminal to a logical zero level. Thus an inverted output is provided. A symbolic representation 686 of the encoder amplifier 654 is illustrated in the upper left-hand portion of the figure.

Referring now to FIG. 12, there is illustrated a differentiator circuit 690 which comprises a plurality of input terminals 692, 694 connected to an output terminal 696 through a differentiating circuit 698 and a pair of diodes 700, 702. The differentiating circuit generally comprises a capacitor 704 connected at one end thereof to a negative source of potential through a resistor 706 while the other end is connected to ground potential through a resistor 708. A further resistor 710 has been provided and is connected to a negative potential at one end thereof and to the output terminal 696 at the other end. With the input terminals maintained at a negative 12 volt or logical zero potential, the juncture between capacitors 704 and resistor 706 will also be at a logical zero level. When the input signal is raised to a logical one level, the node 712 will also be raised to a logical one level, thereby discharging the capacitor through resistor 708 and providing a positive going output spike at the output terminal 696. Upon discharge of capacitor 704 or the return of the input terminals 690 and 694 to a logical zero level, the capacitor 704 will again charge as indicated. A symbolic representation 716 of the differentiating circuit 698 is provided at the upper left portion of FIG. 12.

DATA INPUT AND STORAGE REGISTER SUBSYSTEMS

Referring now to FIGS. 13 and 14, there is illustrated a schematic diagram of a plurality of data input circuits and a storage register circuit which is adapted to store the information being transferred through the data input circuits. While three sources of input data will be discussed in conjunction with a preferred embodiment of the present invention, it is to be understood that any number of sources of data may be interconnected into the system and, correspondingly, any number of output utilizing devices may be provided to receive the data. Accordingly, the discussion of three sources of data is not intended to belimited but rather is described purely for illustrative purposes and to provide a full understanding of the details of the invention.

As stated above, the system is representatively illustrated as having three inputs, the first of which is an external input 730 which may take the form of an auxiliary reader unit or any other inputting device which provides a parallel bit sequence of information data and may include coded tape or cards, or coded magnetic paper and the like. The data bits are fed to a plurality of input terminals 732 and 746 which correspond to channels 1 to 8 respectively. It is to be understood that while 8 channels are illustrated, any number of channels may be utilized, as is common in the art. The input terminals are connected to a plurality of input conductors 748 to 762 of cable 764, the cable being connected at the other end thereof to a plurality of differentiator circuits 770 to 784. It will be noted that the channel 1 conductor 748 is connected to the differentiator 770, the channel 2 conductor 750 to differentiator 772, channel 3 conductor 752 to differentiator 774, channel 5 conductor 756 to the differentiator 776, the channel 4 conductor 754 to the differentiator 778, the channel 6 conductor 758 to the differentiator 780, the channel 7 conductor 760 to differentiator 782 and the channel 8 conductor 762 to differentiator 784.

The connections from the cable 764 to the respective differentiators 770 to 784 are provided through a plurality of plug and jack arrangements whereby the operator may selectively interchange the connections between channels and differentiators to thereby change the code between the external input and the remainder of the system, as will be hereinafter explained. The outputs of the respective differentiators 770 to 784 are connected to the trues sides 790 to 804 of a plurality of bistable storage circuits 806 to 820. The storage circuits 806 to 820 are representatively illustrated as a plurality of flip flop circuits, but it is to be understood that any type of storage device may be utilized in this situation. The flip flop units 806 to 820 also include a plurallity of not true sides 826 to 840 which are connected to a plurality of not true output terminals 824 designated by $\bar{1}, \bar{2}, \bar{3}, \bar{7}$, etc. Similarly, the true sides 790 to 804 are connected to a plurality of true output terminals designated 1, 2, 3, 7, etc.

It will be noted that the flip-flop units 806 to 812 have been grouped in one portion of the system and the flip flops 814 to 820 have been grouped in a second portion with channels 1, 2, 3 and 7 comprising the first channel section, and channels 4, 5, 6 and 8 the second section. In the particular system illustrated, channels 1, 2, 3 and 4, 5, 6 are information channels, channel 7 a parity channel, and channel 8 an auxiliary channel provided for the use of the operator in the event additional functions are desired to be programmed into the system. The separating of the first section from the second section has been made in order to facilitate the addressing of the "X" address encoder 156 and the "Y" address encoder 158, to be hereinafter explained.

Referring back to the external input terminals 732, 746, in the preferred system the input terminals are normally maintained at a logical zero signal level during the peroid when data is not being fed into the system. When a bit is present on any one channel or any of a plurality of channels, the signal level, at the respective input terminals 732, 846 to raised to a logical one level, this signal being fed to the differentiator 770 to 784. Thus, if a bit is present in any particular channel, its respective input conductor will be maintained at a logical one level for a predetermined length of time that the reader is reading the hole in the tape or other data information device being inputted.

As is well known in the art, the immediate feeding information forward through the system as soon as it is received from a data input devce would result in a haphazard transmission of data and precipitate many errors in the processing of the data through the system. Accordingly, it is necessary to precisely clock information through the data processing system in order to insure that each character code, machine function code or system function code is passed forward in a precise manner thereby substantially eliminating the possibility of error and also maintaining the system in sequence with its operational devices. Accordingly, a pulse clocking system has been provided, to be more fully discussed in conjunction with FIG. 23, corresponding to the clock system contained in blocks 230 and 236 of FIG. 2. The clock system of FIG. 2 generates a plurality of precisely timed clock pulses of a predetermined duration, to be hereinafter referred to as "control A pulse," "control B pulse," "control C pulse" and "control D pulse."

As stated in conjunction with FIG. 2, the control A pulse is primarily utilized to reset the decode register section, specifically illustrated in FIG. 14, and to strobe information through the differentiator circuit preceding the decode registers in the flow of data through the system. The control A pulse as generated consists of a signal which is normally maintained at a logical zero level and is raised to a logical one level for a predetermined period of time, of the order of 300 microseconds. Upon the completing of the clock A pulse, the signal level again drops to a logical zero level until the next clock A pulse is generated. An inverted counterpart of the control A pulse is fed from the clock circuit of FIG. 23 to an input terminal 850 and the normal control A pulse is fed to an input terminal 852, the latter pulse to be hereinafter referred to as a "reset pulse."

The pulses on terminals 850 and 852 are in time phase, that is, the pulse on terminal 850 drops to a logical zero level at precisely the same time that the pulse on terminal 852 rises to a logical one level. Accordingly, when a bit is fed to the external input terminals 732 to 746, the respective input conductors 748 to 762 are correspondingly raised to a logic one level. Thus, the rise in signal level of the control A pulse will not effect the corresponding differentiator circuits 770 to 784 and an output pulse will not be generated to set the respective flip flops 806 to 820. However, the conductors which have not been raised to the true or logic one level will permit the rise in the control A pulse to generate a setting pulse from the respective differentiators 770 to 784 and the respective flip flops 806 to 820 will be set. The true bit signal levels on conductors 748 to 762 are maintained at a logical one level for a period of time which is longer in duration than the completion of the control A pulse. Thus, when the reset pulse is impressed on terminal 852, the pulse is fed, by means of conductors 854, 856, to the two sections of flip flop units 806 to 812 and 814 to 820 respectively to reset the flip flop units and eliminate the previously stored coded character therefrom. Simultaneously, the inverted control A or $\overline{\text{control A}}$ pulse being impressed on terminal 850 is fed by means of conductors 860, 862 and 864 to the two sections of differentiator circuits 770 to 776 and 778 to 784. The $\overline{\text{control A}}$ pulse permits the differentiator circuits 770 to 784 to charge if all inputs are at a logic zero level until such time as the trailing edge of the pulse rises to a logical one level, thereby enabling the capacitors contained in differentiator circuits 770 to 784 to discharge.

However, if the input conductors 748 to 762 to the differentiator circuits 770 to 784 have been maintained at a true or logical one level, the input circuit contained within the differentiator circuits 770 to 784 will not be able to rise and discharge the capacitors. Thus, if a true bit has been received at any differentiator, the differentiator will not produce an output pulse to its respective flip flop unit 806 to 820, thereby leaving the respective flip flop unit 806 to 820 in its reset state. Contrariwise, if a flip flop unit 806 to 820 has not been set an indication of a true bit in that channel will be recorded.

By way of further explanation and assuming that the true bits have been received at input terminals 732 and 738 corresponding to channels 1 and 4, the signal levels on conductors 748 and 754 will rise from a logical zero level to a logical one level. However, the remaining input conductors will not remain at a logic zero level and, when the $\overline{\text{control A}}$ ($\overline{\text{control A}}$) pulse is generated, the capacitors contained in differentiator circuits will commence charging. Upon the clocking in of a reset pulse at terminal 852 the signal level upon conductor 854 and correspondingly conductor 856 and 858 will rise from a logical zero level to a logical one level thereby resetting all of the flip flop units 806 to 820. However, the logical one level signals on conductors 748 and 754 will persist and the logical zero signals on conductors 757, 752, 756, 758, 760, 762 will remain at the logical zero level.

The not control A ($\overline{\text{control A}}$) signal is impressed on input terminal 850 at the same time as the reset pulse is impressed on input terminal 852, thereby dropping the signal level on conductors 860, 862 and 864 from a logical one level to a logical zero level. As stated above, this logical zero level will persist for the control A duration of approximately 300 microseconds, and will rise from a logical zero level to a logical one level at the end of that period. This rise in signal level will permit all of the differentiator circuits 772, 774, 776, 780, 782 and 784 which have not true or logical zero input signal levels on the respective input conductors 750, 752, 756, 758, 760 and 762 to discharge the respective capacitors thereby providing an output pulse to the respective flip flop units 808, 810, 812, 816, 818, 820.

However, the particular differentiators 770 and 778 which have a logical one level signal on input conductors 748, 754 will be disabled from charging the capacitors contained therein thereby precluding an output signal to be passed to the respective flip flop units 806 and 814. Thus, the flip flop units 806 and 814 will not be switched to the set state. Accordingly, true side 790 and 798 will remain true, that is, the transistors contained therein will remain in the conductive state, and a logical one signal will be realized at the true output terminal for channel 1 and a logical zero signal will be realized at the not true output terminal for the same channel 1. Similarly, a logical one signal level will be present at the true output terminal 824 for channel 4 and a logical zero level signal will be present at the not true output terminal 824. The remainder of the output terminals 824 corresponding to channels 2, 3, 7, 5, 6 and 8 will have a logical zero level signal at their respective true output terminals, and a logical one level signal will be present at the not true. Accordingly, the information being fed from external input source 730 is stored in the storage registers comprising the flip flop units 806 to 820.

Referring back to FIG. 13, there is illustrated a second typical data input circuit in the form of a reader unit (not shown) which includes a plurality of reader current amplifiers 872 to 886 corresponding to channels 1 to 8. The current amplifiers 872 to 886 are connected between a common reader gate terminal 890 by means of a gate conductor 892 and a plurality of output conductors 894 to 908 corresponding to the outputs from channels 1 to 8 respectively. The reader gate input terminal 890 is connected to a gating circuit contained in the mode control circuit, illustrated in FIG. 23 and to be more fully explained, which provides a gating signal to gate the information through the reader unit, thereby insuring a passage of the code being read in the reader unit. The signal on the reader gate input terminal 890 maintains the outputs of the reader current amplifiers 872 to 876 at logic zero during the period when the reader gate signal is at a logical zero level and permits the reader amplifiers 872, 886 to go to a logical one level and output the information contained therein when the reader gate signal goes to a logical one level.

The outputs of the reader amplifiers 872 to 886 are impressed on a cable 912, the opposite ends of the cable being connected to a plurality of NPN emitter followers 914 to 928, corresponding to channels 1, 2, 3, 5, 4, 6, 7 and 8 respectively. As in the situation with the external data input circuit 730, the connections between the cable 912 and the NPN emitter follower units 914 to 928 are made with a plug and jack arrangement whereby the particular input code to the reader unit may be changed prior to reaching the decode register flip-flops 806 to 820. Thus, any particular code may be utilized in the reader unit and may be subsequently changed to a second code which is compatible with the system connected to the storage registers.

The output of the NPN emitter followers 914 to 928 are connected to the differentiator circuits 770 to 784 by means of a plurality of conductors 932 to 946. As was the situation with the external input, outputs of the reader amplifiers 872 to 886 are normally maintained at a logical zero level and rise to a logical one level when a data bit is sensed in the reader unit. Accordingly, the true input conductors will preclude the capacitors from charging and the not true input conductors will allow the capacitors contained in differentiators 770 to 784 to charge during the control A pulse. Upon the rise of the control A pulse, an output signal will be produced from the respective differentiator. This output signal, when the particular channel is true, will switch the flip flop units 806 to 820 to its opposite state. The reset signal impressed on reset input terminal 852 will reset all of the flip flop units 806 to 820 to their initial state, thereby eliminating the previous character stored therein.

Similarly, when the not control A signal is impressed on input terminal 850, the trailing edge of the not control A signal will cause the capacitors of those differentiator circuits 770 to 784, which have not had the input circuits maintained at a logical one level, to discharge. Thus, an output pulse is produced to switch the respective flip flop units 806 to 820 to the opposite stable state. On the other hand, those differentiator circuits 770 to 784 which have been provided with a true input signal, i.e., a logical one signal, from the reader unit 870 will not be affected by the rise of the not control A signal pulse. Thus, the differentiators will remain discharged due to the persistence of the input signal from the channels of the reader amplifier which have been activated due to a hole or other data bit being present. Accordingly, the corresponding flip flop units 806 to 820 will not be switched and will indicate the presence of a bit or bit condition, as was described in conjunction with the external inputs system.

Referring now to the third representative data input assembly, there is illustrated in FIGS. 13 and 14 a schematic diagram of the data flow circuitry and the attendant control circuitry of an automatic typewriter which is adapted to provide encoded machine function signals, character signals and system function signals. These signals are normally generated within the machine as a result of the closing of switches, the manual operation of movable mechanisms of the machine, or through a typing operation. Referring particularly to the alpha-numeric character coded signals, the character encoding system comprises a plurality of reed type bail switches 950 which are energized in response to a magnetic field. The magnetic field is moved adjacent the switches in response to the actuation of certain keys on the keyboard and a keyboard encode circuit 952 capable of translating the operation of the bail switches into electrical pulses having the proper characteristics for use in the system encodes the signals. The bail switches 950 are six in number to correspond to the conventional number of bails in an electric typewriter and comprise switches for bails one through six, designated as 956 to 966.

One end of the plurality of bail switches 956 to 966 is connected to a source of logical one or zero volt potential through a conductor 968, a filter cam switch 970 and a second conductor 972. The opposite end of the bail switches are connected to a plurality of integrating norgates 976 wherein bail 1 956 is connected to an integrating norgate 978, by means of a conductor 980, bail 2 switch 958 is connected to norgate 982 by means of conductor 984, bail 3 switch is connected to norgate 988 by means of a conductor 990, bail 4 switch is connected to integrating norgate 992 by means of conductor 994, bail 5 switch is connected to norgate 996 by means of conductor 997, and bail 6 switch 966 is connected to norgate 998 by means of a conductor 999.

The filter cam switch 970 is actuated by means of a mechanical connection through the keyboard and is closed each time the keyboard is actuated to print a character. However, preceding the closing of the filter cam switch, the bail switches corresponding to the particular character key actuator are closed, thus completing a circuit between conductor 972 and the respective integrating norgate 978, 982, 988, 992, 996, 998. Once the particular bail switches have been closed, the filter cam switch is actuated and closed thereby completing the circuit between conductor 972 and the logical one level voltage impressed on conductor 968 and input terminal 967. Thus the information coded into the bail switches 956 to 966 is simultaneously fed to the integrating norgates 976 each time the filter cam switch is actuated.

The output of the bail 1 norgate 978 is fed by means of conductor 1000 to the input of an inverter norgate 1002 and the output of the bail 2 norgate 982 is fed to the input of a second inverter norgate 1004 by means of a conductor 1006. Similarly, the outputs of norgates 988, 992, 996, 998 corresponding to bails 3, 4, 5 and 6, are fed to norgates 1010, 1012, 1014, 1016, respectively, by means of conductors 1018, 1020, 1022, 1024, respectively. The outputs of norgates 1002, 1004 and 1010 to 1016 are fed to the differentiator circuits 770, 772, 774, 778, 780 and 782, respectively. The norgates 1002, 1004 and 1010 to 1016 are provided with an enabling signal from a keyboard gate input terminal 1028 and a plurality of conductors 1030, 1032 and 1034, to enable the information being fed to the output norgates 1002, 1004 and 1010 to 1016, to be transmitted to the differentiating circuits 770, 772, 774, 778, 780 and 782.

The keyboard gate signal level is normally maintained at a logical zero level and is fed from the mode control circuit, to be described in conjunction with FIG. 23, to control the operation of the norgates 1002, 1004 and 1010 to 1016. The logical zero level signal at the keyboard gate is generated in the event that the reader unit is off and data is not being received from the external source 730. Assuming that the keyboard gate pulse is at a logical zero level and bails 2 and 3 are closed, norgate units 982 and 988 will be switched to a logical zero level at the output terminals thereof thereby transmitting a true signal to norgates 1004 and 1010. The outputs of norgates 1004 and 1010 are then switched to a logical one level. As in the situation with the external data source and the reader unit, the output pulse from differentiator circuits 772 and 774 will switch flip fiop units 792 and 794 to the set state and the remainder of the flip flop units 790 to 804 will remain in the reset state.

The reset pulse impressed on input terminal 852 will subsequently reset all of the flip flop units 806 to 820 and the trailing edge of the not control A signal on terminal 850 will provide a rising edge signal for differentiator circuit 770 to 784, thereby permitting the capacitors contained therein to discharge. However, the output signal levels on norgates 1004 and 1010 will remain at the logical one level thereby rendering the not control A signal ineffective on differentiator circuits 772 and 774. Accordingly, an output pulse will not be transmitted to the flip flop units 792 and 794 to switch these units. Thus, the units 808 and 810 will remain in the reset state while flip flop units 806 and 812 to 820 will be switched to the set state.

As is well known in the art, it is desirable to sense the machine function movements of the typewriter unit and encode these movements for punching into a tape unit or other data ouput device. In this manner, an output signal is provided which is indicative of a particular movement of the machine. A plurality of magnetic, flux sensitive reed switches have been placed in movement sensing relation to the operating portions of the machine (not shown) to provide such an output signal in response to the actuation of, for example, the index mechanism, the carriage return mechanism, space mechanism, the tab mechanism, the back space, the upper shift and the lower shift. As is readily apparent, the mere closing of a switch for each of these machine functions will not provide a coded output signal which may be encoded in a data output device, as, for example, a punch unit. Accordingly, the output signal indicative of each machine function is interconnected with the norgates 982 to 998, the norgates providing the encoding function for the machine function signals.

More specifically, and referring first to the index function, an index reed switch 1050 has been provided in movement sensing relation with certain portions of the index mechanism. One end of the index switch is connected to the conductor 968 which is in turn connected to a zero volt source of potential at terminal 967 and the other end of the index reed switch 1050 is connected, by means of a conductor 1052, to norgates 982 and 998. As described above, the norgates 982 and 998 are connected to inverter norgates 1004 and 1016 by means of conductors 1006 and 1024. Thus, an output is provided in channels 2 and 6 corresponding to storage register flip flops 808 and 818 thereby encoding the index function as a true signal in channels 2 and 6.

Similarly, a carriage return reed switch 1056 is connected betweens the conductor 968 and a conductor 1058, thus making and breaking a logical one signal level on conductor 1058 in response to the carriage return function. It is to be understood that the carriage return reed switch 1056 may be made responsive to either the start or the end of the carriage return function for certain operations of the system. However, for the punch operation, the start of the carriage return function is sensed. The conductor 1058 is connected to norgates 982, 996, and 998, thereby providing outputs in channels 2, 5 and 6 corresponding to storage register flip flops 808, 816 and 818. A plurality of reed switches 1062, 1064 and 1066 have been provided for the space, tab and back space functions, respectively, one end of the switches 1062, and 1064 and 1066 being connected to the conductor 968, as in the above situation.

The space function output conductor 1062 is connected to norgates 982 and 988 thereby providing output in channels 2, 4 and 6 corresponding to a true state of storage register flip flop units 808, 814 and 818. Tab function reed switch 1064 is connected by means of conductor 1072 to the input circuit of norgate 982, thereby providing an output in channel 2 corresponding to a true state of flip flop unit 808. The back space reed switch 1066 is connected by means of a conductor 1074 to norgates 982, 992, 996 and 998 corresponding to outputs in channels 2, 4, 5 and 6. It is to be understood that these machine function coded signals are clocked into the storage register circuit in a manner similar to the clocking of the coded signals described above in conjunction with the external input on the reader input.

Referring now to the upper shift and lower shift functions, upper shift and lower shift switches 1080, 1082, respectively, are connected to conductor 968 and thus the zero volt potential at terminal 967. The other end of the upper shift reed switch 1080 is connected by means of a conductor 1084 to a norgate 1086 and a second conductor 1088 to a monostable pulse producing circuit 1090, in the form of a single shot multivibrator 1090. Similarly, the lower shift reed switch 1082 is connected to a second norgate 1092 by means of a conductor 1094 and to the single shot multivibrator 1090 by means of a conductor 1096. The output of the single shot multivibrator 1090 is connected to the input circuits of both norgates 1086 and 1092 by means of a conductor 1098.

Due to the inherent operation of the upper and lower shift mechanisms and the manner in which the reed switches 1080 and 1082 are positioned in movement sensing relation therewith, the upper shift or lower shift switches 1080 or 1082 will be maintained closed during the entire period that the operator is in the upper shift or lower shift operation. Accordingly, a constant logical one signal level will remain on conductor 1084 or 1094 thereby providing a constant logical one signal level into the inputs of either norgate 1086 or 1092, depending on whether the operator is in the upper shift or lower shift operation. However, as will be seen, it is desirable to provide a single pulse of specified duration to indicate the condition of the typewriter unit in the upper shift or the lower shift function. If the single pulse of specified short duration were not utilized, and the inherent output signal of the upper shift and lower shift switches 1080, 1082 were utilized, the logic circuitry, including norgates 976, would be disabled during the entire period that the operator was either in the upper shift or lower shift function.

Accordingly, the single shot multivibrator 1090 has been connected in circuit with the norgates 1086, 1092 to provide a predetermined output pulse from the norgates 1086, 1092 of a specified duration, as for example 500 microseconds. Assuming for example that the operator goes into the upper shift operation, the switch 1080 will be closed, thereby connecting the input of norgate 1086 to a logical one level signal. However, the lower shift switch 1082 will be open thereby providing a logical zero level signal to the input of the norgate 1092 due to the inherent logical zero bias to the base circuit of the transistor contained therein. The output signal on conductor 1098 has been chosen from the not true side or negative side of the single shot multivibrator 1090 to provide an output pulse which is normally at a logical one level and drops to a logical zero level during the period when the single shot multivibrator is outputting. Thus, for the upper shift operation, the input to norgate 1086 will be at a logical one level due to the signal on conductor 1084 and a logical zero level due to the signal on conductor 1098.

However, the input signal levels to norgate 1092 will be at a logical zero level due to the signal level on conductor 1094 with the lower shift switch 1082 open, and for 500 milliseconds the other input to norgate 1092 will also be at a logical zero level due to the output pulse from the single shot multivibrator 1090. Thus, during the upper shift operation, both inputs to norgate 1092 will be at a logical zero level, thereby providing a logical one output signal level on output conductor 1100. This output conductor is chosen to provide an upper shift output signal which is fed into the input circuits of norgates 992 and 982. Thus, for the upper shift signal, a coded output is provided in channels 2 and 4 due to the operation of storage register flip flops 808 and 814. Contrariwise, when the operator switches to the lower shift operation, the signal level on conductor 1094 will rise to a logical one level thereby inhibiting the output of norgate 1092.

The upper shift and lower shift switches 1080 and 1082 are so connected that when the operator goes into the lower shift operation thereby closing the lower shift switch 1082, the upper shift switch 1080 will automatically open. Thus, a logical zero level signal is provided to the input to norgate 1086 and the signal level on conductor 1102 will bias to a logical one level. This logical one signal provides an indication that the machine is in the lower shift operation and the conductor 1102 is interconnected with norgates 982, 992, 996. Thus a coded output signal is provided at the storage register in channels 2, 4 and 5 corresponding to flip flop units 808, 814 and 816. In this manner a single pulse of specified duration is encoded for the upper shift and the lower shift operations and the inherent difficulty of the reed switches in disabling the coding logic circuitry including norgates 976 is alleviated.

As stated above, the various input signals are clocked into the storage register circuitry by means of a clock pulse or control A pulse generated in the clock circuitry, to be discussed in conjunction with FIG. 23. However, the clock circuitry must be initially started in response to operation of the writing system in order to properly synchronize the clocking pulses with the operation of the writing system. In order to provide the clocking pulse, a clock pulse starting circuit 1103 has been provided, the clock starting circuit 1103 being connected in responsive relation to the operation of either the filter cam switch or a particular bail norgate 976. During the operation of the bail switches, the filter cam switch will also be operated, but in the event that the machine is placed in certain machine operations, as for example, index, carriage return or the like, or on the other hand, if certain other system functions are actuated, as for example, punch on, punch off and the like, the filter cam switch will not be operated. Accordingly, it is necessary to sense the operation of the machine function or system function switches.

Referring now to the details of the clock start circuit 1103, the output of the filter cam switch is connected to an integrating norgate 1104 by means of a conductor 1106, the integrating norgate being utilized to alleviate any switch bounce which may be inherent in the filter cam switch 970. The output of the norgate 1104 is fed to an inverting norgate 1108, the inverted signal or logical one signal being fed to an output terminal 1110 by means of a conductor 1112. Thus each time the filter cam switch 970 is closed due to the operation of the cam in the typewriter unit, a logical one output signal will be provided to output terminal 1110.

As will be noted from the above-description of the encoding of the machine functions (index, carriage return, space tab, back space, upper shift and lower shift) and as will be seen from a following description of the system function switches, each of the switches include an encoding into bail 2, thus channel 2 norgates 982 provide a common norgate to start the clock generator in the event the filter cam switch is not actuated. It is to be understood that any norgate may be chosen to be a common norgate for the codes of each of the machine function or system function switches. Accordingly, the output of norgate 982 is fed by means of a conductor 1116 to an inverting norgate 1118. The output of the norgate 1118 is fed to the output terminal 1110 by means of a conductor 1120 thereby providing a logical one output signal at output terminal 1110 each time the channel 2 norgate 982 is actuated. The output terminal 1110 is connected to a clock start circuit contained in a clock pulse generator to be described in conjunction with FIG. 23. Thus the clock generator will be started to produce the clocking pulses, including the control A pulse, when either the filter cam switch 970 or the norgate 982 is actuated.

The system function operations are similarly encoded as were certain machine functions by means of a system function keyboard encode circuit 1130, the input signals to which are generated by a plurality of system function switches 1132 mounted on the keyboard of the typewriter unit. Due to the inherent bouncing of switches utilized in systems of this type, a plurality of switch triggers 1136 have been interconnected between the system function switches 1132 and the logic circuitry 1130 to provide a single output pulse for each actuation of the system function switch 1132. Thus, the problem of a plurality of output signals being generated for any single operation of any one system function switch is alleviated.

Referring now to the particular system functions which have been provided in the illustrated embodiment of the writing system, there is illustrated a plurality of system functions switches which are adapted to be either actuated from the keyboard in the case of the start-stop, end of address, etc., in the case of certain of the switches, and others are adapted to be actuated due to mechanical movement of certain portions of the writing system mechanism. Referring to the start-stop function, a start-stop circuit 1140 is provided including a stop switch 1142 and a start switch 1144. The stop switch is connected to a source of zero volt potential at a terminal 1146 and a conductor 1148 by means of a tape one switch 1150 and a tape two switch 1152 in series. The tape one switch common terminal 1153 is connected to the source of zero volt potential at terminal 1146 by means of the conductor 1148.

The start circuit including the start switch 1144 is connected to a pair of normally open contacts 1154 and 1155, corresponding to the transfer contacts of the tape one and tape two switches. The tape one and tape two switches 1150, 1152 corresponds to a double switch arrangement which is present in a card reader or card punch unit whereby the tape one switch is initially contacted by the incoming card and held closed while tape two switch is also energized during a period of the progress of the card to the reader or punch unit. The card contains a hole which is adapted to release the tape one or tape two switch at such time as the card is properly positioned in the unit. For more specific details of such a system, reference is made to copending application Ser. No. 470,393 filed July 8, 1965, the disclosure of which is incorporated herein by reference.

The common terminal of the start switch 1156 is connected to the normally open transfer terminals of the tape one or tape two switches 1150, 1152 by means of a conductor 1157. The switches 1150 and 1152 are adapted to be switched from the normal terminals 1158, 1159 to the transfer terminals 1154, 1155 by either tape being inserted into the unit in the case of one of the switches or by a card being inserted into the unit in the case of the card feed operation.

The start switch is adapted to be moved between a normal position 1160 and a transfer contact 1161, the contacts 1160, 1161 being connected to a switch trigger 1162. The output of the switch trigger is connected to a reader control circuit (FIG. 24) by means of a conductor 1163 and an output terminal 1164. The stop switch 1142 is also connected to the reader control circuit, as will be more fully explained hereinafter, by means of a conductor 1165 and an output terminal 1166. The stop switch 1142 is adapted to be moved between the normal position 1167 and a transfer position 1168. A diode 1169 is connected between the normal terminal 1160 of the start switch and the normal terminal 1167 of the stop switch.

In operation, a portion of tape is inserted into the reader unit thereby actuating one of the switches 1150, 1152. Thus a logical one signal level is impressed on conductor 1157 and start switch 1154. The start switch is then actuated to the transfer terminal 1161 and released thereby providing an output pulse at the start output terminal 1164. If neither the tape one switch 1150 or the tape two switch 1152 have been switched to their respective terminals, 1154, 1155, the start switch will be rendered ineffective to provide an output pulse to the reader control circuit by means of the output terminal 1164. Thus, when the tape leaves the reader or is removed therefrom, the particular switch 1150 or 1152 is released thereby providing a logical one signal level to the normal terminal 1167 of the stop switch 1142. The stop switch, being normally closed, will thus impress this logical one output signal on output terminal 1166. The output terminal 1166 is connected to the reader control circuit (FIG. 25) to stop the operation of the reader unit. With tape in the machine and the unit operating due to the momentary actuation of the start switch 1144, the actuation of the stop switch 1142 will connect the zero volt potential or logical one potential from the conductor 1148 through the actuated tape one or tape two switch, the start switch 1144, the normal terminal 1160 of the start switch 1142, the transfer terminal 1168 of the stop switch 1142 to the output terminal 1166. Thus the operation of the reader unit is stopped.

In the event it is desired to single cycle the machine, the stop switch is maintained in the closed position, that is, in engagement with transfer terminal 1168 and the start button is cycled. With one of the tape switches 1150, 1152 actuated, a constant zero pulse will be maintained at the output terminal 1166. The operator cycles the start button by pressing and releasing the start button, thereby closing and opening start switch 1144 to produce an output pulse at output terminal 1164. Each time the start switch 1144 returns to the normal terminal 1160, a zero output pulse is fed to the output terminal 1166 to stop the operation of the reader. Thus the system is sequentially started and stopped.

An end of address (EOA) switch 1170 is connected by its common terminal 1172 to the zero volt or logical one potential terminal 1146 by means of the conductor 1148. A normal terminal 1174 is connected to a switch trigger 1176 by means of a conductor 1178 and a transfer terminal 1180 is connected to the switch trigger 1176 by means of conductor 1182. The logical one output of switch trigger 1176 is connected to an output terminal 1184 by means of a conductor 1186. The output terminal 1184 is connected to an encoding logic circuit contained in the mode control II circuit to be described hereinafter in conjunction with FIG. 23. The output of the mode control encoding circuit is interconnected to the input terminals of the bails 4, 5 and 6 integrating norgates 992, 996 and 998, respectively, as will be more fully explained as the description proceeds.

The print-on function is provided by means of a print-on switch 1190 which includes a common terminal 1192 connected to the zero volt source potential at terminal 1146. A normal terminal 1194 is connected to another switch trigger 1196 by means of a conductor 1198 and a transfer terminal 1200 is connected to the switch trigger 1196 by means of a conductor 1202. The true side output of the switch trigger 1196 is fed to the keyboard encode circuit 1130 by means of a conductor 1206 and more specifically, is fed to the input circuit of a norgate 1208, the output of which is fed to a second norgate 1210 by means of conductor 1212. The output of inverter gate 1210 is fed by means of a conductor 1214 to the input circuit of the bail 1 norgate 978 thereby providing an output in channel 1 of the storage register flip flop circuit 806. The output of inverter gate 1210 is also fed to the bail 2 norgate 982 by means of a conductor 1218 thereby providing an output in channel 2 by means of flip flop unit 808. Thus the print-on function is encoded as a bit in channels 1 and 2. The not true side of switch trigger 1196 is fed to the print punch control circuit, to be discussed in conjunction with FIG. 25, by means of a conductor 1220. Thus certain control functions are provided for the system from the actuation of the print-on switch 1190.

The print-off function is provided by means of a print-off switch 1222 which includes a common terminal 1224 connected to the source of logical one potential and a normal contact 1226 connected to a switch trigger 1228 by means of a conductor 1230. A transfer terminal 1232 is also connected to the switch trigger 1228 by means of a conductor 1234, and the output of the true side of the switch trigger 1228 is connected by means of a conductor 1236 to the keyboard encode circuit 1130. Specifically, the conductor 1236 is connected to the input circuit of norgate 1208 by means of a conductor 1238 and also into the input circuit of a diode orgate 1240 by means of a conductor 1242. The output of diode gate 1242 is connected to the input circuit of the bail 4 norgate 992 by means of a conductor 1246 thereby providing an output in the channel 4 associated with decode register flip flop unit 814. In view of the fact that an input to gate 1208 provides an output in channels 1 and 2 of the decode register circuit, the print-off function is encoded as an output in channels 1 and 2 and 4 of the decode register. The not true side output of the switch trigger 1228 is connected to FIG. 25, as discussed in conjunction with the print-on function, by means of a conductor 1248.

The punch-on function is provided by the punch-on switch 1252 connected to the zero volt source potential at one end thereof and to a switch trigger 1254 by means of conductors 1256 and 1258. The true side output of the switch trigger 1254 is connected to the input circuit of norgate 1208 by means of a conductor 1262. The output of switch trigger 1254 is also connected to the input circuit of a second diode orgate 1264 by means of a conductor 1266. The output of the orgate 1264 is connected to the bail 5 norgate 996 by means of a conductor 1268 thereby providing an output in channel 5 corresponding to flip flop unit 816. Accordingly, the punch-on function is encoded at the output of the decode register circuit by a bit in channels 1, 2 and 5. As in the above situation, the not true side of the punch-on switch 1254 is connected to the print-punch control circuit (FIG. 25), by means of a conductor 1270.

The punch-off function is provided by a punch-off switch 1280 connected to the source of zero volt potential at one end thereof and at the other end thereof to a switch trigger 1282 by means of conductors 1284, 1286. The outputs of the switch trigger 1282 are connected to the print-punch control circuit (FIG. 25) by means of a conductor 1286 and to the input circuits of orgates 1240 and 1208 by means of a conductor 1288, 1290 or 1292. The output conductor 1288 is also connected to the input circuit of diode orgate 1264 by means of conductor 1294. Thus an output in channels 1, 2, 4 and 5 is provided for the punch-off function.

The form feed function is provided by a switch 1298 which is connected to a switch trigger 1300 by means of a pair of conductors 1302, 1304. The output of the form feed switch trigger 1300 is fed to the input circuit of norgate 1208, orgates 1240 and 1264 by means of a conductor 1306 and also to the input circuit of a third diode orgate 1308 by means of a conductor 1310. The output of orgate 1308 is connected to the input bail 6 norgate circuit 998 by means of a conductor 1312. Thus the form feed function is encoded and provided as an output at the decode register circuit by means of a bit in channels 1, 2, 4, 5 and 6.

The end of block and delete code functions are provided by a pair of switches 1320, 1322, respectively, which are connected at one end thereof to the zero volt potential input terminal 1146 and at the other end to a pair of switch triggers 1324, 1326. The switch triggers are provided with pairs of output terminals 1330, 1332 and 1334, 1336. These latter output terminals being connected to the mode control circuit, to be discussed in conjunction with FIG. 23.

The stop code function includes a stop code switch 1340 which is connected at one end thereof to the zero volt source of potential and at the other end to a switch trigger 1342 by means of conductors 1344 and 1346. The true output side of the switch trigger 1342 is connected to norgate 1208 and orgate 1308 by means of a conductor 1348 to provide a coded signal for the stop code in channels 1, 2 and 6 of the decode register circuit. A keyboard-on function switch 1356 is connected in a manner similar to the end of block switch 1320 in that the output terminal 1358 is connected to the mode control circuit to be discussed in connection with FIG. 23. The switch 1356 is connected to the mode control circuit through a switch trigger 1360 by means of a pair of conductors 1362, 1364.

DUAL CONVERSION CODE CONVERTER

Referring now to FIG. 15, there is illustrated an "X" address encode logic circuit 1500 and a "Y" address encode logic circuit 1502 which are interconnected with the output terminals of the decode register circuit. The input circuits to the "X" address encode circuit 1500 and the "Y" address encode logic circuit 1502 are provided with a plurality of input terminals 1508 and 1510 which are adapted to be interconnected with the output terminals 824 of the decode register circuit described in conjunction with FIG. 14. As stated above, the decode register circuit provides an output for the true side of each of the flip flop units 806 to 820 for a true reading in each of the channels 1 to 6, and also an output from the not true sides of the flip flop units 806 to 810 and 814 to 818 provides a not true reading for each of the channels 1 to 6. Thus a plurality of true output signals are fed to terminals 1508 for channels 1 to 3 and not true outputs for the same channels 1 to 3 are fed to input terminals 1508. Similarly, a true output for channels 4 to 6 are fed to terminals 1510 and for the not true outputs of channels 4 to 6 are fed to the input terminals 1510.

The outputs of the "X" and "Y" address encode logic circuits 1500 and 1502, 16 in number, are fed to a decode matrix circuit 1516. The decode matrix circuit 1516 has been so devised as to accept a single signal for each of the various combinations of channels 1, 2 and 3 and also a single signal for each of the various combinations of channels 4, 5 and 6. Accordingly, the "X" address encode logic circuit 1500 has been interposed between the decode register and the input circuitry to the decode matrix to provide a single signal for any coded combinations of channels 1, 2 and 3. Also, the "Y" address matrix 1502 has similarly been interposed between the decode register and the decode matrix to provide a single signal for each of the various combinations of channels 4, 5 and 6.

Referring to the specifics of the "X" and "Y" address encode logic circuits 1500, 1502, a plurality of true input terminals 1518, 1520, 1522 have been provided to receive input signals from the true sides of channels 1, 2 and 3, and a plurality of not true input terminals 1524, 1526, 1528 have been provided to receive input signals from the not true sides of channels 1, 2 and 3. As was stated above, the normal condition for the flip flop units 806 to 820 when no bits have been clocked into the flip flop units is the condition wherein the output terminal on the true side is at a logical one level and the output terminal on the not true side is on the logical zero level. When a bit has been clocked into the decode register circuit for any one channel, that particular channel will remain at the logical one level at its true side and a logical zero level at its not true side. If a bit has not been clocked into a channel, the respective flip flop 806 to 820 will be switched to its set state, thereby providing a logical zero level at the true side of its output terminal and a logical one level signal at the not true side output terminal.

Accordingly, when the not true side of the input terminals 1508 are at a logical zero level a pulse is provided to strobe the information through the "X" and "Y" address encode logic circuits 1500 and 1502 by means of a plurality of gate pulses impressed on gate input terminals 1532, 1534. With the information set in the encode logic circuits 1508, 1510, a logical one output signal will be present at one of a plurality of output conductors 1536 to 1550 corresponding to $\bar{1}\,\bar{2}\,\bar{3}$, $1\,\bar{2}\,\bar{3}$, $\bar{1}\,2\,\bar{3}$, $1\,2\,\bar{3}$, $\bar{1}\,\bar{2}\,3$, $1\,\bar{2}\,3$, $\bar{1}\,2\,3$, or $1\,2\,3$ for the "X" address encode logic circuit and a plurality of output conductors 1552 to 1556 corresponding to a $\bar{4}\,\bar{5}\,\bar{6}$, $4\,\bar{5}\,\bar{6}$, $\bar{4}\,5\,\bar{6}$, $4\,5\,\bar{6}$, $\bar{4}\,\bar{5}\,6$, $4\,\bar{5}\,6$, $\bar{4}\,5\,6$ or $4\,5\,6$, respectively, for the "Y" address encode logic circuit. The four, five and six channel outputs on conductors 1552 to 1566 are energized by means of input signals at true side input terminals 1568, 1570, 1572 corresponding to the true sides of channels 4, 5 and 6, and input terminals 1574, 1576 and 1578 corresponding to the not true sides of channels 4, 5 and 6, respectively.

Referring to the operation of the "X" and "Y" address encode logic circuits 1500, 1510, and assuming that bits have been read in channels 1, 2 and 3 and channels 4, 5 and 6, the following operation of the circuit occurs.

In view of the fact that all of the channels one to six have received input bits, the flip flops 806 to 810 and 814 to 818 will remain in their reset state after the information has been clocked into the decode register circuit. Accordingly, the signal levels on conductors 1518 to 1522 and 1568 to 1572 will be at a logical one level. Similarly, the signal levels on not true input terminals 1524 to 1528 and 1574 to 1578 will be at the logical zero level. The logical one level signal from input terminal 1518 is fed to a plurality of norgates 1580 to 1586 and the not true side of channel one is fed by means of conductor 1590 to a plurality of norgates 1592 to 1598, thus placing a logical zero level signal on these latter norgates 1592 to 1598.

Similarly, the true side of channel two is fed to norgates 1580, 1592, 1584 and 1596, and the not true side of channel two is fed to norgates 1582, 1594, 1586 and 1598.

The channel three input signals from the true and not true sides are fed to gates 1580, 1592, 1582 and 1594 in the case of the true sides and to gates 1584, 1596, 1586 and 1598 in the case of the not true sides. As will be seen from the above description of the input signals to gates 1580 to 1598, the only gate having all logical zero input signal levels is gate 1598, which has input signals from the not true sides of channels one, two and three. Accordingly, gate 1598 will be the only gate having a logical one output signal level and the remainder of gates 1580 to 1596 will have a logical zero output signal level due to at least one, and possibly more, logical one input signal levels. The output of norgate 1598 is fed through an NPN transistor emitter follower circuit 1600 to the output conductor 1550, thereby providing the necessary current for energization of the respective portions of the decode matrix circuit 1550. The NPN configuration for the emitter follower 1600 has been utilized due to the fact that the circuits 1600 supply current when the output conductor is true, as will be seen from a detailed description of the diode matrix circuit 1560.

The output signals from norgates 1580 to 1586 are fed to the respective output conductors 1536 to 1548 by means of similar NPN transistor emitter follower circuits 1602 to 1614. As stated above, the outputs of these emitter follower circuits 1602 to 1614 will be at a logical zero level when an input code configuration of bits in channels one, two and three have been received at the input terminals 1508.

The input terminals 1568 to 1578 for channels four, five and six are similarly interconnected with the output conductors 1552 to 1566 by means of a plurality of norgates 1620. Particularly, the true side of input terminal 1568 for channel four is connected into the input circuitry of norgates 1622 to 1628 and the not true side is connected into the input circuitry of norgates 1630 to 1636. The outputs of the respective norgates 1622 to 1636 are fed to the output conductors 1552 to 1566 by means of a plurality of PNP emitter follower circuits 1640 to 1654 to provide the necessary current to drive the respective circuit elements of the diode matrix. The PNP emitter follower circuits 1640 to 1654 have been chosen in the "Y" address encode logic circuit 1502 in lieu of the NPN circuits 1600 to 1614 in view of the fact that the emitter follower circuits 1640 to 1654 are required to supply current to the diode matrix 1516 when the output conductors are at the false or logical zero level, as will be more readily apparent from a detailed description of the diode matrix 1560.

In operation, when bits have been received in channels four, five and six, the signal levels at the input terminals 1568, 1570 and 1572 will be at a logical one level and the input terminals 1574, 1576 and 1578 will be at a logical zero signal level. Accordingly, the norgates 1622 to 1628 will be at a logical zero signal level at the output conductors 1552 to 1564 and the output signal level at the output conductor of norgate 1636 will be at a logical one level. This is due to the presence, at the input circuit of norgate 1636, of the signals on the not true side input conductors 1574, 1576, 1578, which are all at a logical zero level. Thus all of the output conductors 1552 to 1564 will be at a logical zero level while the output conductor 1566 corresponding to a reading in channels four, five and six will be at a logical one level.

Referring now to FIG. 16, there is illustrated one preferred form of a diode matrix circuit 1660 which includes a plurality of input terminals 1662 to 1676 corresponding to the output conductors 1536 to 1550, respectively, of the "X" address encode logic circuit 1500 and terminal 1678 to 1692 corresponding to the output conductors 1552 to 1566, respectively, of the "Y" address encode logic circuit 1502. The particular channel code configurations for each of the "X" address terminals 1662 to 1676 have been indicated to the left of FIG. 16, and the code configurations for the "Y" address terminals, corresponding to the terminals 1678 to 1692 have been indicated above the respective terminals. Each of the "X" address input terminals 1662 to 1676 have been connected to a plurality of input conductors 1702 to 1716, and each of the "Y" address terminals 1678 to 1692 have been connected to a plurality of "Y" conductors 1718 to 1732.

Accordingly, when a particular "X" address input terminal 1662 to 1676 is raised to a logical one level, its respective conductor 1702 to 1716 will similarly be raised to a logical one level. The same situation occurs when a particular "Y" address input terminal 1678 to 1692 has been raised to a logical one level, the "Y" address conductors 1718 to 1732 will also be raised to the logical one level. It is to be noted that only one "X" address conductor 1702 to 1716 will be raised to a logical one level while the remainder of the conductors 1702 to 1716 will remain at a logical zero level. Similarly, only one of the "Y" address conductors 1718 to 1732 will be raised to a logical one level for any particular input code configuration.

Each of the eight "X" address input conductors 1702 to 1716 has been interconnected with each of the eight "Y" address input conductors 1718 to 1734 by means of a resistor 1740 and diode 1742. The junction between the resistor 1740 and diode is connected to one of a plurality of 64 output terminals 1744 to provide output signals in response to input pulses supplied to input conductors 1702 to 1716 and 1718 to 1734. The resistor 1740, diode 1742 and output terminal 1744 have been so interconnected that a logical zero output signal level will be provided when the particular code configuration assigned to any one of the output terminals 1744 has not been sensed and a logical one output will be impressed on the output terminal 1744 when a particular code configuration has been sensed.

For purposes of explanation of the diode matrix 1660, it is assumed that a code of $\bar{1}$ 2 $\bar{3}$ 4 $\bar{5}$ $\bar{6}$ has been read. accordingly, input conductor 1706 for the "X" address circuit and conductor 1720 for the "Y" address circuit will assume a logical one signal level for this particular code. Under these circumstances, a resistor-diode configuration 1750 corresponding to the output terminal for a code configuration $\bar{1}$ 2 $\bar{3}$ 4 $\bar{5}$ $\bar{6}$ will assume a logical one level signal. This is due to the fact that the upper portion of resistor 1740 connected to input conductor 1706 will assume a logical one level while the cathode of the diode 1742 connected to the input conductor 1720 will also assume a logical one level. All of the remainder of the "X" address input conductors 1702, 1704 and 1708 to 1716 will be at a logical zero level, and all of the "Y" address input conductors 1718 and 1722 to 1732 also will be at a logical zero level signal.

Accordingly, the output terminal 1744 corresponding to a reading of $\bar{1}$ $\bar{2}$ $\bar{3}$ 4 $\bar{5}$ $\bar{6}$, a code which has not been read, will be at a logical zero output signal due to the fact that the diode 1742 will be back biased. The diode 1742 is back biased in view of the fact that a logical one potential appears at its cathode, while a logical zero potential appears at its anode. Thus, the logical potential at conductor 1702 will be impressed on the output terminal 1744. Similarly, the reading at the output terminal 1744 corresponding to a reading of $\bar{1}$ 2 3 $\bar{4}$ 5 $\bar{6}$, another code which has not been read, will be at a logical zero level due to the fact that the conductor 1706 is at a logical one level signal while the conductor 1718 is at a logical zero level signal. Thus, current will flow through the resistor 1740 and through forward biased diode 1742 thereby presenting a voltage of approximately a logical zero level at the output terminal 1744, in view of the fact that the majority of the drop between conductor 1706 and 1718 is absorbed by the resistor 1740.

The output signals on the output terminals 1744 of the decode matrix circuit 1660 are fed to a print encode matrix 1760 and/or a punch encode matrix 1762, depending on whether it is desired to print the output in a typewriter unit or to punch the output in a punch unit or both. In the latter event, the output signals from the print encode matrix 1760 and the punch encode matrix 1762 will energize both the typewriter unit and the punch units. FIG. 17 illustrates one preferred form of an encode matrix 1764, which may be utilized in the print encode matrix 1760 and the punch encode matrix 1762. The diode matrix 1764 generally comprises a plurality of input terminals 1768 to 1790, which are interconnected with a plurality of output terminals 1792 to 1804 corresponding to outputs in channels 1 through 7, respectively.

The particular interconnections between the input terminals 1768 to 1790 and the output terminals 1790 to 1804 are made through a plurality of diodes 1806. The diodes 1806 are forward biased in the event the anode is connected to an input terminal which has been energized with a logical one input signal and are back biased in the event the cathode has been energized with a logical one input signal. The particular diode matrix illustrated is adapted to break down a code configuration, as indicated by a single input pulse at the input terminals 1768 to 1790, to a plurality of parallel bit, output pulses which are generated in accordance with the particular code configuration being fed at the input terminals 1768 to 1790. Accordingly, if input terminal 1770 corresponding to a code configuration of bits in channels 1, 2, 3, 4, 5, 6, and 7, each of the output terminals 1792 to 1804 will be energized with a logical one output signal. Similarly, if the input terminal 1782 is energized, channels 1, 2 and 6 will be provided with a logical one output signal level at output terminals 1792, 1794 and 1802. Thus the diode matrix 1764 is adapted to provide an output pulse in each channel corresponding to the code configuration of the single input signal.

The particular input signals are interconnected to the output signals of the decode matrix 1660 by a plug and jack configuration thereby permitting the user or operator to selectively change the input code being fed to input terminals 1768 to 1790 and reflected at the output terminals 1792 to 1804 from the code being fed to the input terminals 1662 to 1676 and 1678 to 1692. Thus, one code may be utilized in feeding the printer output by means of encode matrix 1760 (FIG. 15), while a different code may be utilized in energizing the punch output circuit by means of punch encode matrix 1762. Accordingly, the data processing system may be made compatible with any particular terminal equipment which is desired to be used. It is to be understood that the diode matrix circuit illustrated in FIG. 17 is only a portion of the complete circuit and is illustrated purely for representative purposes. Accordingly, in the complete circuit, an input terminal for each of the possible code configurations from the decode matrix is provided, thereby providing 64 input terminals which are interconnected with the output terminals of the decode matrix 1660.

It will be noted that an additional input terminal has been provided in certain cases to provide an output bit in channel 7 in the event a seven channel code is being fed to the remainder of the writing system. The seventh channel bit may be derived directly from the decode register circuit or a channel 7 input terminal may be interconnected with a particular code configuration input terminal when it is desired to add a seventh channel bit to that code configuration. As will be further understood from the remainder of the description, certain codes have been chosen to actuate certain portions of the data processing system circuitry, as for example, a channel 7 code has been chosen to indicate that either a machine function or a system function code is being transmitted while the absence of a channel 7 code has been chosen to indicate that a character is being imprinted.

Accordingly, certain mode control circuitry has been made responsive to the presence or absence of a channel 7 code to energize particular portions of the system, thereby permitting the keyboard to be energized in the event that a channel 7 code is absent from the particular code configuration. Similarly, the machine function codes have been made responsive to the presence of a channel 7 code in the absence of a channel 1 code and system functions have been made responsive to the presence of both a channel 1 and a channel 7 code, as will be more apparent from a complete description of the output decode logic circuits, to be hereinafter explained in conjunction with FIG. 19.

For purposes of simplicity, the flow of data from the print decode matrix and the punch decode matrix will be described by first describing the print circuitry to the output device, and then describing the punch circuitry to the output device. Furthermore, while only a portion of the decode matrix 1660 has been illustrated, the matrix may be expanded in accordance with the system described in conjunction with FIG. 16. Similarly, the encode matrix, which may be utilized in conjunction with the print encode matrix or the punch encode matrix, may also be expanded to include all of the necessary input terminals to accommodate the plurality of output terminals of the decode matrix. The particular encode matrix illustrated has been shown purely for purposes of this description and represents only one preferred form of the encode matrix. It is to be understood that any type of encode matrix providing a plurality of output bits when energized from the single input pulse may be utilized, and the invention is not limited to the use of the particular decode or encode matrix described.

PRINTER DECODE AND OUTPUT SUBSYSTEM

Referring to FIGS. 18, 19 and 20, there is illustrated a plurality of logic circuits to provide a flow of data for the machine and system functions, and also to provide alpha-numeric character signals for a typewriting unit. Specifically, the true side outputs from the print encode matrix 1760 are fed to a print encode output circuit 1850 which provides current amplification to the signals. The print encode output circuit 1850 generally comprises a plurality of input conductors 1852 and 1864 which correspond to channels 1 through 7, respectively. If a particular channel has been rendered true by a bit from the decode register circuit, a logical one signal level will appear on the respective conductors 1852 to 1864, and this signal is inverted and suitably amplified by means of a plurality of encoder amplifiers 1866 to 1878. The logical zero output signals from the encoder amplifiers 1866 to 1878 are fed to a plurality of norgates 1880 to 1892, which invert the logical zero signal to a logical one signal. The logical one output signal from inverter gates 1880 to 1982 are fed to a plurality of true output terminals 1894 to 1906 by means of conductors 1908 to 1920, respectively. Also, the outputs from the inverter gates 1880 to 1892 are fed through a second plurality of inverter gates 1922 to 1934 to a plurality of not true output terminals 1936 to 1948. Thus, if a true signal is received at the input conductors 1852 to 1864 of a logical one signal level corresponding to the actuation of a combination of channels one to seven, a corresponding logical one signal will be impressed on the true output terminals 1894 to 1906 and the complementary signal, a logical zero level, will be impressed on the not true output terminals 1936 to 1948.

Referring particularly to FIGS. 19 and 20, the not true signals, corresponding to channels one to seven, are fed from the print encode logic circuit 1850 to a plurality of logic circuits. Specifically, the input signals are fed to an output decode I circuit 1950, corresponding to the decode logic circuit for the machine function or operation codes, a system function decode or function decode logic circuit 1952 and a power driver circuit 1954, which corresponds to the energization logic circuitry for the bails of a writing unit. Accordingly, the output of the power driver logic circuit 1954 is fed to a plurality of bail solenoids and a clutch solenoid 1956. Particularly, the not true output terminals 1936 to 1948 and specific true terminals 1894 to 1906 from the printed code logic circuit 1850 and are interconnected with a plurality of input terminals 1962, 1974 in accordance with the particular schedule indicated to the lower left of FIG. 19. It is to be noted that only the coded channel signals which are required to operate the output decode logic circuits 1950 to 1952 and the power driver circuit 1954 are fed from a print encode logic circuit 1850 to the input terminals 1960 and 1974. However, any particular combination of coded channel signals may be fed to the decode circuits 1950, 1952 or the power driver circuit 1954 in accordance with the requirements of the user. The particular signals impressed on input terminals 1960 to 1974 are fed to the respective circuit by means of a plurality of conductors 1978 to 1994.

Referring first to the output decode II circuit 1952, corresponding to the system function codes or function codes, it is seen that the input signals, corresponding to channels four, not four, five, not five, six and not six, are fed to the output decode circuit 1952 by means of a plurality of conductors 2000 to 2010. Specifically, the input signal corresponding to a true channel four at input terminal 1966 is fed by means of conductors 1984 and 2000 to the input circuit of a plurality of norgates 2012 to 2018. Similarly, the not true input terminal of channel 4 is fed by means of conductors 1986 and 2002 to a second plurality of norgates 2020 to 2026, corresponding to a not true reading in channel 4. The remainder of the input terminals 1970 to 1976 corresponding to channel five, not five, six and not six, are fed to the plurality of gates 2012 to 2026 by means of conductors 1988 to 1994 and conductors 2004 to 2010 in accordance with the particular configuration illustrated in FIG. 19. Thus, a logical zero input signal to any preselected combination of input terminals 1966 to 1976 will provide a logical one output signal level at the output terminals of the respective gate 2012 to 2026 having all of the input signals at a logic zero level, in accordance with the system indicated within the confines of the particular gate.

The output terminals of the respective norgates 2012 to 2026 are fed to a plurality of not true and true output terminals 2030 to 2060 which are connected, with the exception of output terminal 2048, to FIG. 25 as will be hereinafter explained, and the output terminal 2048 is interconnected with FIG. 24. Referring particularly to the specific signals produced by the respective norgates 2012 to 2026, the output terminal of norgate 2012 is fed through an inverter norgate 2070 to the output terminal 2030 corresponding to a not print-on code. Similarly the output of the norgate 2012 is fed to the output terminal 2032 corresponding to a print-off code. The norgate 2020 corresponding to a reading of 4 $\bar{5}$ $\bar{6}$ is fed to the output terminal 2034 corresponding to a not print-off code through an inverter gate 2072 and the output of gate 2020 is fed to the output terminal 2036 corresponding to a print-off code. Gate 2014 and 2022 corresponding to codes $\bar{4}$ 5 $\bar{6}$ and 4 5 $\bar{6}$, respectively, are fed to output terminals 2038 to 2044 through inverter gates 2074, 2076 respectively in the case of the not true codes for the punch-select code and the punch-off code and directly to the output terminals 2040, 2044, corresponding to the punch-on code and a punch-off code.

As stated above, norgate 2016, corresponding to the reading $\bar{4}$ $\bar{5}$ 6 is fed directly to FIG. 24 and corresponds to the reader-stop code and the output to gate 2016 is also fed to the output terminal 2046 corresponding to a not reader-stop code through the inverter gate 2078. In the particular system illustrated, the not reader-stop code is not utilized and accordingly is provided for the situation in which the code is desired to be used. Similarly the output terminals of gates 2024, 2018 and 2026 are fed to the output terminals 2050 to 2060, respectively, as indicated and correspond to the not true and true signals for the reader-start code, the reader-select code and the key-on code. As described in conjunction with the above codes, when it is desired to provide a not true code for the respective codes listed, the output signals from gates 2024, 2018 and 2026 are fed through inverter gates 2080 to 2084. Each of the norgates 2012 to 2026 are provided with a fourth input conductor which is connected to a function decode gate input terminal 2090 by a plurality of conductors 2092 to 2098 to provide an enabling or disabling signal to the respective norgates 2012 to 2026 in accordance with a particular code generated at the output terminals of the print encode logic circuit 1850. The particular output decode logic circuit 1952 is made responsive to a reading in channels 1 and 7. Thus, when channels 1 and 7 are energized to provide a true signal at output terminals 1894 and 1906 (FIG. 18), the signal level at input terminal 2090 and accordingly the fourth input terminal to gates 2012 to 2026 is dropped to a binary zero level thereby enabling each of the gates 2012 to 2026.

As stated above, the output of the signals impressed on input terminals 1960 to 1976 are also fed to an output decode I logic circuit 1950 which corresponds to a machine function or operation decode circuit acting to decode the coded input signals corresponding to the functions of the machine, as for example tab, space, backspace, carriage return, etc. As described in conjunction with the system decode logic circuit 1952, the machine function decode circuit 1950 is enabled in response to the generation of a code configuration including a $\bar{1}$ 7 code generated in the mode control I circuit to be described in conjunction with FIG. 23. Accordingly, if a code including $\bar{1}$ 7 is sensed by the mode control I circuit, an enabling signal is impressed on an operation decode gate input terminal 2100 which enables a plurality of norgates 2102 to 2116.

Specifically, the coded input signals corresponding to channels 4, 5 and 6 are fed to the output decode logic circuit 1950, by means of a plurality of conductors 2120 to 2130. The conductor 2120 corresponding to channel 4 is fed to norgates 2102, 2106, 2110 and 2114 while the signal on conductor 2122 corresponding to a not channel 4 is fed to the plurality of norgates 2104, 2108, 2112 and 2116. The channel 5 signal on conductor 2124 is fed to the norgates 2102, 2104, 2110 and 2112 while the signal on conductor 2126 corresponding to a not channel 5 is fed to the norgates 2106, 2108, 2114 and 2116. Similarly, the conductors 2128 and 2130 corresponding to channel 6 and not channel 6 are fed to norgates 2102 to 2108 and 2110 to 2116, respectively. Thus, norgate 2102 is responsive to the coded signals $\bar{4}$ $\bar{5}$ $\bar{6}$, gate 2104 is responsive to 4 $\bar{5}$ $\bar{6}$, gate 2106 is responsive to $\bar{4}$ 5 $\bar{6}$, gate 2108 is responsive to 4 5 $\bar{6}$, gate 2110 is responsive to $\bar{4}$ $\bar{5}$ 6, gate 2112 is responsive to 4 $\bar{5}$ 6, gate 2114 is responsive to $\bar{4}$ 5 6 and gate 2116 is responsive to 4 5 6.

The output conductor of gate 2102 is fed to a tab circuit in a power driver I logic circuit 2134 and a solenoid circuit 2136 by means of an output conductor 2138 through an inverting norgate 2140. Thus, if all logical zero signals are impressed on the input circuit of norgate 2102, the output thereof will be switched to a logical one level. This logical one level signal is inverted by the inverter gate 2140 and impressed on tab output conductor 2138. The output of norgate 2102 is also fed to a code tab output terminal 2144 which is connected to a read control circuit, to be described in conjunction with FIG. 24. The upper shift function is fed to the power driver logic circuit 2134 by means of an output conductor 2146 through an inverter gate 2148 to provide the actuation of the upper shift solenoid in response to a 4 $\overline{5}$ $\overline{6}$ signal being fed to norgate 2104. An output terminal 2150 corresponding to a reading of $\overline{4}$ 5 $\overline{6}$ has been provided through an inverter gate 2152, the particular function for the $\overline{4}$ 5 $\overline{6}$ code being unassigned.

It is to be understood that any number of unassigned codes may be provided to enable the user to expand the system and provide additional functions in accordance with the particular use being made of the system. Similarly, the lower shift and backspace carriage return functions are supplied to the power driver I logic circuit 2134 through a plurality of output conductors 2152 to 2160 respectively, the output terminals 2112 to 2160 being connected to their respective norgates 2108 to 2116 through a plurality of inverter gates 2162 to 2170 respectively. A plurality of output terminals 2172 to 2184 corresponding to the not signals for the above described functions are provided for additional expansion of the system and provide control signals in response to the combination of the codes described above. The not true output terminals may be utilized in the event the polarity of the system is reversed.

Referring to the specific machine functions contained in the power driver logic circuit 2134 and the solenoid system 2136, the tab function is impressed on the input conductor 2138 and fed through a power driver circuit 2200 which boosts the current level of the signal on conductor 2138 to provide the necessary driver current to actuate a tab solenoid 2202. It is seen that one end of the tab solenoid 2202 is connected to a negative source of 24 volt potential at input terminal 2204, and the power driver circuit 2200 acts to make and break the current from the negative 24 volt DC supply through the tab solenoid 2202. The input circuit of the power driver circuit 2200 is also provided with a second input signal impressed on a conductor 2206 connected to an operation gate input terminal 2208. The operations gate input terminal 2208 is connected to the print punch logic circuit, to be described in conjunction with FIG. 25, and provides an enabling signal for the machine function solenoids in response to certain coded print signals impressed thereon. These signals will be more fully explained in conjunction with FIG. 25 and it is sufficient here to assume that during a certain portion of the system cycle, the conductor 2206 be provided with a logical zero enabling signal. Thus, with the tab input conductor 2138 lowered to a logical zero level signal and the inhibit conductor 2206 also provided with an enabling logical zero signal, the tab solenoid 2202 will be energized through the energization of the power driver circuit 2200.

The upper shift function signal, impressed on conductor 2146, is impressed on a power driver circuit 2210 which is connected in current controlling relation with an upper shift solenoid 2212 connected at one end thereof to the source of negative 24 volt DC supply by means of conductor 2214. Similarly, the lower shift function signal impressed on input conductor 2152 is connected to the input circuit of a power driver circuit 2216 which is also connected in current controlling relation with a lower shift solenoid 2218. As in the case of the upper shift and tab functions, the lower shift solenoid is connected to the negative 24 volt DC supply at conductor 2214 and the input circuit of power driver circuit 2216 is connected to the enabling signal impressed on conductor 2206.

Similarly, the index function control signal impressed on conductor 2154 is fed to a power driver circuit 2220 which is connected in controlling relation with an index solenoid 2222, the index solenoid 2222 being connected at the other end thereof to the negative 24 volt DC supply at conductor 2214. Also the space, backspace and carriage return function signals impressed on conductors 2156, 2158 and 2160 are fed to space, backspace and carriage return power driver circuits 2228, 2230 and 2232 respectively, the outputs of which are connected in current controlling relation with space, backspace and carriage return solenoids 2234, 2236 and 2238 respectively which are also connected to the negative source of DC potential and conductor 2214. As in the above situation, each of the power driver circuits 2228 to 2232 are enabled or disabled in response to the signal level impressed on the operation gate enabling conductor 2206.

A keyboard lock solenoid 2244 is provided which is energized from the 24 volt negative supply at conductor 2214 and the operation of the solenoid 2244 is controlled by a keyboard lock power driver circuit 2246. The input circuit of the keyboard lock driver circuit 2246 is connected to a reader-on input terminal 2248 and a not keyboard select input terminal 2250 by means of a pair of input conductors 2252, 2254 respectively. The input terminals 2248 and 2250 are interconnected with the select register circuit, to be described in conjunction with FIG. 25. In the situation where a logical one signal is impressed on the reader-on input terminal 2248 when the reader has been turned on or selected and a logical zero signal level is impressed on input terminal 2250 when the keyboard has been turned on or selected, the keyboard lock solenoid will be de-energized to lock the keyboard when the reader is being utilized. Accordingly, if the reader has been turned on, a logical one inhibiting signal will be fed to the input circuit of the keyboard lock power driver circuit 2246 to disable the keyboard. Similarly, if the keyboard has not been selected, thereby providing a logical one signal level on input terminal 2250, the keyboard lock power driver circuit 2246 will be similarly de-energized. Accordingly, the reader must be turned off or not selected and the keyboard must be turned on or selected in order for the keyboard lock solenoid 2244 to be energized and permit its manual operation.

As will be noted in the power driver I logic circuit 2134, an auxiliary power driver circuit 2260 has been provided wherein an input signal from any source within the system or external to the system may be provided to energize any other portion of the system or any device or system outside of the writing system described. The power driver circuit 2260 has been interconnected with the operations gate enabling conductor 2206 and an input terminal 2262 is provided for connection to the input source of coded signals. Similarly an output terminal 2264 has been provided which may be connected in controlling relation with any device which is desired to be controlled thereby.

Thus, a plurality of logic circuits have been provided which are adapted to supply energization signals to various portions of the writing system as for example, the system function circuits such as the print on, punch on, punch select, and the like, the machine function logic circuit which supplies controlling signals for the function solenoids of the typewriting machine as the tab, space, backspace, etc. and the particular logic circuits are energized in accordance with a coding wherein a signal must be received in channel 7 in order to energize either the system function logic circuitry or the machine function logic circuitry. Also, whether the channel 1 code is received or not determines whether the code will energize the system function decode circuitry 1952 or the machine function decode circuitry 1950. However, in the event that a channel 7 code is not received, the power driver II circuitry 1954 is energized due to the fact that the not channel 7 code is impressed on an enabling circuit in the power driver logic circuitry 1954.

Thus, the signals corresponding to not true readings in channels one to six are fed to the power driver logic circuit 1954 by means of conductors 1978, 1980, 1982, 1986, 1990 and 1994. The respective input conductors corresponding to not true readings in channels one to six are fed to a plurality of bail solenoids 2260 to 2272 corresponding to bails one through seven, respectively. The bail solenoids 2260 to 2272 are connected to a negative 24 volt DC power supply at conductor 2214, and at the other end to a plurality of power driver circuits 2274 to 2286, respectively, which are connected in current controlling relation to the bail solenoids 2260 to 2272. The bail seven power driver circuit 2286 is provided with an input terminal 2288 which is fed an input signal corresponding to a reading of not seven from the print-punch circuit, to be described in conjunction with FIG. 25. Thus, when a not seven signal is generated in the print encode logic circuit 1850, this not seven signal is fed to the print-punch circuit and thence to the input terminal 2288, the polarity of the signal being adjusted, if necessary, to correspond to the polarity of the signal necessary to properly energize the solenoid 2272. As stated above, each of the norgates 2274 to 2286 are controlled in response to the generation of a not channel seven code from the print encode logic circuit 1850. This not true channel seven code is impressed on an input conductor 2292 and fed as a second input to the input circuit of the respective norgates 2274 to 2286 by means of a conductor 2294. Thus, a not channel seven code must be received in order to energize the respective bail solenoids 2260 to 2272.

An auxiliary driver circuit 2294 is provided to be interconnected with any portion of the system or a device which is desired to be controlled in accordance with the desires of the user. For example, the output of the gate 2294 may be utilized to control an auxiliary reader either simultaneously or alternatively with the main reader. Also, a reader clutch solenoid 2296 is connected at one end to a negative 24 volt source of electrical energy at terminal 2298 and at the other end to a reader clutch power driver circuit 2300 which is connected in controlling relation to the reader clutch solenoid 2296. The input circuit of the reader clutch power driver circuit 2300 is provided with an input signal on a terminal 2302 from the mode control II circuit, to be described in conjunction with FIG. 23. The input signal level on terminal 2302 drops to a logical zero level at such time as the reader gate signal level rises to a logical one level. The second input is provided on an input terminal 2303 from a control mode circuit to be described in conjunction with the print-punch control circuit in FIG. 25. Accordingly, the reader clutch signal level will drop to a logical zero level thereby energizing the power driver circuit 2300 to permit current to flow through the reader clutch solenoid 2296.

PUNCH OUTPUT SUBSYSTEM

Referring now to the flow of data which is desired to be punched in a main punch unit or an auxiliary punch unit, particular attention is directed to FIGS. 21 and 22 wherein are illustrated a punch I output logic circuit 2320 corresponding to channels one through four and a punch II output logic circuit 2322 corresponding to channels five through eight. As stated above, when it is desired to change the particular code of incoming data, it is necessary to transmit the data through the entire system including the "X" and "Y" address encoders and the decode matrix. However, if the code being fed from the input section to the decode registers is the same code which is desired to be transmitted to the output unit, as for example, a punch unit, it is merely necessary to shunt the data around the dual conversion code converter, including the "X" and "Y" address encoders and decode matrix and merely feed the code into the input section of the punch out logic circuitry 2322.

Accordingly, a plurality of input signals are fed to a plurality of input terminals 2330 to 2334 corresponding to channels one to eight. The input data is received from the output terminals 824 of the decode register logic circuits described in conjunction with FIG. 14. For polarity purposes, the not true sides on the decode register flip flop units 806 to 820 have been connected to input terminals 2330, 2344. It is to be understood that, through proper inverter circuits, the true sides of the flip flop units 806 to 820 may be utilized. The input terminals are connected to a plurality of norgates 2346 to 2360 by means of conductors 2362 to 2376. The output of the plurality of norgates 2346 to 2360 are fed to a second plurality of norgates 2380 to 2394 corresponding to channels one to eight respectively. The outputs of norgates 2380 to 2394 are fed to a plurality of output terminals 2396 to 2410 which are lowered to a logical zero level at such time as an indication of a particular bit has been impressed on one of the plurality of input terminals.

The second source of input data is supplied from the punch encode matrix 1762 described in conjunction with FIG. 15 and represents a source of data which has been generated in one of the plurality of sources of data, as for example, the external source, the reader unit, or the typewriter, wherein the user converted the form of the data to a second form due to the incompatibility of the code of the input devices as compared to the code of the output device utilizing the output of the punch encode matrix. This is in contrast to the input data to input terminals 2330 to 2344 which has been provided from the external source or the reader unit and consists of coded data which has an identical code configuration and is compatible with the code of the output device utilizing the coded information means produced by the punch unit. Accordingly, the possibility of error has been greatly reduced in a situation where identical data is to be punched into a punch unit having a particular code configuration which is identical to the code configuration of the input data.

Accordingly, a plurality of output conductors from the punch encode matrix corresponding to channels one to seven are interconnected with a plurality of input conductors 2420 to 2432 to the punch output logic circuits 2320 and 2322. The signals on conductors 2420 to 2432 are fed into a plurality of encode amplifiers 2434 to 2446 which invert the signal level and provide a current boost for the signals being fed to the punch output logic circuit 2320 and 2322. The output signals from the encode amplifiers 2434 to 2446 are fed to a plurality of norgates 2450 to 2462 corresponding to channels 1 to 7 respectively. The outputs of the respective norgates 2450 to 2462 are fed through output norgates 2380 to 2392 and thence to output terminals 2396 to 2408 corresponding to data bits in channels 1 to 7 respectively. An eighth channel norgate 2468 is provided with an input terminal 2470 which may be fed a channel eight signal directly from the decode register circuitry or from any other source in the event that an eight channel code is desired. Also, the channel eight code may be so interconnected with the remainder of the input conductors as to punch an eight channel each time a code has been punched. Thus, the system is capable of being expanded to an eight channel code and the output of the norgate 2468 is fed to the channel eight output terminal 2410 through a norgate 2394.

Inasmuch as it is desirable to disable a particular input or to choose one source of input data or the other being fed to the punch output logic circuit, or on the other hand to disable the output of the punch unit completely, a plurality of enabling circuits have been provided in the form of conductors 2472, 2474, 2476, which are connected to a plurality of input terminals 2478, 2480, 2482 respectively. The input terminal 2478 is connected to the plurality of norgates 2450 to 2468 corresponding to the input norgates from the punch encode matrix circuit 1762. The input signal on terminal 2478 is designated the keyboard encode out signal and, when enabled, will permit data to flow from the input source, as for example the keyboard input through the dual conversion code converter circuitry, to the output conductors of the punch encode matrix. The data signals then flow through the punch output logic circuits 2320 and 2322. Accordingly, any code which is generated in the keyboard system will be encoded into the proper code configuration and pass through to the punch unit through the punch output logic circuits 2320 to 2322. Similarly, if it is determined that the input code which is being generated from the input sources, as for example the external source or the reader source, includes a code configuration which is identical to the code which is to be punched into the punch unit, the decode register output enabling circuit, including input terminals 2480 and 2474, are energized thereby enabling the norgates 2346 to 2360 corresponding to channels one to eight respectively. Thus, the code being generated in the input source of data is shunted around the dual conversion code converter circuitry and passed directly into the punch output logic circuits 2320, 2322 to be punched into the punch unit connected thereto.

However, in certain situations, it is desirable to completely eliminate the punching of the code into the punch unit. Thus, the output inhibit circuit including terminal 2482 and conductor 2476 is energized, thus disabling the output norgates 2380 to 2394. Accordingly, no data will flow through the punch unit itself due to the disabling of the output norgates 2380 to 2394, irrespective of the source of input data. The enabling and disabling signals impressed on input terminals 2478 to 2480 are generated in the mode control circuit, to be discussed in conjunction with FIG. 23, and the output inhibit signal impressed on input terminal 2482 is fed from the print-punch logic circuit, to be described in conjunction with FIG. 25.

The output signals impressed on output terminals 2396 to 2410 are fed to a plurality of input terminals 2484 to 2498 of the punch unit input circuit 2500 including a punch driver circuit 2502 and a punch solenoid circuit 2504. Specifically, a plurality of driver circuits 2510 to 2524 are connected in current controlling relation with a plurality of punch solenoids 2526 to 2540, corresponding to channels one to eight respectively, of the punch unit. The punch solenoids 2526 to 2540 are connected at one end to the current controlling power driver circuits 2510, 2524, and at the other end to a negative source of DC supply, as for example 24 volts, by means of an input terminal 2542 and a conductor 2544. Thus, each input power driver circuit 2510 to 2524 which is energized will provide an actuating pulse to the respective punch solenoids 2526 to 2540 to provide an output in a coded information means (not shown) passing through the punch unit (not shown).

An enabling input circuit is provided to enable, in accordance with a particular sequence, each of the norgates 2510 to 2524 by means of an enabling pulse impressed on an input terminal 2546 and an input conductor 2548. The enabling pulse is generated in the print-punch circuit to be described in conjunction with FIG. 25 in response to the selection of the punch and the generation of the control D signal, also to be hereinafter explained. Thus, when the input terminal 2546 and conductor 2548 are supplied with an enabling pulse, the power driver circuits 2510, 2524 will provide driving current to the output solenoids 2526, 2540 in accordance with the coded actuation thereof. A punch clutch power driver circuit including a punch clutch power driver 2550 and a punch clutch solenoid 2552 has also been connected to the enabling circuits at terminal 2546 to provide driving current through the punch clutch from the negative 24 volt supply impressed on conductor 2544.

Accordingly, the punch clutch will be actuated in accordance with the enabling circuit. A second input circuit has been provided to power driver circuit 2550 including an input terminal 2556 whereby the punch clutch may be separately actuated from the signal generated by the operator. A signal for separately actuating the punch clutch and to be impressed on input terminal 2556 is not provided within the system as embodied and described; however, it is to be understood that any input signal to actuate the punch clutch may be impressed thereon.

CONTROL SYSTEMS FOR CONTROLLING THE OPERATIONS OF THE MAIN WRITING SYSTEM

Clock control

As stated above, certain operations of the writing system are controlled in response to control signals generated by a clock pulse generator system wherein a plurality of clocking pulses are generated to sequentially time the operation of the writing system. For example, in conjunction with the description of the decode register, illustrated in FIG. 13, a not control A clock pulse was utilized in clocking in information into the decode register and the inverse pulse, or a control A pulse was utilized in resetting the decode register. Similarly, a control B pulse is utilized in controlling the operation of the mode control circuit to be described hereinafter, in conjunction with FIG. 23. A control C pulse is generated to clock the operation of the response generator to be described in conjunction with FIG. 25 and a control D pulse is generated to synchronize the operation of and provide a gating pulse for the timing and input to the particular function coils described in conjunction with, for example, the machine functions. A clock pulse generator may take a variety of forms and it is to be understood that the form of a plurality of single shot multivibrators to be hereinafter explained is shown for illustrative purposes and is not intended to be limited to the use of a single shot multivibrator. The clock may be started by a variety of methods, as for example, a start pulse generator in the external input circuit, a manual start pulse generator associated with certain operating portions of the typewriter unit, a reader clock start generator which includes means provided in the reader for providing a clock start pulse or a single cycle start pulse generator to be described in conjunction with FIG. 24.

Referring particularly to FIG. 23, there is illustrated a clock pulse generator circuit 2600 which generally comprises a control A monostable pulse producing means 2602, a control B monostable pulse producing means 2604, a control C monostable pulse producing means 2606 and a control D monostable pulse producing means 2608. The monostable pulse producing means 2602, 2608 are representatively illustrated as a plurality of single shot multivibrators producing output pulses of varying durations and of closely controlled pulse spacing and amplitude. For example, the control A pulse has been chosen to be a 300 microsecond duration, while the control B and C pulse has been chosen to be of a 50 microsecond duration and the control D pulse has been chosen to be of a 15 millisecond duration. It is to be understood that the above-noted time durations have been chosen to representatively illustrate the order of time durations utilized in the embodied system, and these times may be varied in accordance with the type of system in which they are utilized.

Referring now to the clock control A single shot multivibrator 2602, it is seen that a plurality of input circuits comprise input conductors 2612 to 2618 which are connected to a plurality of input terminals 2620 to 2626. The first input terminal 2620 is connected to an external pulsing circuit (not shown) which may be incorporated in the external data source 730 described in conjunction with FIG. 13 or may be provided from any other similar type external source. As described above, the system of the present invention is adapted to be utilized in conjunction with an auxiliary data processing system, as for example, a computer or the like, through an interface unit. The interface unit is adapted to provide compatibility among code configurations, signal sequencing, system operation sequencing, and the like, between the external data processing system and the writing system of the present invention. Accordingly, the clock start pulse impressed on terminal 2620 may be provided either from the interface system in response to certain clocking pulses generated therein or may be provided from the external data processing system through the interface unit.

A second input terminal 2622 is provided with an input pulse from a manual start circuit provided on the keyboard of the typewriting unit, as described in conjunction with FIG. 13. The encoding of a channel two code or the actuation of the filter cam will provide a clock starting pulse from the keyboard circuitry of the typewriting unit. Accordingly, an input pulse to input terminal 2622 will provide a start pulse for the control A single shot multivibrator 2602. The third input to the control A single shot multivibrator 2602 is provided from the reader unit by way of the read control circuit to be described in conjunction with FIG. 24. Accordingly, when the reader is actuated to a predetermined point in its cycle, a pulse is generated which is fed to input terminal 2624 to start the clock generator circuit.

The output of the control A single shot multivibrator 2602 is fed to an output terminal 2630 by means of an output conductor 2632 and is also fed to the input circuit of the control B single shot multivibrator 2604 by means of a conductor 2634. Thus, a predetermined time after the start of the single shot multivibrator 2602 producing the control A pulse, the control B pulse is started. The output of the control A pulse generator at 2630 is fed to the decode register circuit as described in conjunction with FIG. 14 and is also fed to certain other portions of the circuitry to be hereinafter explained. Also, the output pulse on terminal 2630 may be fed to an external data utilizing system as for example, the interface unit described above and/or a further data processing system. The output of the control B single multivibrator 2604 is fed to an output terminal 2636 by means of a conductor 2638 and the output of the single shot multivibrator 2604 is also fed to a control C "inhibit and start" circuit 2640.

The control C "inhibit and start" circuit 2640 generally comprises a bistable circuit means 2642, which takes the form of a flip flop unit, having a set side 2644, the output of which is connected to a control C start gate 2646 by means of a conductor 2648. The output pulse from the control B single shot multivibrator 2604 is fed to the input circuit of a differentiator circuit 2650 by means of a conductor 2652. An output spike is generated on the rising edge of the pulse from the single shot multivibrator 2604 at an output conductor 2658 of the differentiator circuit 2650 due to the discharging of the capacitor contained therein and the output pulse initially sets the conditions in the flipflop circuit 2642. The output pulse from the start gate 2646 is fed to the input circuit of control C single shot multivibrator 2606 by means of a conductor 2660 to start the timing of the control C pulse. However, the input circuit of the start gate 2646 is provided with a second input conductor 2664 connected to an input terminal 2666 wherein an inhibit pulse may be impressed thereon wherein the operation of the start gate 2646 may be inhibited. The input terminal 2666 is connected to the external input system 730, described in conjunction with FIG. 13, and is provided to synchronize the operation of the external data system with the operation of transmitting data from the described writing system. Accordingly, a signal is generated to inhibit the start of the control C pulse until such time as the system is ready to start the next operation, which may occur during the transmitting of data from the writing system to keep the reader in step with the transmission of information.

It is to be noted that the bistable device 2642 stores the control B pulse thereby enabling the start gate 2646 to produce a start pulse at such time as the inhibit signal is removed from input terminal 2666. Accordingly, a start pulse will be generated and fed to the input circuit of a single shot multivibrator 2606 by means of the conductors 2660. After a predetermined period has elapsed, the control C pulse will be generated and fed to output terminal 2668 by means of an output conductor 2670. Also, a not control C pulse is fed to an output terminal 2672 by means of a conductor 2674 in the event a reverse polarity control C pulse is desired. Also, the output of the not control C side of the control C single shot multivibrator 2606 is fed to the input circuit of the control D single shot multivibrator 2608 by means of a conductor 2676 whereby the control D pulse is started a predetermined period after the start of the control C pulse. The output form the single shot multivibrator 2608 is fed to a control D output terminal 2680 and a not control D output terminal 2682 by means of a pair of conductors 2684 and 2686 respectively.

Referring back to the not control C output conductors 2674, it is seen that the pulse generated on conductor 2674 is fed to an input circuit connected to a reset side 2690 flip flop unit 2642 by means of a conductor 2692 and a differentiator circuit 2694. Thus, when the control C pulse is generated, the flip-flop unit 2642 will be reset to preclude the generation of a second control C pulse until such time as a control B pulse has been generated. Also, a second resetting pulse may be fed to the reset side 2690 of the flip flop unit 2642 by means of a reset input terminal 2696 and an input conductor 2698. The reset input terminal 2696 may be connected to the external source to reset the flip flop unit in response to a predetermined condition in the external input data source. Also, a conductor may be provided between the output circuit of the control A pulse generator to the input of the reset side 2690 to reset the flip flop unit 2642 each time a control A pulse is generated.

TAPE AND CARD FEED

Referring now back to FIG. 13, there is illustrated the tape and card feed switching circuit 1370 which is adapted to be associated with the card control circuit 2700 illustrated in FIG. 23. In automatic data processing systems of the type described, it is often desired to enable the operator to manually feed coded information storage devices, as for example punch cards or perforated tape, through the punch unit or to automaticaly position the coded information devices in the punch unit ready for punching operations to be performed thereon. In such units, a tape feed switch is provided to permit the operator to actuate the feed mechanism whereby tape may be fed through the machine; also, suitable circuitry is included whereby a preselected code may be automatically punched into the tape, as for example a delete code. Similarly, it is desirable to enable the operator to position the card within the punch unit and, by actuation of a switch, feed the card to a predetermined position within the punch unit whereby the punching operation may be started at the preselected position.

Referring to FIG. 23, a tape feed switch 2702 and a card feed switch 2704 are provided on the keyboard of the typewriter unit which may be actuated by the operator when it is desired to feed tapes or cards through the punch unit. Referring to the tape feed switch, a tape feed armature 2706 is connected to a zero volt source of potential by means of a common terminal 2708, a tape enabling switch 2710, a conductor 2712 and an input terminal 2714 connected to the source of zero volt potential. The switch armature is adapted to be moved from a normal terminal 2718 to a transfer terminal 2720 when the feed switch is actuated to feed tape through the punch unit and the switch is transferred back to the normal terminal when it is desired to cease feeding tape through the unit. The normal terminal is connected to an output terminal 2722 and the transfer terminal is connected to a second output terminal 2724 to provide energization signals for the feed circuit 2700.

Specifically, the output terminal 2724 is connected to an input terminal 2726, which is connected to the true side 2730 of a bistable circuit 2732, representatively illustrated in the form of a flip flop unit, by means of a conductor 2734. The other output terminal 2722, connected to the normal terminal 2718, is connected to an input terminal 2736 which is also connected to a not true side 2738 of the flip flop unit 2732 by means of a conductor 2740. Thus, with the tape enabling switch 2710 in the normal position shown, and with the tape feed switch 2702 also in its normal position as shown, a zero volt source of potential is impressed on output terminal 2722 and input terminal 2736 to switch the flip flop unit 2732 to its reset state. Thus, an output terminal 2742, and its attendant output conductor 2744, is normally at a logical one signal level and not feeding tape through the tape unit. However, when the tape feed switch 2702 is transferred to the transfer terminal 2720, with the tape switch 2710 in its normal position, a logical one level signal is impressed on output terminal 2724 and thence to the true side 2730 of the flip flop unit 2732. Accordingly, the flip flop unit will be switched to a set state whereby a logical zero signal level appears at the output terminal 2742.

It is to be understood that the output terminal is connected to a mechanism within the punch unit to actuate the punch unit and feed tape therethrough. Simultaneously with the feeding of tape through the punch unit, the logical zero signal is fed to a delete norgate 2976 by means of a conductor 2978 to punch a delete code in the tape unit when tape is being run therethrough. The delete norgate is provided with a second input from a punch cam norgate 3022 by means of a conductor 3026 to synchronize the operations of the punching of the delete code in the tape with the punch cam unit. The input signal to norgate 3022 is fed by means of an input terminal 3024, which receives an input signal from the punch cam within the punch unit itself. Accordingly, when the punch cam is actuated, an enabling signal is fed to delete norgate 2976 to provide an output signal on delete output terminal 3030. The delete output terminal 3030 is fed to the keyboard encode I circuit 952 described in conjunction with FIG. 14, and particularly may be fed to an input terminal 2762. The input terminal 2762 is interconnected with gates 982 and 996 corresponding to bails two and five, respectively, by means of a conductor 2764. Thus, the delete code is encoded by means of the keyboard encode I circuit 952 and thence passed through the system to be punched into the punch unit.

Referring to the card feed circuit and particularly to the card feed switch 2704 and a card hold switch 2770, the card feed system is adapted to feed cards through the punch unit, each card being fed to a particular point within the punch to position the card as described above and a punch operation is performed thereon. The card hole switch 2770 and the tape switch 2710 are, in a preferred system, mounted on the punch unit itself and are adapted to be engaged by a card being passed through the unit. When the card is fed into the tape unit, the tape enabling switch 2710 is engaged whereby an armature 2780 is transferred from a normal terminal 2782 to a transfer terminal 2784. It is to be noted that this switch is not engaged during the tape feed operations but is engaged during the card feed operation.

During the operation, the tape feed circuit is disabled due to the transfer of armature 2780 from normal terminal 2782 to transfer terminal 2784 with the armature 2780 in contact with terminal 2784. The zero volt potential at terminal 2714 is fed to the armature 2772 and, with the transfer of armature 2772 to the transfer terminal 2776, a zero volt potential is impressed on a conductor 2790. The zero volt potential on conductor 2790 acts to switch a switch trigger 2792 to its unstable state whereby a logical zero signal level is impressed on output terminal 2794 by means of output conductor 2796. The rise in signal level from a logical zero to a logical one level is impressed on a differentiator circuit 2800 by means of input terminal 2802 and an output spike is fed from the differentiator circuit 2800 to the true side 2730 of the flip flop 2732. Thus, the flip flop unit is switched to its set state to provide a feed signal at the output terminal 2742.

When a card is manually inserted into the machine, a tape switch 2780 is transferred to its transfer terminal 2784 by means of the card engaging the switch. Accordingly, a zero volt signal is impressed on an output terminal 2806 by means of a conductor 2808. This zero volt signal is fed to a differentiator circuit 2810 connected to the set side 2730 of the flip flop unit 2732 by means of an input terminal 2812 whereby the flip flop unit 2732 is switched to its set state and provides a feed signal at output terminal 2742. During the period that the card is in the machine, the card hold switch 2770 is similarly engaged wherein an armature 2816 is switched from its normal terminal 2818 to its transfer terminal 2820. Accordingly, the voltage at output terminal 2824, which is connected to the normal terminal 2818, will drop to a logical zero signal level. The card has been provided with a hole in the alignment with the card hole switch 2770 whereby the switch 2770 is initially transferred to the transfer terminal 2820 and, when the card hole is in alignment over the switch 2770, the armature 2816 is allowed to switch back to the normal terminal. Accordingly, the signal level on output terminal 2824 rises from a logical zero level to a logical one level thereby providing a rising signal edge at input terminal 2830. The rising signal edge is fed to a differentiator circuit 2832 to permit the capacitor contained therein to discharge and provide an output spike to the not true side 2838 of flip flop unit 2732. Thus, the flip flop unit 2732 is reset to cease the feed signals impressed on output terminal 2742. In this way, the card is properly positioned within the punch unit in preparation for punching coded information therein.

For an automatic operation of the card feed flip flop unit 2732, a card feed code input terminal 2838 is provided whereby a card feed code being read in the reader unit or the external input unit will provide an energizing signal for the differentiator circuit 2800 by means of the terminal 2838 and an input conductor 2840. Thus, the tape being passed through the reader unit or the external input signals may provide an automatic feed signal for the card to initially set the flip flop unit 2732 and provide energizing signals at output terminal 2742. As described above, when the card reaches the card hole switch 2770, the switch armature 2816 will be transferred back to the normal terminal 2818 to provide a stop signal for the card feed unit at input/terminal 2830, thereby resetting flip flop unit 2732 and ceasing the feed signals on output terminal 2742

MODE CONTROL LOGIC CIRCUITS

Referring now to the remaining portion of FIG. 23, there is illustrated a mode control I logic circuit 2901 and a mode control II logic circuit 2903 which are adapted to provide control signals to enable certain portions of the data processing system. For example, certain signals are generated to enable the operations or function decode logic circuits, to enable the decode register logic circuit, to energize the punch cam and the reader clutch, and the like. However, these particular functions are desirably made responsive to a plurality of predetermined conditions within the system in order to properly synchronize the operation of the system with the flow of data. Accordingly, certain gating functions within the system are enabled in response to the occurrence of timing signals described above, as for example the control B and control D timing pulses. Also, portions of the mode control circuits are utilized to encode certain system functions, as for example the end of block and end of address codes provided for the use of a remote or master system when the system is utilized as a terminal data processing system in conjunction with the master data processing system. Also in this regard, certain control signals are generated within the mode control logic circuits when it is desired to use the data processing system as an input output unit or to operate in an off-line mode, thereby disassociating the system with the central data processing system.

Referring now to the mode control I logic circuit, it is seen that an operations decode output pulse is provided at an output terminal 2905 and a function decode output pulse is provided at an output terminal 2907. As stated in conjunction with the output decode circuits, a particular logic circuit has been provided to decode the operations for machine functions and a second logic circuit has been provided to decode the system functions. Accordingly, a control signal is generated to selectively enable one of the logic circuits, either the operations decode logic circuit or the function decode logic circuit, in accordance with the selected enabling signal. The enabling signal is generated in accordance with the particular code configuration of the operations code or the function code. In the particular code chosen, the presence of a bit in channel one and the presence of a bit in channel seven will indicate an operation code and the absence of a bit in channel one and the presence of a bit in channel seven will indicate a system code.

In order to selectively respond to these particular codes and certain other codes, a norgate circuit 2910 has been provided, including a plurality of input terminals 2912, which have been connected to respond to particular codes generated within the system. Specifically, a $\overline{\text{print select}}$ input signal is impressed on an input terminal 2914, the $\overline{\text{print select}}$ signal being generated in a select register circuit to be described in conjunction with FIG. 25. However, at this time it is sufficient to assume that, if a print-on code has been read and the printer has been turned on, a $\overline{\text{print select}}$ code will be generated in the select register and impressed on the input terminal 2914. Similarly a $\overline{\text{print ready}}$ input terminal 2916 has been provided which corresponds to the $\overline{\text{print ready}}$ code which was a constituent of the $\overline{\text{print select}}$ signal impressed on input terminal 2916.

Also, a $\overline{2}$ coded signal is impressed on an input terminal 2918, a true channel three input signal is impressed on input terminal 2920 and a true channel one signal has been impressed on an input terminal 2922. The channels one, two and three input signals may be derived from any portion of the system these input signals are generated, as for example at the decode register output terminal. Also, a channel seven input bit is provided on an input terminal 2924 and fed to the input circuit of the norgate 2910. The channel two and three signals have been provided in view of the fact that all operation and function codes have been chosen to have a channel two bit therein and all operations and functions codes have been chosen so that they will not have a channel three bit. Similarly, all operations codes have been chosen so they will not have a channel one bit and all function codes have been chosen so that they do have a channel one bit.

Accordingly, if the conditions indicated at the input circuit to norgate 2910 have been fulfilled, the norgate 2910 will "and" the input signals to provide output signal at conductor 2926, this output signal being fed to an inverter gate 2928. This inverter gate provides an operation decode enabling signal at the output terminal 2905 of the operations decode enabling circuit to enable the operations decode logic circuit. Similarly, the function decode output terminal 2907 is fed from a gate 2930 which is provided with inputs from a channel seven bit as described above, a not true channel one bit at input terminal 2936 and also with bits from not true channel two and true channel three. These conditions are fed to gate 2930, which is connected in an "and" configuration and, if all the proper conditions are present, will provide an output signal at the output terminal of gate 2930. This output signal is inverted by a gate 2038 and fed to the output terminal 2907 to enable the function decode logic circuits.

Certain other control signals are received into the mode control I circuit 2901 and are provided with buffer circuits to boost the current level of the signal. Accordingly, the control A output signal on a conductor from the clock pulse generator circuit is impressed on a conductor 2942 and fed through an inverter or buffer gate 2944 to provide a $\overline{\text{control A}}$ output signal at an output terminal 2964. This output signal is fed to the decode register circuit described in conjunction with FIG. 14 and provides a clocking pulse for the differentiator circuits to clock not true bits into the decoder register. The output signal from gate 2944 is also fed to a second buffer gate 2948 and thence to an output terminal 2950 to provide a control A signal. This control A signal is fed into the reset input terminal 852 to reset the flip flop units in the decode register circuit described in conjunction with FIG. 14. Similarly, a control B pulse is fed into the mode control I logic circuit by means of a conductor 2954 and thence fed to a buffer gate 2956 to provide a $\overline{\text{control B}}$ output signal at an output terminal 2958. This output signal is utilized in conjunction with certain functions of the mode control II circuit, as with the operations decode and function decode logic circuits, and also may be interconnected to other portions of the system wherein a control B pulse is required.

The above described enabling circuits are provided with another input at conductor 2940 which is responsive to the output of an external source circuit when the system is receiving data from an external source the operation and function decode enabling circuits are disabled thereby precluding the circuits from providing enabling pulses to the operation or function decode logic circuits. A reader gate output terminal 2962 has been provided to enable the reader unit, as described in conjunction with FIG. 13, and the output signal at terminal 2962 is made responsive to the reader being turned on and a condition wherein the system is not receiving an external input from the external data input device nor tape or cards being fed through the system. Accordingly, the output of gate 2964 is fed to the output terminal 2962 by means of a conductor 2966.

A plurality of inputs are included in the input circuit wherein the first input is from a read-on input terminal 2968 receiving an input signal from the reader control circuit, to be described in conjunction with FIG. 24. As will be seen from a discussion of FIG. 24, the read-on pulse is made responsive to the actuation of the reader switch on the keyboard. The input pulse on terminal 2968 is fed through an inverter gate 2970 and thence to the input circuit of the gate 2964. Also, an input signal to gate 2964 is provided from an external input receive input terminal 2972 which disables the gate 2964 in the event a signal is being generated in the external input, to signify that the system is receiving data from the external input. Also, this latter input signal is fed to the gate 2964 by means of a conductor 2974 and the gate 2964 further receives an input from a feed output gate 2976, which includes an input signal from a feed input terminal 2978. Accordingly, if the system is feeding tape or cards through the reader unit, a disabling signal will be fed to the gate 2964 by means of the conductor 2980 and a second conductor 2982. Similarly, if the conditions are met of the reader being on and the system is not receiving input from the external data input source or not feeding cards or tape, an output signal will be provided at output terminal 2962 to enable the reader gate circuit.

If the reader is enabled by a signal at the output terminal 2962, the print inhibit circuit, which provides an inhibiting output signal at termnial 2986 to inhibit the printer, will provide an output pulse at the terminal 2986. As is seen, output of gate 2964 is fed to the input circuit of a print inhibit gate 2988 by means of a conductor 2990 thereby inverting the reader gate signal at conductor 2966. Similarly, the print inhibit output terminal 2986 will be provided with an inhibit signal in the event that the system is receiving data from external input source due to the fact that the input terminal from the external input receive terminal 2972 is connected to the input circuit of the gate 2988 by means of a conductor 2992. The print inhibit signal is fed through the print-punch control circuit, to be described in conjunction with FIG. 25, to thereby inhibit the printer.

As stated in conjunction with the description of the punch output logic circuit (FIG. 21), the operator is able to choose the particular data source through the system which is to be fed to the punch unit. Accordingly, the data flowing through the decode matrix and encode matrix may be chosen or the data flowing directly from the decode register may be chosen by the proper inhibit signal for the gates as described therein. A keyboard gate or keyboard encode out signal is provided at output terminal 3000, wherein the keyboard encode out signal is fed to input terminal 2478 in FIG. 21. The inhibit signal being fed to terminal 3000 is provided by a pair of norgates 3002 and 3004 and a conductor 3006. The gate 3002 is provided with a pair of input signals, the first of which is fed from the output circuit of the print inhibit gate 2988 by means of a conductor 3008 whereby the keyboard gate signal inhibits the operation of the respective norgates, and the punch output logic circuit of FIG. 21 in the event the printer is being inhibited. Also, the output of gate 3002 is inhibited in the event that tape or cards are being fed through the system due to the fact that an input signal is fed to the gate 3002 from the feed output gate 2976 by means of a conductor 3010.

Similarly, if the decode register output circuit connected to decode register inhibit input terminal 2480 is desired to be enabled or disabled, depending on the polarity of the signal as described in FIG. 21, an inhibit signal is impressed on the input terminal 2480 by means of decode register punch output terminal 3014. The output signal on output terminal 3014 is provided by a decode register output inhibit gate 3016 which receives a plurality of input signals, the first of which inhibits the output thereof in response to the reader gate being enabled. The second input signal from the receive input terminal 2972 inhibits the gate 3016 in the event that the system is receiving data from an external input. It is to be noted that the decode register punch output is enabled in response to either the receiving of external input or the condition of the system reader gate.

The punch cam enabling circuit is provided by means of a punch cam output terminal 3020 which is connected to a punch cam gate 3022. The punch cam input signal is provided by a punch cam input terminal 3024 which receives an input signal from a cam sensing circuit contained within the punch unit itself. Accordingly, when the punch cam is energized by means of the gate 3022, a signal is also fed to the delete encode output norgate 2976 by means of a conductor 3026. The output of the gate 2976 is connected to a delete encode output terminal 3030 connected to the keyboard encode I circuit to encode a delete code. The delete code is passed through the system to punch the code into the tape or cards passing through the punch unit. A delete switch connected to a zero volt source of supply may be included in the keyboard circuit and connected to the output terminal 3030 to provide a delete encode output signal in the event the delete code switch is actuated. The circuit has not been shown in the schematic diagram, but may be interconnected with the output terminal 3014 to provide the output pulses at the terminal 3014.

Referring now to mode control II logic circuit 2003, there is illustrated a plurality of encoding gates 3036 to 3040, comprising diode gates of the type described in conjunction with FIG. 8b. As stated in conjunction with FIG. 13, certain system function switches are not encoded in the keyboard encode circuits, but rather are encoded in the mode control II circuit and then fed back to the bail four, five and six gates 992, 996 and 998 described in conjunction with FIG. 14. Specifically, an end of address switch is connected to an end of address input terminal 3042 and fed to the input circuits of gates 3034 and 3036 by means of a conductor 3044. Accordingly, the end of address function is encoded into the bail four gate 992 by means of output terminal 3046 connected to an input conductor 3048 of the gate 992 input circuit. Similarly, the end of block switch on the keyboard is connected to an end of block input terminal 3050, the terminal 3050 being connected to the input circuit of gates 3034, 3036, and 3038.

The output of gate 3038 is connected to an extended channel five output terminal 3052 which is in turn connected to the input circuit of the bail five norgate 996 by means of a conductor 3054. Accordingly, the end of block function is coded in channels four and five by means of gates 3036 and 3038. The end of address and end of block functions are utilized as a signal code when the system is interconnected with a master data processing system described above. Thus, the end of address and end of block codes may be selectively encoded into the system to be punched at the output punch unit and/or signal the master system.

The keyboard on switch provided on the keyboard is connected to an input terminal 3056 which is connected to the input circuits of gates 3034, 3036 and 3040, the latter of which is connected to an extended channel six output terminal 3060. The output terminal 3060 is connected to the input circuit of the bail six gate 998 by means of a conductor 3062. Accordingly, the keyboard function is encoded as channels four and six. A reader start switch is also connected to an input terminal 3064, the input terminal 3064 being connected to the input circuits of the gates 3034 to 3040, thereby encoding the reader start function in channels four, five and six. It is to be noted that the input signals to the terminals 3042, 3080. The output terminal 3078 is connected to control thereby providing an output signal at the manual start output terminal 3070. This output signal is inverted through a gate 3072 which is also provided with input signals from a select transmit switch, utilized in conjunction with the master data processing system. Accordingly, if the central data processing system is being utilized, the manual start switch will be inhibited by means of a signal on conductor 3074. The select transmit switch is connected to an input terminal 3176 which provides the signal on conductor 3074 and also provides a switch gate output signal at an output terminal 3078 of a gate 3080. The output terminal 3078 is connected to control the ready latches in the reader control circuit, to be hereinafter described in conjunction with FIG. 24.

In the event the terminal system described herein is utilized in conjunction with the master control data processing system, it is necessary to permit codes to operate the select registers, and to inhibit codes from operating ready registers. Accordingly, a code gate is provided including a code gate norgate 3084 which is provided with an input from an on-line input terminal 3086 adapted to receive an on-line input signal from the master data processing system and also an input signal from a control B input terminal 3088. Also, if the select/all switch is operated to the all position, an enabling signal will be provided to the input circuit of gate 3084 by means of an input terminal 3090 and an input conductor 3092. The output signal from gate 3084 is connected to the output terminal 3082 by means of an inverter gate 3094. In the event the all switch is actuated, an output signal is provided at an output terminal 3096 through a diode gate 3098 to parts of the output terminal 3016 connected to the print and clutch ready circuits, to be described in conjunction with FIG. 25. The signal on the output terminal 3096, in the event the all switch has been actuated, holds the print and punch triggers to the ready on position thereby permitting the codes to be printed and punched. The select-all switch is also connected to a function code output terminal 3100 which is connected to the keyboard encode circuit, described in conjunction with FIG. 14, to permit the pushbuttons provided on the keyboard to encode the actuation of the switches when the select-all switch is in the all position. The output of the select transmit gate 3080 is also provided to the input circuit of the functioning code gate 3102 of the leader conductor 3104.

In the event that the reader is not on or the system is not receiving data from an external data source, a keyboard or manual mode output terminal 3110 is provided with an enabling signal to permit the keyboard to encode signals into the data processing system. The output terminal 3110 is connected to a read-on input terminal 3112 and a receive-on input terminal 3114 which enables the control signal of the output terminal 3110 in the event that the reader is not on and the system is not receiving external data. The input signals on input terminals 3112, 3114 are fed to a norgate 3116 and thence to the output terminal 3110 through an inverter gate 3118. Further, a reader clutch circuit is provided which permits the reader clutch to cycle in synchronism with the generation of the control D signal. To this end a reader-on inupt signal is impressed on a reader-on terminal 3120 and a control D input signal is impressed on a control D input terminal 3122. The reader-on signal is impressed on a gate 3124 and a control D signal is impressed on gate 3126. The output of gate 3124 and 3126 are combined by means of conductor 3128 to provide an output terminal 3130 in the event that the reader has been turned on and the control D signal is present.

If the reader has been off, the control D signal will be ineffectual to raise and lower the signal voltage level on conductor 3128 to thereby disable the cycling of the reader clutch. When in the off-line mode, the select register, to be described in conjunction with FIG. 25, is disabled by means of constant logical one level signal being impressed on the input circuit to the select register flip flop units. The disabling circuit is connected to a select register on output terminal 3134 which receives an input signal from the external input source by means of an input terminal 3136. The signal is inverted through a buffer gate 3140 and fed to the output terminal 3134 by means of a conductor 3142. Accordingly, in the off-line mode a logical one signal will appear on output terminal 3134 to impress a constant zero volt signal thereon when the terminal data system is in the off-line mode.

READER CONTROL AND INTERBLOCK CIRCUIT

Referring now to FIG. 24, there is illustrated a reader control and interlock circuit which is adapted to provide clock control start signals in the situation where the reader or the manual entry is being utilized and also to provide external interlock control signals to inhibit the further feeding of data information to the system by means of an external data source during the period that a function is being performed within the terminal data processing systems. In the latter situation, when the function is completed, the external interlock circuit provides a control signal to indicate to the external data processing system that the function is complete and the next bits of data may be fed to the terminal data processing system.

Referring now to FIG. 24, there is illustrated a reader control and interlock circuit 3150, the circuit being utilized in providing clock-start signals from a read-start output terminal 3152 or a manual start output terminal 3154. The clock-start signals are fed to the input circuit of the control A pulse generator or single shot multivibrator to initially start the clock pulse generator. Referring particularly to the reader clock start pulse and output terminal 3152, it is seen that a norgate 5158 is provided wherein the output conductor of the norgate 3158 is connected to the output terminal 3152 and the input circuit is provided with a plurality of inputs from various portions of the read control and interlock circuit. The first input is provided at an input terminal 3160 which is connected to the reader switch provided in the reader unit itself wherein the operation of the reader provides a continuously pulsing signal to the input circuit of a reader switch gate 3162. The output of the reader switch gate 3162 is provided to the input circuit of the norgate 3158 and this input signal is of a logical zero level, when the reader switch is actuated.

Similarly, a second reader input terminal 3164 is provided and is connected to the reader-select circuit in the select register system, to be described in conjunction with FIG. 25. When the reader-select signal drops to a logical zero level this logical zero signal is fed to the input circuit on the norgate 3158 by means of a conductor 3166. A third input to the norgate 3158 is provided by means of a start-stop flip flop circuit 3170, the set side 3172 thereof being connected to the input circuit of the norgate 3158 and the reset side 3174 being connected to the input circuit of the set side 3172. The set side 3172 is provided with an input pulse to set the flip flop unit 3170 by means of a start switch input circuit including an input terminal 3176 which is connected to the input circuit of the set side 3172 through a differential circuit 3178. Accordingly, when the start switch is actuated, a pulse will be fed to the set side 3172 to set the conditions within the flip flop unit 3170 and provide a logical zero signal to the input circuit of the norgate 3158.

The conditions within the flip flop unit 3170 are reset by means of a plurality of input circuits to the not true side 3174. The first input circuit includes a stop-gate 3180 which is provided with input signals from a stop code input terminal 3182 and a stop switch input terminal 3184. Accordingly, when a stop code is read in the data processing system or the stop switch on the keyboard is actuated, an input pulse will be provided to the gate 3180 due to the suitable connections to the source of pulses. The rising edge of the output pulse of the gate 3180 will cause a differentiator circuit 3190 connected thereto to produce a positive going spike to the reset side 3174 thereby resetting the conditions within the flip flop unit 3170. However, the input circuit to the differentiator 3190 is provided with an input signal from the control D timing pulse circuit by means of an input terminal 3192 whereby the end of control D permits the pulse to pass through the differentiator 3190 and reset the flip flop 31370. Accordingly, as long as the output signal from gate 3180 has dropped to a logical zero level, a rise in voltage to a logical one level of the control D signal provides the output pulse to the norgate 3174.

A further input pulse to the reset side 3174 is provided by an end of tape circuit which may be incorporated into a reading unit or other portions of the circuit to sense the end of the tape being passed through the reader. This input signal is fed to an input termial 3196 and then fed to the reset side 3174 by means of a conductor 3198. In the event that the system becomes locked due to control signals being generated which are not in synchronism with the remainder of the system or through mechanical failures or other types of problems, it is necessary to provide a reset button in order to reset the clocking or cycling of output pulses being fed to output terminal 3152. The actuation of the reset button on the keyboard will produce an input pulse at input terminal 3200, this input pulse being fed to the reset side 3174 of flip flop 3170 by means of a conductor 3202. Also, when the system is in a control mode, the clock-start circuit is inhibited by means of an input signal generated in the external data input circuit, thereby inhibiting the operation of the clock-start norgate 3158. This control mode input signal is fed to an input terminal 3206 and is further fed to the input circuit of the norgate 3158 by means of a conductor 3208. At the end of the control mode, the inhibit signal is removed from the input 3206 thereby permitting the reader to function and pulse the clock starting circuit.

As described above, a manual-start clock circuit has been provided to impress the clock starting signals on output terminal 3154. The output terminal is connected to a manual mode gate 3210 connected to the output terminal 3154 by means of a conductor 3212. The manual start signal at output terminal 3154 is derived from a manual mode input terminal 3216 which is connected to the output circuit of the manual mode norgate described in conjunction with FIG. 23, the input terminal 3216 being connected to the output terminal 3110 in FIG. 23. The input circuit of the manual mode norgate 3210 is also connected to the output circuit of an external input interlock flip flop 3220 to delay the starting of the clock circuit and the manual start pulse fed to output terminal 3154 until such time as any function being performed in the system is completed. If the function in progress is not completed before switching to the manual mode, the clock will be started prematurely and the system will be out of synchronism. The output of flip flop unit 3220 is fed to the input circuit of the norgate 3210 by means of a conductor 3222. A second inhibit input pulse is provided on a conductor 3224 during the period when an output signal is not being fed from a special single shot multivibrator, to be described in conjunction with the manual single shot output. Accordingly, when all of the input signals to norgate 3210 are at a logical zero level a manual start clocking pulse is provided to output terminal 3154.

As stated above, an external interlock flip flop unit 3220 is provided to inhibit the further feeding of input signals to the system from the external data circuit during the period in which certain or all of the system functions are being performed. The desirability of inhibiting the external data source during the operation of the system becomes apparent when it is appreciated that certain operations may take longer to perform than the normal cyclic rate of the system. For example, a carriage return may be of sufficient duration to permit an additional two or three codes to be fed from the external source into the system during the period in which the carriage is physically returning to the start position. Also, it is desirable to delay the starting of the clock pulse generator during the period when the operations are being performed by the system to preclude the possibility of starting the clock prior to the completion of the operation thereby interfering with the synchronism of the system.

Accordingly, a bistable storage circuit 3220, in the form of a flip flop unit, is connected to the external input interlock circuit comprising the norgate 3230, wherein the output of the norgate 3230 is fed to an external input interlock output terminal 3232. The output terminal 3232 is normally at a logical one signal level and, when the interlock circuit is operating, the signal level drops to a logical zero level. Accordingly, the flip flop unit 3220 includes a reset side 3234 which is normally at a logical zero level to provide a logical one level signal at the output terminal 3232. Also, the flip flop unit 3220 includes a set side 3238, which is provided with a plurality of inputs to set the flip flop unit 3220 when it is desired to interlock the external data source.

The set side 3238 is provided with an input pulse from a differentiator circuit 3240, which provides the input pulse in the form of a rising spike, at such time as the input signal to the differentiator circuit 3240 rises from a logical zero level to a logical one level. The input circuit of the differentiator 3240 includes an input signal from a print norgate 3246 which receives a signal from the print gate terminal 3244 connected to the print gate terminal 2292 of FIG. 20. Accordingly, each time the print magnets are energized, an input signal will be received at the print gate input terminal 3244 to provide an output signal at the norgate 3246. This input signal at the print gate 3244 will generate a positive going spike to set the flip flop unit 3220 and drop the voltage level at the interlock output terminal from a logical one to a logical zero level. Accordingly, the external data source will be interlocked at such time that the print magnets are energized.

The differentiator circuit 3240 is further provided with an input from an operating gate norgate 3250 to similarly set the flip flop unit 3220 during the period when an operation is being performed within the system, as for example, a carriage return operation or the like. To this end, the operations gate norgate 3250 is provided with input signals from a diode gate 3252 by means of a conductor 3254. The input circuit of the diode gate 3252 is provided with a plurality of input signals from an operations decode input terminal 3258 and an operations gate input terminal 3260. The operations decode input terminal 3258 is interconnected with the operations decode output terminal 2905, described in conjunction with FIG. 23, and the operations gate input terminal 3260 is interconnected with an operations gate output signal which is utilized in gating the magnetic driver circuits, to be described in conjunction with FIG. 25.

The operations decode and operations gate signals are interconnected with the input circuit of the diode gate 3250, the gate 3250 acting as an "and" circuit, such that both the operations decode signal and the operations gate signal must coincide before an output pulse is provided by the differentiator circuit 3240 from the operations gate norgate 3250. The "and" configuration is provided due to the fact that the operation gate is operative both in the operations and functions operation of the system and, in the preferred system, it is only desired to interlock the external data input during the operations portion. Also, during certain other periods of operation of the system, the operations decode signal is generated. Accordingly, since the operations decode signal provided at input terminal 3258 only occurs when an operation has been indicated, the coincidence of the two signals at input terminals 3258 and 3260 is a condition precedent to the energization of the operations gate norgate 3250.

While the gate 3252 has been illustrated as having input signals from the operations decode circuit and the operations gate circuit, it is to be understood that certain inhibiting signals may be provided at the input to the gate 3252. For example, if the operator desires to inhibit the external input interlock circuit during the period that the upper shift or lower shift codes are being generated, a third and fourth input terminal may be provided to the gate 3252 whereby the operations decode and operations gate signals will be ineffective to provide an output signal at the external input interlock output signal 3232 during the upper shift and lower shift codes. Accordingly, an opposite polarity signal will be fed to the gate 3252 during the period that an upper shift or lower shift code is being generated within the system to inhibit the effect of the combination of the operation decode and operation gate signals or to inhibit the operation of one of the said signals. In this situation, if a second upper shift or lower shift code is received at the input terminals to the diode gate 3252, the system will be locked into the external input interlock circuit whereby the interlock will not be removed from a resetting signal.

The reset side 3234 of the flip flop unit 3220 is provided with a plurality of input signals which are adapted to reset the flip flop 3220 thereby removing the external input interlock signal from the output terminal 3232. The first of the reset signals is provided from the reset input terminal 3200 described in conjunction with the clock start circuit wherein a reset signal is provided by means of a conductor 3202 to the input circuit of the reset side 3234. Accordingly, the flip flop unit 3220 may be reset by manually actuating a button or switch on the keyboard of the typewriter unit. A further input to the reset side 3234 is provided by means of a differentiator circuit 3270 which provides an output spike to the reset side 3234 at such time as a rising input signal level is received at the input circuit thereof. The differentiator 3270 is energized by means of a manual output norgate 3272 and a manual single shot multivibrator 3274, the latter being connected to a plurality of input terminals 3276 and 3278 corresponding to a keyboard output circuit and a manual output circuit, respectively.

The single shot multivibrator is chosen to be of the type which provides a rising output pulse from a logical zero to a logical one level at such time as the input signal rises from a logical zero to a logical one level and will maintain this logical one signal level on a conductor 3277 connected to the input circuit of the gate 3272 for a predetermined period after the input signal drops to a logical zero level. The additional time delay is determined by the circuit elements contained within the single shot multivibrator 3274 and is of sufficient duration to insure that any bounce in the switches providing the signal or gap in signal level at the input terminals 3276, 3278 will not affect the output signal level on conductor 3277. Accordingly, the output signal from single shot multivibrator 3274 will rise to a logical one level to switch the output signal at the output terminal of the gate 3272 to a logical zero level.

At such time as the single shot multivibrator 3274 drops to a logical zero level, the output signal from gate 3272 to differentiator circuit 3270 will abruptly rise, thereby providing a positive output spike at the output terminal thereof. This output spike is fed to the reset side 3234 to reset the flip flop 3220, thereby removing the external input interlock signal being fed to the external input interlock gate 3230 by means of conductor 3278. As stated above, the output of the gate 3272 is interconnected with the input circuit of the manual mode norgate 3210 by means of conductor 3224. Thus, the manual clock start pulse being fed to output terminal 3154 from the gate 3272 is permitted to pass through norgate 3210 during the period that the output of the single shot multivibrator is at a logical one level, thereby rendering the output of the gate 3272 at a logic zero level. At such time as the logical one level signal drops to a logical zero level, the manual mode input terminal is at a logic zero level, the gate 3210 will be enabled to provide the manual clock start output signal at output terminal 3154. The manual mode input terminal 3216 is utilized to inhibit the manual start pulse at output terminal during the period when the reader or external input is being utilized.

The input terminal 3276 is connected to the keyboard output gate circuit at output terminal 1110, described in conjunction with FIG. 14, which includes a circuit connected thereto for sensing the operation of the filter cam switch and the bail two norgate, the latter of which senses the operation of bail two and certain function switches contained within the typewriter unit. Accordingly, when a function switch is actuated or the respective bails are actuated, including the filter cam switch, a pulse is fed to terminal 3110 and thence to the input terminal 3276 to energize the single shot multivibrator 3274. Thus, during the operation of the keyboard, including either the filter cam switch or the bail two norgate, the external interlock circuit will provide an inhibiting pulse at output terminal 3232.

The manual input terminal 3278 is interconnected with manual start output terminal 3070, described in conjunction with FIG. 23, and provides an input signal to actuate single shot multivibrator 3274 at such time as the remainder of the switches not interconnected with terminal 1110 are actuated. The switches include the end of address, end of block, keyboard on and read start switches contained on the keyboard of the typewriter unit. It is to be noted that, when the switches are actuated, a pulse will be fed to the output manual start gate 3072 thereby providing an output signal at terminal 3070. Accordingly, when the remainder of the switches on the keyboard are actuated, an output pulse will be provided from the single shot multivibrator 3274 to provide an inhibit signal at the external input interlock output terminal 3232.

It is to be noted that the keyboard output circuit and manual circuit connected to input terminals 3276 and 3278 will be actuated during the off-line period or when the external input interlock circuit is not being utilized. Accordingly, the output signal level at the output terminal of manual output gate 3272 will rise and fall in accordance with the actuation of the keyboard switches whether they be those connected to terminal 3276 or those connected to terminal 3278. Accordingly, the output signal on conductor 3224 being fed to the input circuit of the manual mode gate 3210 will drop and then rise in accordance with the actuation of the particular switches described. Thus, the start of the function will provide an output pulse at manual output terminal 3154 to permit the start of the clock circuit.

The above described operation is maintained in synchronism with the control D pulse due to the fact that a control D input circuit is provided to the input circuit of the external interlock norgate 3230. Accordingly, a control D input terminal 3280 is interconnected with the external input interlock norgate 3230 by means of a conductor 3282 to thereby provide an external input interlock inhibit pulse at output terminal 3232 during the period in which control D is being generated within the system. In the event that the flip flop unit 3220 is not set by an input signal to the print gate norgate 3246 or the operations gate norgate 3250, as may occur in certain operations of the system, the control D pulse will provide the inhibit signal at the output terminal 3232 to preclude the further receipt of external data during the control D period. Accordingly, the external input interlock inhibit signal is also made responsive to the generation of the control D pulse within the system.

The generation of the clock start pulses at output terminal 3152 and inhibit pulses to the external input interlock output terminal 3232 are inhibited in response to the actuation of the tab function mechanism due to the sensing of the tab code. Accordingly, a tab single shot multivibrator 3286 is interconnected with the input circuits of the clock start output norgate 5158 and the external input interlock norgate 3230 by means of conductors 3290 and 3298. Accordingly, when the single shot multivibrator 3286 is actuated, a logical one level signal will be fed to the input circuits of the gates 3158 and 3230. The input circuit of the single shot multivibrator 3286 is connected to a tab code input terminal 3288 which is connected in sensing relation to the reading of a tab code, either in the external data input system or the main reader system of the terminal unit. The tab code input conductor 3128, described in conjunction with FIG. 20, is interconnected with the input circuit, including input terminal 3288, of the tab code single shot multivibrator 3286. The input circuit of the single shot multivibrator is also interconnected with the control D input terminal 3192 whereby the logical one output of the single shot multivibrator 3286 is maintained for a predetermined period after the completion of the latest in time of either the tab code or the control D signal. Normally, the control D signal will permit the tab function to be completed. Upon the completion of the pulse from the single shot multivibrator 3286, the inhibit signal will be removed from the input circuits of the clock start norgate 3158 and the external input interlock norgate 3230.

Referring now to FIG. 25, there is illustrated a plurality of control circuits in the form of a print-punch control circuit 3300, a select register logic circuit 3302 and a response generator logic circuit 3304. The enumerated circuits are adapted to control the operation of the printer and the punch units, provide indication signals of the selection of a particular mode of operation and the energization of that mode, and finally to provide a positive or negative response signal to indicate to a remote central processing system of the proper selection and energization of a particular mode of operation, respectively. It will be noted as the description proceeds that the print-punch circuit 3300 is utilized in controlling the operations gate, the print gate and the punch gate for the respective portions of the data processing system to enable or disable the above named respective portions.

The select register logic circuit 3302 is primarily code controlled and is utilized in generating enabling signals for the respective modes of operation as for example, the reader mode, the printer mode or the punch mode, and also to generate indicating signals of the selection and energization of a subsystem for a particular mode of operation. The response generator circuit 3304 is provided to indicate to a remote master data processing system that the particular code generated at the master data processing system and sent to the terminal system to select a particular mode of operation has been received by the terminal data processing system and also that the particular mode code signal has energized the respective portion of the terminal data processing system for a particular mode of operation.

Referring particularly to the print punch control logic circuit 3300, there is illustrated a print ready bistable storage device 3310, in the form of a flip flop unit, and a punch ready bistable storage device 3312, in the form of a second flip flop unit, which are adapted to provide output signals to the select register logic circuit 3302 to indicate the selection of the printer or punch unit. Specifically, the print ready flip flop unit 3310 includes a set side 3314 which is provided with a plurality of input signals which are adapted to set the conditions of the flip flop unit 3310. The set side input circuit includes an input signal from the "all" switch on the keyboard of the typewriter by means of an "all" input terminal 3318 and an input conductor 3320. The input conductor 3320 is also interconnected with a set side 3322 of the punch ready flip flop unit 3312 whereby the actuation of the "all" switch on the typewriter unit keyboard will provide a setting signal for the flip-flop units 3310, 3312 to permit the coded input signals to both be printed by means of the typewriter unit and also punched into a coded information storage means, such as a tape, being fed through the punch unit.

A second input is provided to the set side 3314 by means of a differentiator circuit 3328 connected to a print-on code input terminal 3330. Accordingly, when a print-on code is fed to the data processing system, a positive going spike will be generated in the differentiator circuit 3328 due to the discharge of the capacitor contained therein to provide a setting pulse for the flip flop unit 3310. A second input signal to the differentiator circuit 3328 is provided by means of a control B input terminal 3332 connected to the control B pulse generator circuit whereby the print-on code is clocked into the differentiator circuit 3328 at time B. Thus, the coded print on input signal will switch the flip flop unit 3310 to provide a print ready output signal at the print ready output conductor 3334, for a purpose to be described in conjunction with the select register logic circuit 3302. The state of the flip flop unit 3310 is also controlled by the print-on switch wherein a print-on switch differentiator circuit 3340 is connected to the input circuit of the set side 3314, the differentiator circuit 3340 receiving input signal from the print on switch by means of a input terminal 3342. The input circuit of differentiator 3340 is also provided with an input signal from a switch gate input terminal 3344 connected to the switch gate output terminal 3078, described in conjunction with FIG. 23. The switch gate signal inhibits the operation of the switch differentiator 3340 during the on-line operation. Thus, the operator may not effect the system with the keyboard switches during on-line operation.

The flip flop 3310 is reset by means of input signals being fed to a reset side 3350 which receives a plurality of input signals from a print-off code differentiator circuit 3352 and a print-off switch differentiator circuit 3354. The print-off code differentiator circuit 3352 receives input signals from a print-off code input terminal 3356 which is connected in responsive relation to a print-off code being generated within the system. Similarly, the print-off switch differentiator circuit 3354 receives input signals from a print-off switch input terminal 3360 which is connected to the print-off switch trigger described in conjunction with FIG. 13. It is to be noted that the print-off code differentiator circuit 3352 is also provided with input signals from the control B clock pulse, whereby the print-off signals are clocked into the differentiator circuit 3352 in synchronism therewith.

When the flip flop 3310 has been set, an output signal is provided on an output conductor 3364 to a print ready output conductor 3334, as described above, and also to the input circuit of operations gate 3366. Accordingly, a logic zero signal is fed to the input terminal of the gate 3366, and if the remaining input conductors are at a logic zero, a logic one signal will be fed to an operations gate inverter gate 3368 thereby providing a logic zero output signal at the operations gate output terminal 3370. The operations gate output terminal 3370 is interconnected with the operations gate circuit described in conjunction with FIG. 19 to enable the magnetic drivers included in the operations gate logic circuit.

Referring to the remaining input conductors to the operations gate 3366, it is seen that a print inhibit input terminal 3371 provides an enabling or disabling input signal to the gate 3366. The print inhibit input terminal 3371 is interconnected with the output terminal 2986, described in conjunction with FIG. 23, whereby an inhibit signal is provided to the gate 3366 at such time as the system is in manual mode. In this way the operations gate will provide an inhibiting signal to the operations logic circuit (FIG. 19) to inhibit the operation of the operations logic circuit during the manual mode. A second input signal to the gate 3366 is provided from a print select flip flop circuit, to be described in conjunction with the select register logic circuit 3302, whereby an inhibiting signal is provided by means of conductor 3372 to the gate 3366 at such time as the printer has not been both selected and energized. Accordingly, in the situation where a print-on code has been read and the printer has been indicated as being turned on, a logic zero input signal will be fed to the gate 3366 by means of conductor 3372.

As stated in conjunction with the description of FIGS. 19 and 20, the particular code chosen for the enabling of the operations and functions decode circuits will always contain a bit in channel 7. Accordingly, a channel 7 bit input signal is provided to an input terminal 3376 to provide a logic zero level signal to the input circuit of the gate 3366 when a code contains a channel 7 bit. If a channel 7 bit is not present in a particular code configuration, then an indication is provided to the gate 3366 to inhibit the operation thereof by means of a channel 7 input terminal 3377.

During the period when the terminal system is being utilized in the on line mode in conjunction with a master data processing system, it is desired to inhibit the cycling of the terminal system during the period when the mode of the terminal system is being programmed by means of signals being fed thereto from the master data processing system. Accordingly, the control mode inhibit signal is fed to the input circuit of the gate 3366 by means of a control mode input terminal 3378 during the period in which the master data processing system is feeding set of programming signals to the terminal system prior to its operation. Upon the completion of the programming of the terminal system, a logic zero signal level is fed to the input terminal 3378 to remove the inhibit from the operations gate 3366.

Furthermore, in order to properly synchronize the operation of the operations gate enabling pulse, the input circuit of the gate 3366 is provided with a control D pulse by means of a control D input terminal 3380. Accordingly, the signal level at the input terminal 3380 will remain at a logical one level such time, until the control D pulse is generated, at which time the input terminal 3380 signal level will drop to a logical zero level. Accordingly, all of the conditions described above are present at the input circuit to gate 3366, that is, all logical zero level signals are present at the input conductors at the input terminals 3370 to 3380. A logical zero output signal will be fed to output terminal 3370 in accordance with the generation of the control D pulse. Thus, the magnet driver circuits contained in the operations logic circuits (FIG. 19) will be enabled in synchronism with the generation of the control D pulse.

A print gate output terminal 3384 is similarly provided, as was the case of the operations gate output terminal 3370, to control the operation of the power drivers in circuit 1954, described in conjunction with FIG. 20, the power drivers controlling the energization of the bail solenoids. As was the situation with gate 3366, a print gate logic gate 3386 is provided having an input circuit receiving a plurality of signals being fed thereto to inhibit the operation of the gate 3386 during certain portions of the operation of the terminal system. In the situation where each of the input signals to the gate 3386 are at a logic zero level, a logic one level signal would be fed in the output circuit of the gate 3386 and this signal is inverted by an inverter gate 3388 and thence fed to the print gate output terminal 3384. The input circuit to the print gate logic gate 3386 is provided, as was the case with the gate 3366, with input signals from the flip flop unit 3310, the print inhibit input terminal 3371, the print select input conductor 3372, the control mode input terminal 3378 and the control D input terminal 3380.

However, it is to be noted that the print gate logic gate 3386 does not contain an input signal from the channel 7 bit input terminal 3376 but rather receives an input signal from a channel 7 bit by means of input terminal 3390. As was further stated in conjunction with the description of FIGS. 19 and 20, the alpha numeric logic circuit controlling the actuation of the bails of the typewriter unit is energized from a code configuration which has been chosen to not contain a bit in channel 7. Accordingly, when a code not having a bit in channel 7 is received, an indication that an alpha numeric code is present and the print gate logic gate 3386 is enabled. However, if a channel 7 code is present in the code configuration, the signal level at the input terminal 3900 will rise to a logic one level to inhibit the operation of the gate 3386, thereby providing an inhibit signal at the print gate output terminal 3384.

A similar circuit is provided for a punch gate output terminal 3400 which receives enabling signals to be interconnected with the punch driver circuit described in conjunction with FIG. 22. The punch gate output terminal 3400 is furnished signals from a punch gate logic gate 3402 wherein the output signal from the gate 3402 is inverted by an inverter gate 3404. The input circuit to the punch gate logic gate 3402 is provided with a plurality of signals, one of which is from the control mode input terminal 3378 to inhibit the operation of the punch during the period in which the terminal system is being utilized with a master data processing system and the master data processing system is furnishing signals to the terminal system to initially program the mode of operation of the terminal system. Also the input circuit of the gate 3402 is provided with a control D input pulse from the control D input terminal 3380 to synchronize the operation of the punch gate inhibit signal being generated at output terminal 3400.

In certain situations it is desired to inhibit the operation of the punch unit. Accordingly, a punch inhibit signal is provided at an input terminal 3408 which will rise to a logic one level at such time as the punch is desired to be inhibited. The punch inhibit signal may be generated at any convenient point in the system and may be synchronized to inhibit the punch during any predetermined operation of the system. Also, the output signal at the punch output terminal 3400 is inhibited by the same signal that inhibited the output of the punch unit, as described in conjunction with FIG. 21. Accordingly, an output inhibit input terminal 3410 is connected to the output inhibit terminal 2482 (FIG. 21), and signals thereon are adapted to inhibit the punch gate to preclude the punch coils from being energized. As was the situation with the print gate, a punch select input signal is fed by means of a punch select input terminal 3412, which is interconnected with the select register circuit 3302 to inhibit the operation of the punch during a period when the punch has not been selected or turned on. Accordingly, until such time as the punch has been selected, the operation of the punch gate enabling signal at output terminal 3400 will be inhibited.

The input circuit of the gate 3402 is also interconnected with the output circuit of the punch ready flip flop unit 3312 whereby the punch-on code or punch-on switch signals will set the flip flop 3312 to provide a logic zero input signal to the gate 3402 to enable the gate. The set side 3312 is provided with input signals from a punch-on code differentiator circuit 3416 which receives input signals from a punch-on code input terminal 3418. On the rising edge of the control B signal, an output spike will be provided to the set side 3322 to set the flip flop circuit 3312, thereby lowering the input signal to the gate 3402 to a logic zero level. Thus the punch gate inhibit signal at output terminal 3400 is lowered to a logic zero lever to remove the inhibit from the driver circuit controlling the solenoids of the punch unit. Similarly, a punch-on switch differentiator circuit 3420 is provided with an input signal from a punch-on switch input terminal 3422, which is connected in responsive relation to the punch-on switch triggers described in conjunction with FIG. 13. An output spike will be fed to the set side 3322 on the rising edge of the punch on switch signal.

The flip flop 3312 includes a reset side 3426 having input signals from a punch-off code input terminal 3428 and a punch-off switch input terminal 3430, the signals being fed through differentiator circuits 3432, 3434 respectively. Each of the differentiator circuits 3416 and 3420, are provided with control B signals from input terminals 3332, to synchronize the operation of the punch-on and punch-off code and signals. Accordingly, with the flip flop 3312 set, a logic zero level signal will be fed to the input terminal of gate 3402 and, with the flip flop 3312 reset, a logic one signal will be fed to the input circuit of the gate 3402 to inhibit the operation thereof. The output signals from the set side 3322 are also fed to the select register circuit by means of a conductor 3436 for purposes to be more fully described hereinafter.

Referring now to the select register logic circuit 3302, there is illustrated a plurality of latch circuits in the form of flip flop circuits including a read select flip flop circuit 3440, a print select flip flop circuit 3442, a punch select flip flop circuit 3444, and a keyboard select flip flop circuit 3446. Thus, when a particular mode of operation has been chosen and that corresponding to that particular mode of operation unit, such as the printer, reader, punch or keyboard, has been turned on, a signal will be generated in the select register circuit 3302 and fed to the response generator logic circuit 3304 to form a constituent of a response signal to be fed to the master control data processing system. As will be seen from the description of the response generator, a second signal is generated which is indicative of a reader on code, etc. to form the other constituent of the response generator signal.

Referring to the specifics of the select register logic circuit 3302, the reader select flip flop unit 3440 includes a set side 3450 which is provided with a plurality of input signals from a select register on input circuit including input terminal 3452 and a reader on differentiator circuit 3454. The select register on circuit, particularly the input terminal 3452, is connected to select register on output terminal 3134, described in conjunction with FIG. 23, for providing input signals to the flip flop 3440 in accordance with the state of energization of the gate 3140 (FIG. 23). It is to be noted that the select register on input terminals are connected to the set sides of each of the flip flops 3442, 3444 and 3446 to enable the flip flops to be set in accordance with the respective input signals connected thereto. Accordingly, when the select register has been turned on, an input signal of a logic one level will be impressed on the input terminal 3452 to enable the set sides of the respective flip flops 3440 to 3446.

The set side 3450 is further provided with input signals from a differentiator circuit 3454 which in turn has an input circuit including a read ready input terminal 3460, a read-on code input terminal 3462, and a control B input terminal 3464. The read ready input conductor 3460 is interconnected with the reader control circuit 3450, described in conjunction with FIG. 24, and specifically receives output signals from the clock start flip flop unit 3170. The read-on code input terminal is interconnected with the read-on output terminal 2050 (FIG. 19) and provides an input pulse at the read-on code input terminal 3462 in response to a reading of the read-on code from the external input source or the main reader of the terminal system. It is to be noted that the read ready signal on conductor 3460 is dropped to a logic zero level in order for the read-on code and the control B pulse 3464 to provide a rising signal edge to the differentiator circuit 3454. When the rising signal edge is provided to the differentiator 3454, a positive going output spike will be generated and to switch the flip flop 3440 to its set state.

The output of the flip flop 3440 is fed to the input circuit of a read-on gate 3470 by means of an input conductor 3472. The input circuit of the read-on gate 3470 is also provided with a read ready input pulse by means of conductor 3474 whereby a read-on pulse is generated at a read-on output terminal 3476 in the event both input condustors 3472, 3474 are at a logic zero level. The read-on output terminal is interconnected with the external output described in conjunction with FIG. 1, to provide a read-on signal thereto.

The output signal level at the set side 3450 of the reader select flip flop 3440 is also fed to a read select output terminal 3478 by means of a conductor 3480. The output terminal 3478 is interconnected with the reader select input terminal 3164 (FIG. 24), and provides an input signal to the clock start norgate 3158 to start the clock pulse generator in response to the read select signal. The flip flop 3440 is reset by reading a reset signal from a select register reset input terminal 3484 and an input conductor 3486 to reset side 3488 of the reader select flip flop unit 3440. The input terminal 3484 is connected to the external input source of data whereby the select register norgate 3440, 3446 may be reset in response to a signal generated in the external data source. The output of the reset side of the read select flip flop 3440 is fed to the response generator by means of a conductor 3496 for a purpose to be explained in conjunction with the description of the response generator logic circuit 3304.

Referring now to the print select flip flop 3442, a set side 3498 is provided with a plurality of input signals from the select register on input terminal 3452, described above, to enable the set side of the flip flop 3442 and also an input signal is fed from the print-on differentiator circuit 3500. The print-on differentiator circuit 3500 is provided with input signals from a print-on code terminal 3502 which may be interconnected with the print-on code input terminal 3330, described in conjunction with the print punch logic circuit 3300. Also, the print ready conductor 3334 is fed to the print-on differentiator circuit 3500 by means of the conductor 3334 to thereby receive print ready signals from the flip flop 3310, also described in conjunction with the print punch logic circuit 3300. The differentiator circuit 3500 also receives the control B pulse by means of a conductor 3504 to synchronize the operation of the print select flip flop 3442 with the generation of the control B clock pulse.

Accordingly, if the input terminal 3502 and the print ready conductor 3334 are at a logic zero level due to the sensing of a print on code and the switching of the print ready flip flop 3310, the rising edge of the control B pulse on conductor 3504 will provide a positive going output spike to the input circuit of the set side 3498. Thus, the print select flip flop 3442 will be set to provide a set signal at the output conductor 3372 interconnected with the print select circuit described in conjunction with the print punch logic circuit 3300. The flip flop unit 3442 is also provided with a reset side 3506 which provides print select signals to the response generator, as will be more fully described in conjunction with description of the response generator logic circuit 3304.

The reset side 3506 may be reset by a select register reset signal impressed on the input terminal 3484, as was the situation with the reset side 3488. Accordingly, the external data processing system may reset the print select flip flop 3442 by means of a signal impressed on the input terminal 3484. Also, the print select flip flop 3482 may be reset by a print-off code impressed on an input terminal 3510, which may be interconnected with the print-off code input terminal 3356, described in conjunction with the print punch logic circuit 3300. The input pulse is passed through a print-off differentiator circuit 3512 which also includes an input pulse from the control B pulse generator impressed on input terminal 3464. Accordingly, the rising edge of the control B pulse will generate a positive going output spike to the reset side 3506 to reset the print select flip flop unit 3442.

The punch select flip flop 3444 also includes a set side 3514 and a reset side 3516 which are adapted to be set and reset, respectively, by a punch-on differentiator circuit 3520 and a punch-off differentiator circuit 3522 respectively. The punch-on differentiator 3520 receives input signals from a punch-on input terminal 3526, which is interconnected with the punch-on input terminal 3418, and also from a punch ready input conductor 3436, which receives signals from the punch ready flip flop unit 3312 in the print punch logic circuit 3300.

The punch-off differentiator receives a punch-off code signal at an input terminal 3528, which is interconnected with the punch-off code input terminal 3428, described in conjunction with the print punch logic circuit 3300, to reset the flip flop 3444. The output of the set side 3514 is fed by means of the conductor 3412 to the punch select norgate 3402 in the print punch logic circuit 3300, and the output of the reset side 3516 is fed to a punch select portion of the response generator logic circuit 3304. The reset side 3516 also includes an input signal from the select register reset terminal 3484 to permit the norgate 3444 to be reset from the external source of data.

The keyboard select flip flop 3446 includes a keyboard select and on differentiator circuit 3532, which provides setting signals to a set side 3534, and a reset side 3536 is provided with resetting signals from the select register reset input terminal 3484. The keyboard select-on differentiator circuit 3532 is provided with input signals from a keyboard-on input terminal 3540 which is interconnected with the keyboard-on output terminal 2058, described in conjunction with FIG. 19. Also the differentiator circuit 3532 receives input signals from a keyboard-on input terminal 3542 which is interconnected with the external data input source described in conjunction with FIG. 1. The output of the set side 3534 provides output signals to an output terminal 3550 which provides keyboard select signals to an external data output device and also the reset side 3536 is interconnected with a second external data output terminal 3552. The set side 3534 is also interconnected with a keyboard select output terminal 3556 by means of a conductor 3558, the output terminal 3556 being interconnected with the keyboard select terminal 2250 (FIG. 19). Also, the reset side 3536 provides a second output signal to the response generator logic circuit 3304 by means of a conductor 3578.

Referring now to the response generator logic circuit 3304, a negative response output terminal 3570 and a positive response output terminal 3572 are provided and are adapted to be interconnected with the master data processing system described above. In the situation where the terminal system is being utilized with a master data processing system, it is desirable to be able to signal the master data processing system that a particular mode or control code generated in the master data processing system and fed to the terminal system has been read correctly and further has energized the proper portion of the terminal system circuitry to set up the particular mode chosen. Accordingly, if the proper signal has been read by the terminal system and the particular unit with its associated circuitry has been energized, a positive response signal will be generated at output terminal 3572. However, in the event that either the proper code has not been read by the terminal system or the proper device with its associated circuitry has not been energized, a negative response signal will be generated at output terminal 3570. In this way the master data processing system will be provided with an indication of the response of the terminal system.

As stated above, read select, print select, punch select, and keyboard select signals are generated in the select register circuit 3302 and fed to the input circuitry of the response generator logic circuit 3304. Particularly, the read select input signal is fed through the conductor 3496, as described above, and the print select, punch select, keyboard select input signals are fed to the response generator 3304 by means of input conductors 3574, 3576 and 3578. The reader select input signal is fed through a differentiator circuit 3580 to a set side 3582 of a response generator flip flop circuit 3584. Similarly, the print select input signal is fed through a print select differentiator circuit 3586 to the set side 3582, and the punch select and keyboard select signals are fed through differentiator circuits 3588, 3590 respectively, to the set side 3582. Accordingly, if the particular output device, with its associated circuitry, has been selected, a setting signal will be fed to the set side 3582 of the response generator flip flop 3584. The output of the set side 3582 is fed to a positive response norgate 3594 by means of a conductor 3596 to provide a logic zero input signal level to the gate 3594 in the event that the flip flop 3584 has been set. The input circuit gate 3594 is also provided with inputs from a control C input terminal 3600, a channel 4 bit input terminal 3602 and a function decode input terminal 3604.

As was described above, a function decode enabling pulse will be generated in the event a bit is read in channel 1 and channel 7 and the turn-on or turn-off codes for the punch-print keyboard or reader units have been chosen to have a bit in channel 1 and a bit in channel 7. Accordingly, if a turn-on or turn-off code has been read, the function decode input terminal 3604 will be dropped to a logic zero level. Also, a turn-on code has been provided with a characteristic of having a bit channel 4. Accordingly, if the input terminal 3602 is dropped to a logic zero level, an indication is provided that a turn-on code has been read. These particular input signals are fed to the input circuit of the gate 3594 in addition to the input signal from the true side 3582 of the flip flop 3584, wherein the gate acts as an "and" gate to provide an output signal in the event all of the input signals are at a logic zero level. The control C pulse is generated and fed to the input circuit of the gate 3594 to clock the operation of the gate 3594.

However, if the flip flop 3584 has not been set, a reset side 3610 is provided with an output conductor 3512 to feed a logic zero level signal to a negative response gate 3514. The input circuit of the gate 3514 is also provided with input signals from the control C input terminal 3600, the channel 4 bit input terminal 3602 and the function decode input terminal 3604. Accordingly, if a bit has been read in channels 1 and 4 and a bit is absent from channel 7 for a particular code, and the flip flop 3584 has not been set, a logic one output signal level will be generated at the negative response output terminal 3570 during the period when the control C pulse is generated. Thus, an indication is provided at the negative response terminal that the flip flop 3584 has not been set indicating that the particular unit has not been selected. Also, if the particular code has not been properly read, a response of a logic zero level will be generated at both output terminals 3570 and 3572 due to the fact that a logic one input signal will be fed to the input terminal 3602 in the event the channel 4 code has not been read or to the input terminal 3604 in the event that the function decode circuit is not energized. Thus the master data processing system is provided with indicating signals in both contingencies where the proper code has not been read or the proper output device has not been selected.

While it will be apparent that the embodiment of the invention herein disclosed is well calculated to fulfill the objects of the invention, it will be appreciated that the invention is susceptible to modification, variation and change without departing from the proper scope of fair meaning of the subjoined claims. For example, it is to be understood that certain subsystems with the associated functions, may be eliminated to provide a system which includes certain selected functions and not others. Also, certain subsystems may be duplicated to provide a larger number of input subsystems or output subsystems in accordance with the particular requirements of the user.

What is claimed is:

1. In a data processing system having a first source of input data, a second source of input data, each of said sources of data taking the forms of successive columns of parallel bit signals, said bit signals having an electrical characteristic of a first level when true and a second level when not true, and pulse generator means for generating successive clock pulses, the invention comprising register means for selectively storing input data from one of said sources of input data comprising a plurality of storage circuits corresponding in number to the greatest number of bits in the data columns and having a set state and a reset state, means for transferring said bit signals from a selected source of input data to said storage circuits and controlling the state of said storage circuits, clocking circuit means associated with said storage circuits for clocking the input data to said storage circuits in response to the clock pulses including reset circuit means connected to the storage circuits for resetting the storage circuits during a first period, and enabling circuit means having an electrical characteristic which changes to the first level during a period at least as late as the end of said first period for setting the storage circuits.

2. In a data processing system having a first source of input data, a second source of input data, each of said sources of data taking the forms of successive columns of parallel bit signals, said bit signals having an electrical characteristic of a first level when true and a second level when not true, and pulse generator means for generating successive clock pulses, the invention comprising register means for selectively storing input data from one of said sources of input data comprising a plurality of bistable storage circuits corresponding in number to the greatest number of bits in the data columns and having a set state and a reset state, transfer means for transferring input bit signals from a selected source of input data to said bistable storage circuits and controlling the state of said bistable storage circuits, first and second input circuits having input conductors connected to said transfer means for feeding input bit signals thereto from said first and second sources of input data respectively, selected conductors of one of said first and second input circuits having the electrical characteristic thereof changed to the first level in response to a true bit and the remainder of the conductors of said one of said first and second input circuits having the electrical characteristic thereof at the second level, and clocking circuit means associated with said bistable storage circuits for clocking the input data to said bistable storage circuits in response to the clock pulses including reset circuit means connected to the bistable storage circuits for resetting the bistable storage circuits during a first period, enabling circuit means having an electrical characteristic which changes to the first level during a period at least as late as the end of said first period for producing a setting output pulse to said bistable storage circuits.

3. In a data processing system having an external first source of input data, a reader second source of input data, a manual third source of input data, each of said sources of data taking the forms of successive columns of parallel bit signals, said bit signals having an electrical characteristic of a first level when true and a second level when not true, and pulse generator means for generating successive clock pulses, the invention comprising register means for selectively storing one of said sources of input data comprising a plurality of bistable bit storage circuits and input circuits therefor corresponding in number to the greatest number of bits in the data columns and having a set state and a reset state, means for transferring said bits from a selected input source to said bistable storage circuits and controlling the state of said bistable storage circuits including a plurality of differentiator circuits corresponding in number to the number of bistable storage circuits and individually connected to the input circuits thereof, said differentiator circuits producing an output pulse in response to a change in level of the electrical characteristic, first, second and third differentiator input circuits having input conductors connected to each differentiator circuit and to the sources of input data for feeding input bits to said differentiator circuits from said first, second and third input source respectively, selected input conductors of one of said first, second and third differentiator input circuits corresponding to the selected input data source having the electrical characteristic thereof changed to the first level in response to a true bit and the remainder of the input conductors of said one of said first, second and third differentiator input circuits having the electrical characteristic thereof at the second level, and clocking circuit means associated with said bistable storage circuits for clocking the input data to said bistable storage circuits in response to the clock pulses including reset circuit means connected to the bistable storage circuits for resetting the bistable storage circuits during a first period and eliminating previously stored bits, enabling circuit means having an electrical characteristic which changes to the first level during a period at least as late as said first period, said enabling circuit means being connected to the respective input circuits of said differentiator circuits for producing a setting output pulse to said bistable storage circuits from said differentiator input circuits which are at the second level and inhibiting the operation of said differentiator circuits which are at the first level, said setting output pulse switching said bistable storage circuits to said set state for indicating a not-true bit.

4. A data processing system comprising an external first source of input data, an automatic second source of input data, a manual third source of input data, each of said sources of data taking the forms of successive data columns of parallel bit signals, said bit signals having an electrical characteristic of a first level when true and a second level when not true, pulse generator means for generating successive clock pulses, register means for selectively storing the input data from one of said sources of input data comprising a plurality of bistable storage circuits and input circuits therefor corresponding in number to the greatest number of signal bits in the data columns and having a set state and a reset state, means for transferring the bits from the selected input source to said bistable storage circuits through said input circuits and controlling the state of said bistable storage circuits including a plurality of differentiator circuits and input circuits therefor corresponding in number to the number of bistable storage circuits and individually connected to the input circuits thereof, said differentiator circuits producing an output pulse in response to a change in level of the electrical characteristic, there being first, second and third differentiator input circuits having input conductors connected to each differentiator circuit for feeding input bits thereto from said first, second and third source of input data respectively, selected conductors of one of said first, second and third input circuits having the electrical characteristic thereof changed to the first level in response to a true bit and the remainder of the conductors of said one of said input circuits having the electrical characteristic thereof at the second level, the change in electrical characteristic of the selected conductors producing an output pulse from said differentiator circuits to place said bistable storage circuits in the set state, and clocking circuit means for clocking said input data to said bistable storage circuits in response to the clock pulses including reset circuit means connected to the bistable storage circuits for resetting the bistable storage circuits during a first period, enabling circuit means having an electrical characteristic which changes to the first level during a period at least as late as the end of said first period, said enabling circuit means being connected to the respective input circuits of said differentiator circuits for producing a setting output pulse to said bistable storage circuits from the differentiator input circuits which are at the second level, said setting output pulse switching said bistable storage circuits to said set state for indicating a not true bit.

5. In a data processing system having multiple sources of input data, each of said sources of data taking the form of successive columns of parallel bit signals, said bit signals having an electrical characteristic of a first level when true and a second level when not true, and pulse generator means for generating successive clock pulses, a method of selectively storing the input data from one of said sources of input data comprising the steps of providing a plurality of bistable storage circuits and data input circuits therefor corresponding in number to the greatest number of signal bits in the data columns and having a set state and a reset state, transferring the bits from the selected one of said sources of input data to the data input circuits of said bistable storage circuits and controlling the state of said bistable storage circuits, producing an output pulse to place said bistable storage circuits in the set state in response to a change in said electrical characteristic of said bit signals of the selected one of said sources of input data, clocking the input data to said bistable storage means in response to the clock pulses including resetting the bistable storage circuits during a first period, producing a setting output pulse to said bistable storage circuits when said electrical characteristic is at the second level, thereby switching said bistable storage circuits to said set state for indicating a not true bit.

6. In a data processing system having an external first source of input data, an automatic second source of input data, a manual third source of input data, each of said sources of data taking the forms of successive columns of parallel bit signals, said bit signals having an electrical characteristic of a first level when true and a second level when not true, and pulse generator means for generating successive clock pulses, a method of selectively storing input data from one of the sources of input data comprising the steps of providing a plurality of bistable storage circuits and data input circuits therefor corresponding in number to the greatest number of signal bits in the data columns and having a set state and a reset state, transferring the bits from the selected one of the sources of input data to the data input circuits of said bistable storage circuits and controlling the state of said bistable storage circuits including the steps of providing a plurality of differentiator circuits and output circuits therefor corresponding in number to the number of bistable storage circuits and connecting the input circuits thereof to the output circuits of said differentiator circuits, first, second and third differentiator input circuits having input conductors connected to each differentiator circuit for feeding input bits thereto, said first, second and third source of input data respectively, producing an output pulse in response to a change in level of the electrical characteristic of said first, second and third differentiator input circuits, feeding input data bits to said differentiator circuits from said first, second and third source of input data respectively, selected conductors of one of said first, second and third differentiator input circuits having the electrical characteristic thereof changed to the first level in response to a true bit and the remainder of the conductors of said one of said differentiator input circuits having the electrical characteristic thereof at the second level, producing an output pulse from said differentiator circuits to place said bistable storage circuits in the set state in response to the change in electrical characteristic of said selected conductors, clocking said input data to said bistable storage circuits in response to the clock pulses including resetting the bistable storage circuits during a first period, enabling said differentiator circuits during a period at least as late as the end of said first period for producing a setting output pulse to said bistable storage circuits from said differentiator input circuits which are at the second level, said setting output pulse switching said bistable storage circuits to said set state for indicating a not true bit.

References Cited

UNITED STATES PATENTS

| 2,735,082 | 2/1956 | Goldberg et al. | 340—172.5X |
| 2,840,705 | 6/1958 | Scully | 340—172.5X |

RAULFE B. ZACHE, Primary Examiner